(12) United States Patent
Chiu et al.

(10) Patent No.: US 6,846,114 B2
(45) Date of Patent: Jan. 25, 2005

(54) FIBER OPTIC MODULES WITH DE-LATCHING MECHANISM

(75) Inventors: Liew C. Chiu, Singapore (SG); Ron C. Pang, Singapore (SG); Yong P. Sim, Singapore (SG); Kee S. Tan, Singapore (SG); Tat T. Ming, Singapore (SG)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/777,556

(22) Filed: Feb. 12, 2004

(65) Prior Publication Data

US 2004/0161207 A1 Aug. 19, 2004

Related U.S. Application Data

(63) Continuation of application No. 09/939,403, filed on Aug. 23, 2001, now Pat. No. 6,692,159, and a continuation-in-part of application No. 09/896,695, filed on Jun. 28, 2001.
(60) Provisional application No. 60/313,232, filed on Aug. 16, 2001, and provisional application No. 60/283,843, filed on Apr. 14, 2001.

(51) Int. Cl.[7] .............................. G02B 6/36; G02B 6/38; G02B 6/00
(52) U.S. Cl. .............................. 385/88; 385/56; 385/59; 385/134
(58) Field of Search ........................... 385/53–84

(56) References Cited

U.S. PATENT DOCUMENTS

| | | | | |
|---|---|---|---|---|
| 4,260,210 A | * | 4/1981 | Babuka et al. | 439/347 |
| 5,901,263 A | * | 5/1999 | Gaio et al. | 385/92 |
| 6,335,869 B1 | * | 1/2002 | Branch et al. | 361/816 |
| 6,364,540 B2 | * | 4/2002 | Shishikura et al. | 385/88 |
| 6,364,709 B1 | * | 4/2002 | Jones | 439/607 |
| 6,556,445 B2 | * | 4/2003 | Medina | 361/728 |

* cited by examiner

Primary Examiner—Akm Enayet Ullah
Assistant Examiner—Tina M Lin
(74) Attorney, Agent, or Firm—Allen, Dyer, Doppelt, Milbrath & Gilchrist, P.A.

(57) ABSTRACT

Rotate-and-pull mechanisms for fiber optic modules. The rotate-and-pull mechanisms have a lever-actuator to unlatch and withdraw a fiber optic module from a cage assembly or a module receptacle. The lever-actuator pivotally couples to the fiber optic module so that when lever-actuator is rotated about its pivot point, the lever-actuator causes the second actuator to release the fiber optic module from the cage assembly. The lever-actuator includes an actuating-tab to cause the second actuator to move when the lever-actuator is rotated. By pulling the lever-actuator away from the cage assembly, the fiber optic module is withdrawn from the cage assembly. A belly-to-belly mounting configuration is introduced for the rotate-and-pull release fiber optic modules.

4 Claims, 43 Drawing Sheets

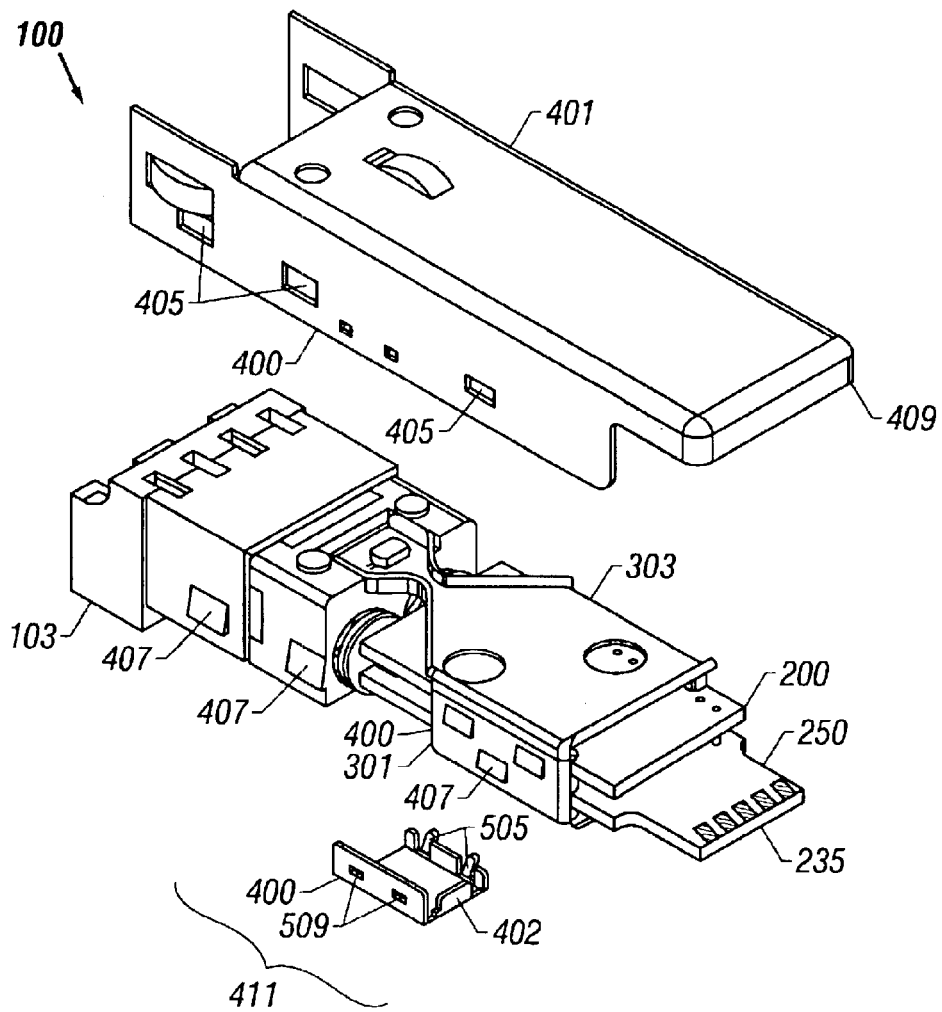
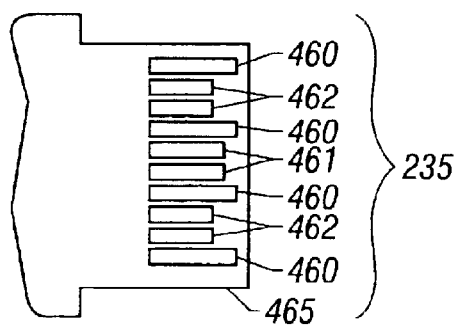
FIG. 4B
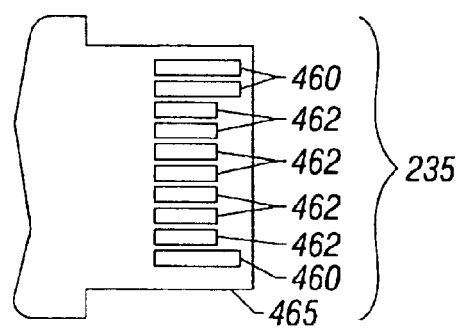
FIG. 4C

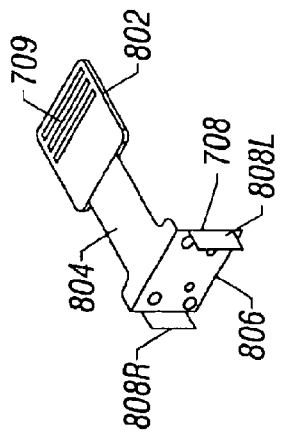
FIG. 8D
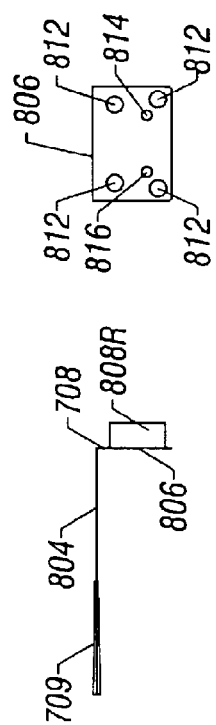
FIG. 8C
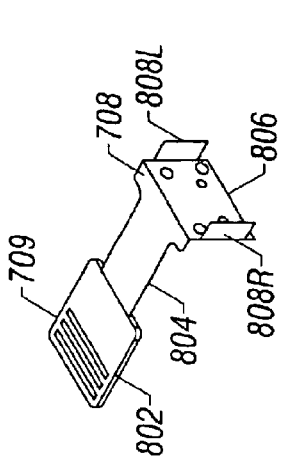
FIG. 8A
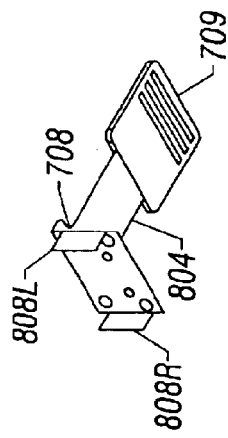
FIG. 8G
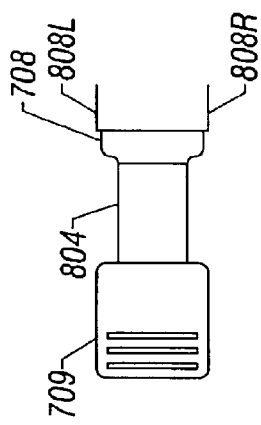
FIG. 8F
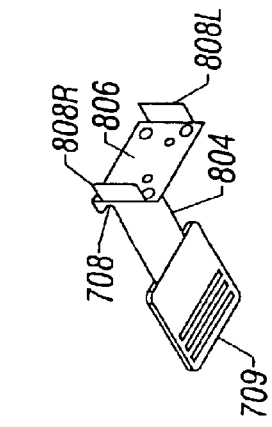
FIG. 8E
FIG. 8B

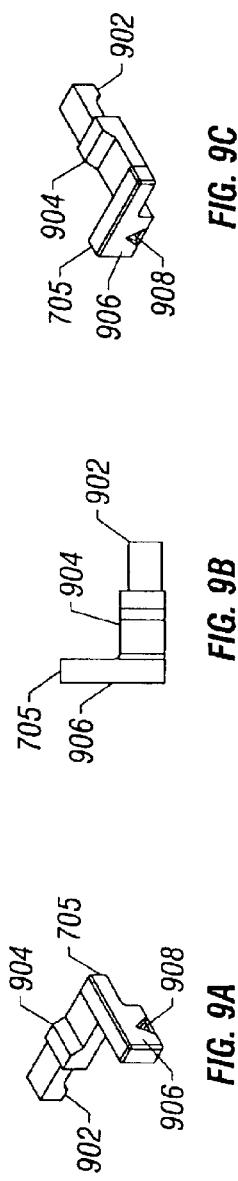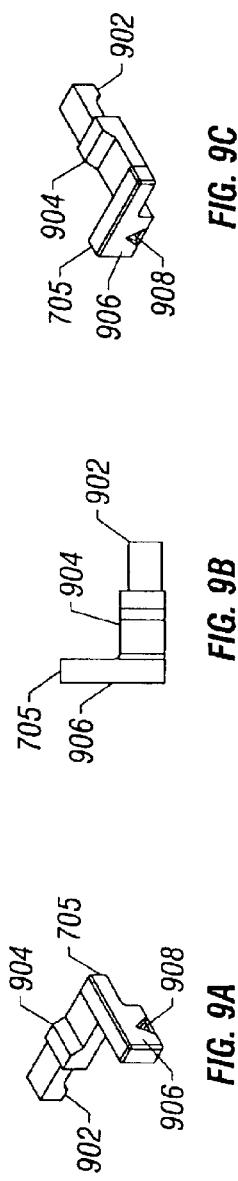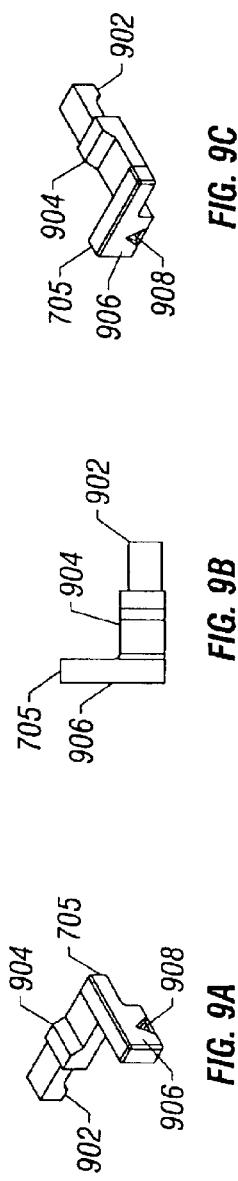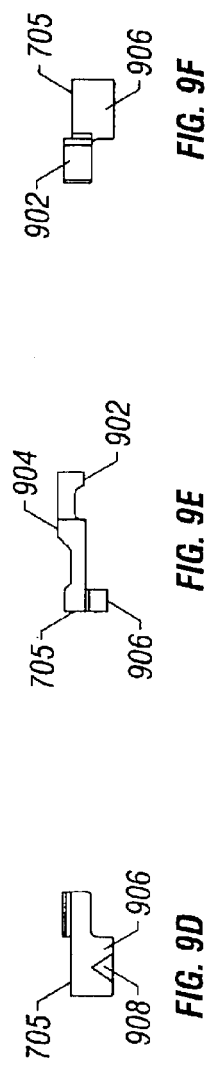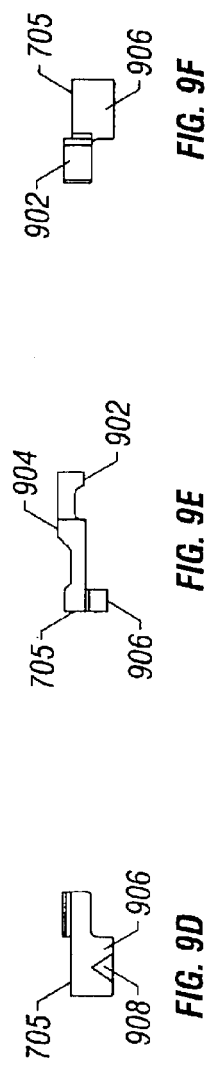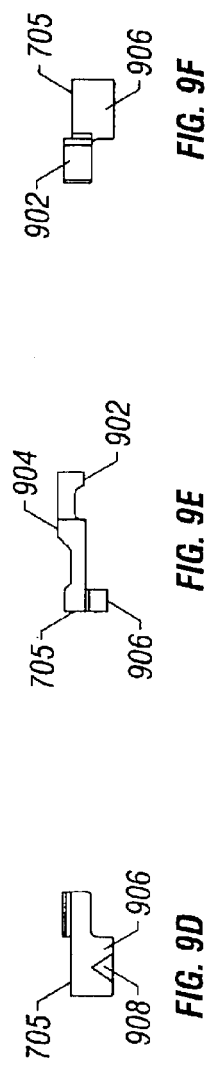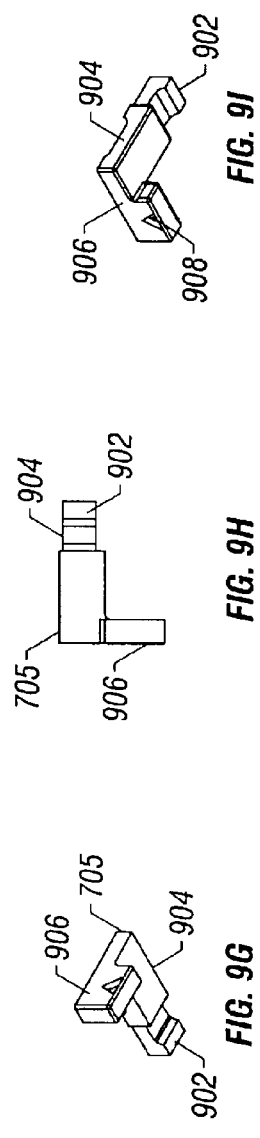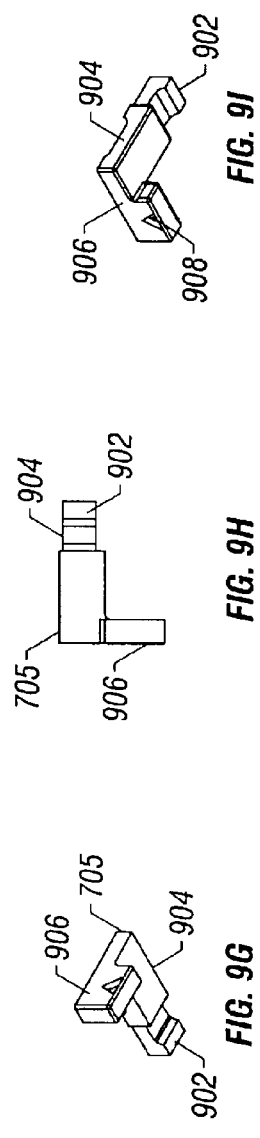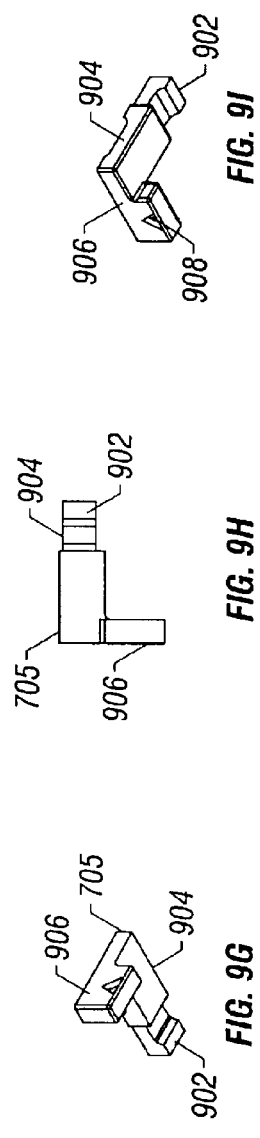

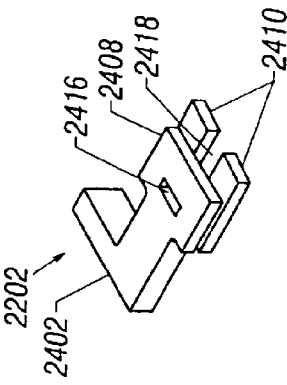
FIG. 24C
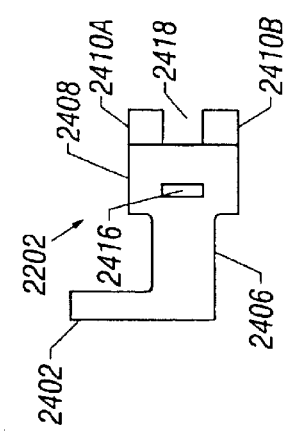
FIG. 24B
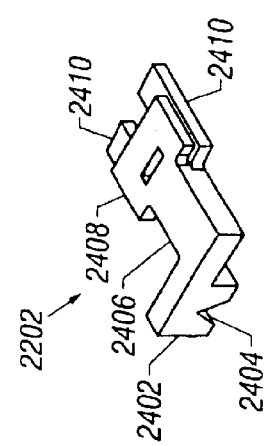
FIG. 24A
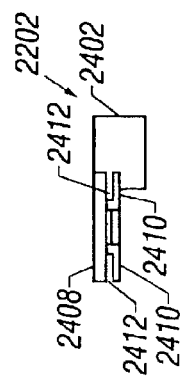
FIG. 24F
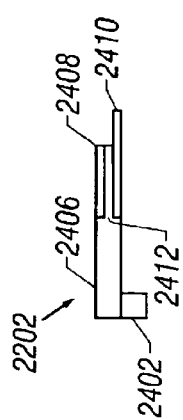
FIG. 24E
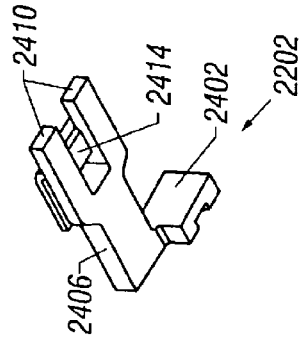
FIG. 24I
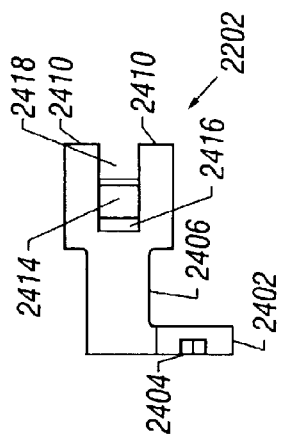
FIG. 24H
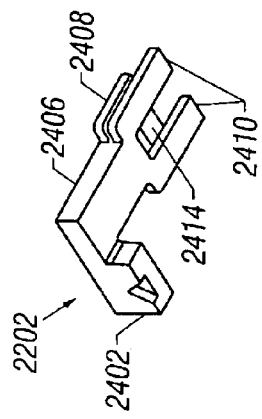
FIG. 24G
FIG. 24D

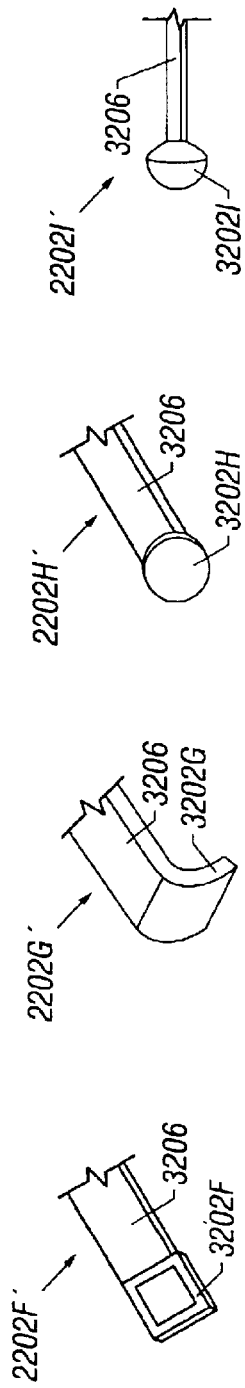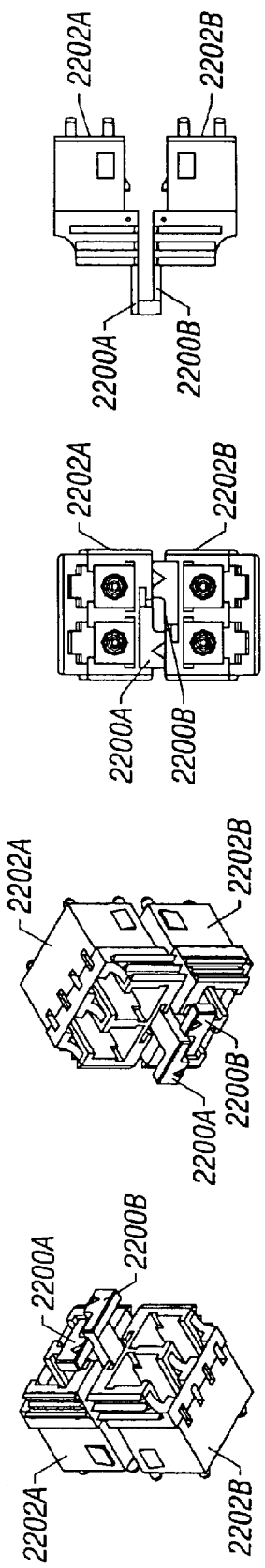

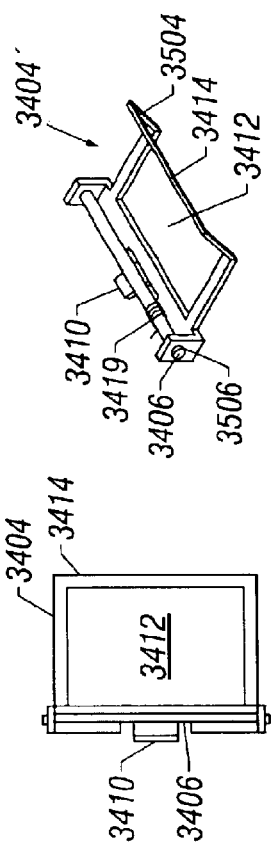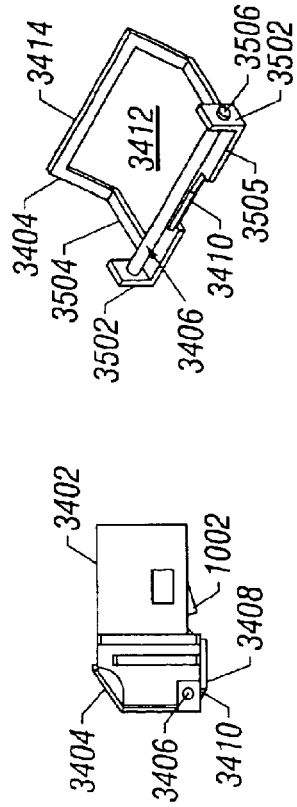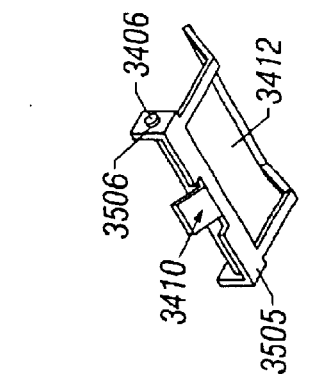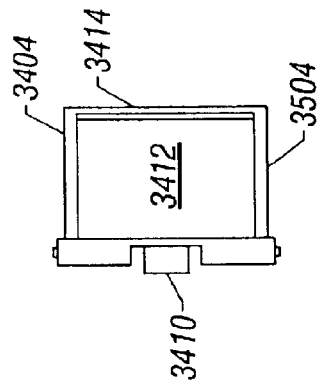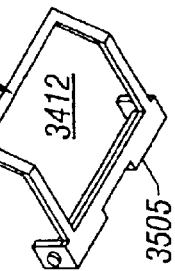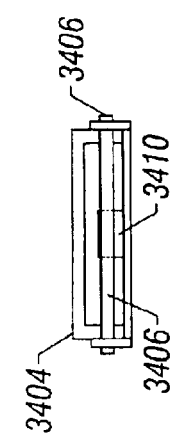

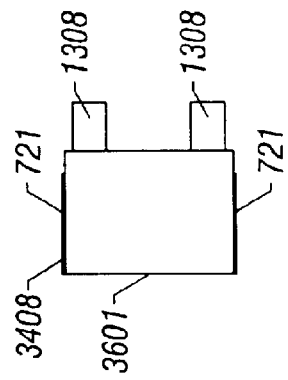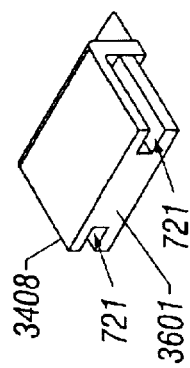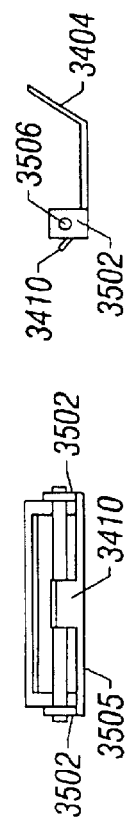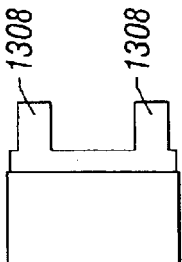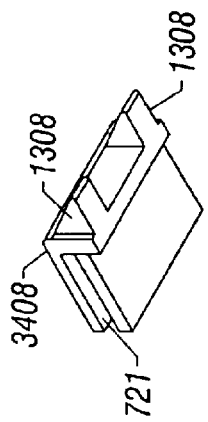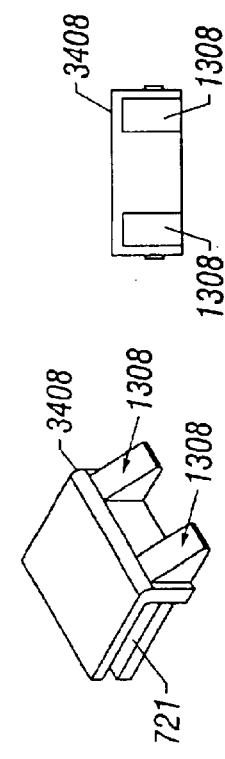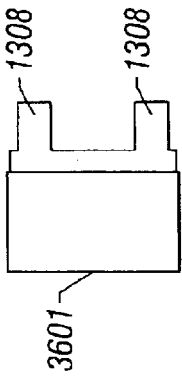

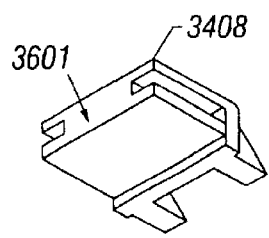
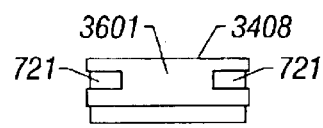
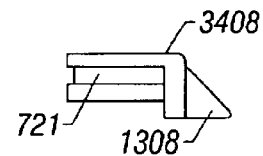
FIG. 36G   FIG. 36H   FIG. 36I
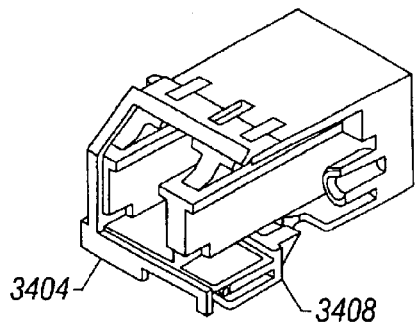
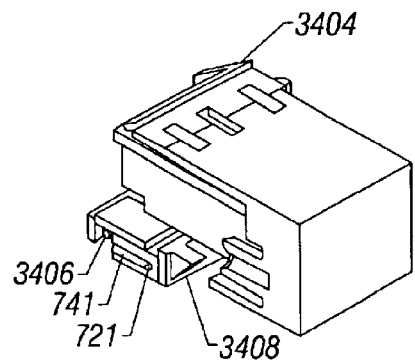
FIG. 37A   FIG. 37B
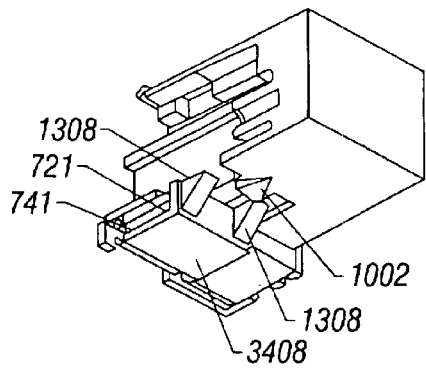
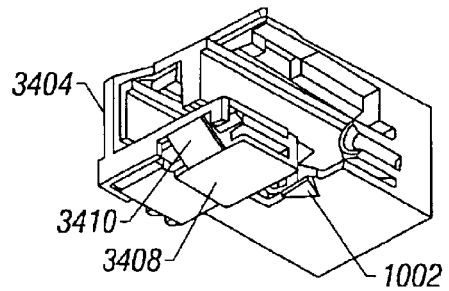
FIG. 37C   FIG. 37D

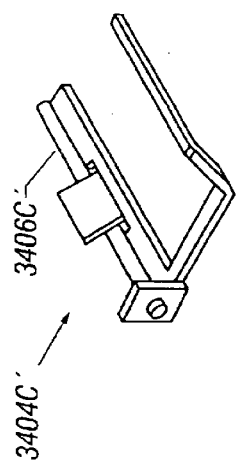
FIG. 39C
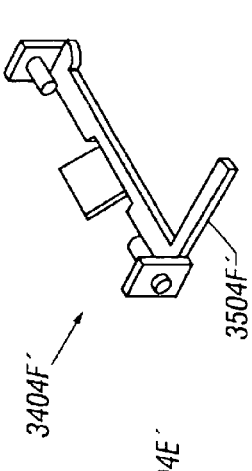
FIG. 39F
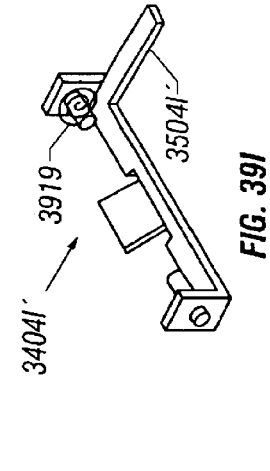
FIG. 39I
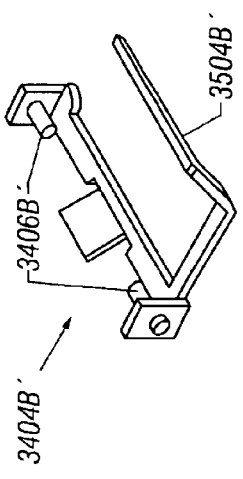
FIG. 39B
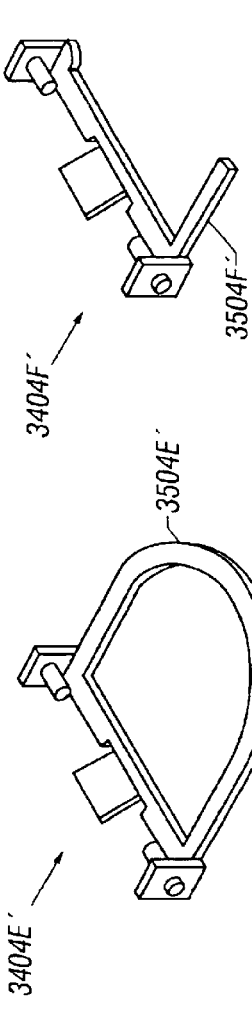
FIG. 39E
FIG. 39H
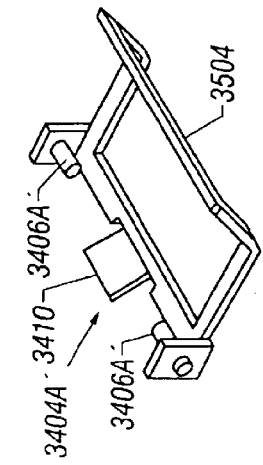
FIG. 39A
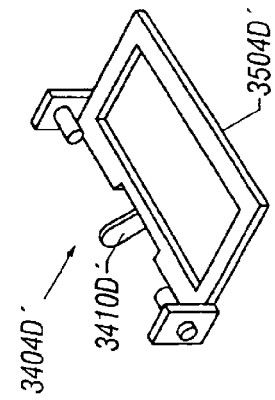
FIG. 39D
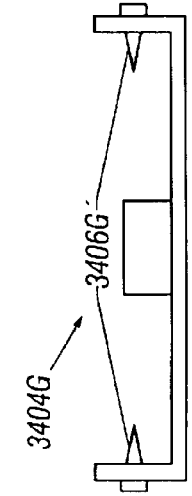
FIG. 39G

FIBER OPTIC MODULES WITH DE-LATCHING MECHANISM

CROSS REFERENCE TO RELATED APPLICATIONS

This non-provisional U.S. (U.S.) patent application claims the benefit of and is a continuation application of U.S. patent application Ser. No. 09/939,403 filed on Aug. 23, 2001 by inventors Liew Chuang Chiu et al., entitled "DE-LATCHING MECHANISMS FOR FIBER OPTIC MODULES", now issued as U.S. Pat. No. 6,692,159, which claims the benefit of U.S. Provisional Application No. 60/313,232 filed on Aug. 16, 2001 by inventors Liew Chuang Chiu et al., titled "DE-LATCHING MECHANISMS FOR FIBER OPTIC MODULES"; and also claims the benefit of and is a continuation in part (CIP) of U.S. patent application Ser. No. 09/896,695, filed on Jun. 28, 2001 by inventors Liew Chuang Chiu et al., titled "METHOD AND APPARATUS FOR PUSH BUTTON RELEASE FIBER OPTIC MODULES", which claims the benefit of U.S. Provisional Application No. 60/283,843 filed on Apr. 14, 2001 by inventors Liew Chuang Chiu et al. entitled "METHOD AND APPARATUS FOR PUSH BUTTON RELEASE FIBER OPTIC MODULES"; and this non-provisional U.S. patent application is also related to U.S. patent application Ser. No. 09/939,413, filed on Aug. 23, 2001 by Liew C. Chiu et al., titled "PULL-ACTION DE-LATCHING MECHANISMS FOR FIBER OPTIC MODULES" U.S. patent application Ser. No. 09/656,779, filed on Sep. 7, 2000 by Cheng Ping Wei et al.; U.S. patent application Ser. No. 09/321,308, filed on May 27, 1999 by Wenbin Jiang et al.; and U.S. patent application Ser. No. 09/320,409, filed on May 26, 1999 by Wenbin Jiang et al., now U.S. Pat. No. 6,213,651 B1, all of which are to be assigned to E2O Communications, Inc.

FIELD

This invention relates generally to fiber optic modules. More particularly, the invention relates to release mechanisms for unplugging fiber optic modules.

BACKGROUND

Fiber optic modules can transduce electrical data signals in order to transmit optical signals over optical fibers. Fiber optic modules can also transduce optical signals received over optical fibers into electrical data signals.

The size or form factor of fiber optic modules is important. The smaller the form factor of a fiber optic module, the less space taken on a printed circuit board to which it couples. A smaller form factor allows a greater number of fiber optic modules to be coupled onto a printed circuit board to support additional communication channels. However, the smaller form factor makes it more difficult for a user to handle.

When a fiber optic module embedded in a system fails it is desirable to replace it, particularly when other communication channels are supported by other operating fiber optic modules. To replace a failed fiber optic module it needs to be pluggable into a module receptacle. While plugging in a new fiber optic module is usually easy, it is more difficult to remove the failed fiber optic module because of other components surrounding it. Additionally, a user should not attempt to pull on fiber optic cables in order to try and remove a failed fiber optic module or else the user might cause damage thereto.

A typical release method for a pluggable fiber optic module is to push in on the fiber optic module itself and then pull out on the fiber optic module to release it from a cage assembly or module receptacle. It has been determined that this method is not very reliable with users complaining of the difficulty in removing pluggable fiber optic modules in this manner.

Users often complain that traditional methods offer little leverage in getting a sufficient grip on the module when attempting to pull it out of a module receptacle. Another complaint is that traditional actuators used to remove fiber optic modules are inaccessible or invisible. Other users complain that once released by the traditional method, it is difficult to withdraw the fiber optic module out of its cage or module receptacle.

Additionally, the pushing and then pulling of traditional methods places extra strain on components of the fiber optic module itself, the cage assembly or module receptacle and any electrical connections which the fiber optic module makes with an electrical connector. Oftentimes more than one cycle of pushing and pulling on the fiber optic module is required to release it from the cage or receptacle.

It is desirable to make it easier to remove pluggable fiber optic modules.

BRIEF DESCRIPTIONS OF THE DRAWINGS

FIG. 4A is an exploded view from the rear of an embodiment of a hot pluggable fiber optic module.

FIG. 4B is a magnified view of a side of a male electrical connector to provide hot pluggability.

FIG. 4C is a magnified view of another side of the male electrical connector to provide hot pluggability.

FIGS. 8A–8G are various views of an embodiment of a withdrawal tab for fiber optic modules.

FIGS. 9A–9I are various views of an embodiment of a kicker-actuator for fiber optic modules.

FIGS. 24A–24I illustrate various views of a pull-actuator for one embodiment of the invention.

FIGS. 32A–32I illustrate various views of alternative embodiments of pull mechanisms for pull-actuators.

FIGS. 33A–33D illustrate various views of a belly-to-belly mounting configuration for another embodiment of the invention employing pull-actuators.

FIGS. 34A–34I illustrate various views of a subassembly of a nose receptacle including a bail latch delatching mechanism for another embodiment of the invention.

FIGS. 35A–35I illustrate various views of a bail latch including a pivoting pin for one embodiment of the invention.

FIGS. 36A–36I illustrate various views of an actuator for one embodiment of the invention.

FIGS. 37A–37E illustrate various cross-sectional views of an integrated nose assembly and latching mechanism of FIGS. 34A–34I in the engaged position for one embodiment of the invention.

FIGS. 39A–39I illustrate various views of alternate embodiments of the bail latch.

DETAILED DESCRIPTION

In the following detailed description of the invention, numerous specific details are set forth in order to provide a thorough understanding of the invention. However, one skilled in the art would recognize that the invention may be practiced without these specific details. In other instances well known methods, procedures, components, and circuits have not been described in detail so as not to unnecessarily obscure aspects of the invention.

In the following description, certain terminology is used to describe various features of the invention. For example, a "fiber-optic transceiver" is a fiber optic module having optical signal transmit and receive capability. The terms "disengage", "release", "unlatch", and "de-latch" may be used interchangeably when referring to the de-coupling of a fiber optic module from a cage assembly.

The invention includes methods, apparatuses and systems for fiber optic modules including pull-action releasable fiber optic modules in small form pluggable (SFP) GBIC, LC type packages.

Figure 1:
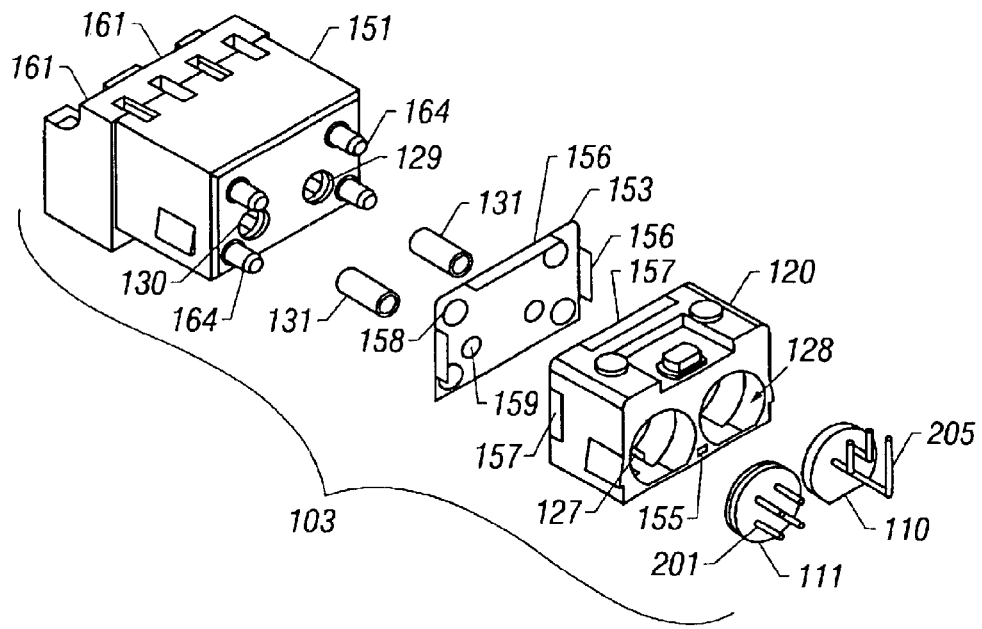
FIG. 1 is a simplified top-exploded view illustrating an optical element.

Referring now to FIG. 1, an exploded view of an optical element 103 of an embodiment of the invention is illustrated. The optical element 103 included a nose 151, a pair of fiber ferrule sleeves 131, an electromagnetic interference (EMI) shield plate 153, an optical block 120, a receiver 111 and a transmitter 110. The electromagnetic interference shield plate 153 provides shielding to keep electromagnetic interference from leaking into or out of the optical block 120 and the module. The optical block 120 aligns a light transmitter 110 and a light receiver 111 with two lenses in the optical block 120. The light transmitters 110 or light receivers 111 are optoelectronic devices for communicating with optical fibers using light of various wavelengths or photons. An optoelectronic device is a device which can convert or transduce light or photons into an electrical signal or an electrical signal into light or photons. In the case of transmitters, the light transmitters 110 are packaged emitters that can convert electrical signals into light or photons. Examples of emitters are semiconductor lasers (i.e. a VCSEL) or an LED which may be packaged in TO (transistor outline) cans. In the case of receivers, the light receivers 111 are packaged photodetectors, that detect or receive light or photons and convert it into an electrical signal. An example of a photo detector is a photo diode which may be packaged in a TO can. However other packages, housings or optoelectronic devices for receiving and transmitting light or photons may be used for the light transmitters 110 or light receivers 111.

The electromagnetic interference plate 153 has one or more projections 156 which engage one or more external notches 157 of the optical block 120 near its edges. The optical ports 159 of the electromagnetic interference plate 153 align with a pair of optical ports 129 and 130 of the nose 151. The electromagnetic interference plate 153 is electrically coupled to an outer housing 400 (shown on FIG. 5) via the projections 156 and shunts electro—magnetic fields to the outer housing 400. The fiber ferules 131 can be inserted into the optical ports 129 and 130 upon assembly. The nose 151 further has one or more posts 164 over which one or more holes 158 in the electromagnetic interference plate 153 can slide in order to align the nose 151, the pair of fiber ferules 131, the electromagnetic interference plate 153 and the optical block 120 together.

The nose 151 has a pair of LC receptacles 161 for mechanically coupling and aligning a pair of fiber optic cables (not shown) into the fiber optic module 100. Each LC receptacle 161 is a fiber optic receptacle for one serial fiber optic channel. The LC receptacles 161 in the nose 151 are preferably located without spacing between each other. Neighboring channels are separated far enough apart that a fiber optic module 100 having multiple channels can comply with FDA and IEC Class-1 eye safety limits. This eases handling of the fiber optic module 100 by avoiding the use of eye protection.

Due to the size of LC receptacles, TO-can size packages are usable which allows the output power level of each individual fiber optic channel to be separately monitored. Monitoring a fiber optic channel involves splitting the light beam so that a photodetector or photodiode receives a portion of the light beam. The electrical output of the photodiode is then measured to indicate the output power level of the fiber optic channel. The relaxed spacing of the individual fiber optic receptacles of the invention facilitate placing light beam splitters within the TO can of the light transmitter 110. The light beam splitter splits the beam such that a portion of the light beam lands on a photodiode within the TO can. The photodiode's output is measured to monitor the output power of the transmitter. Thus, with each channel being separately monitored for power output, each channel can be individually optimized. Those skilled in the art will also recognize that other fiber optic connectors such as, but not limited to, SC, MT-RJ, VF45, and MU connectors, may be used in lieu of the LC receptacles 161.

Figure 2:
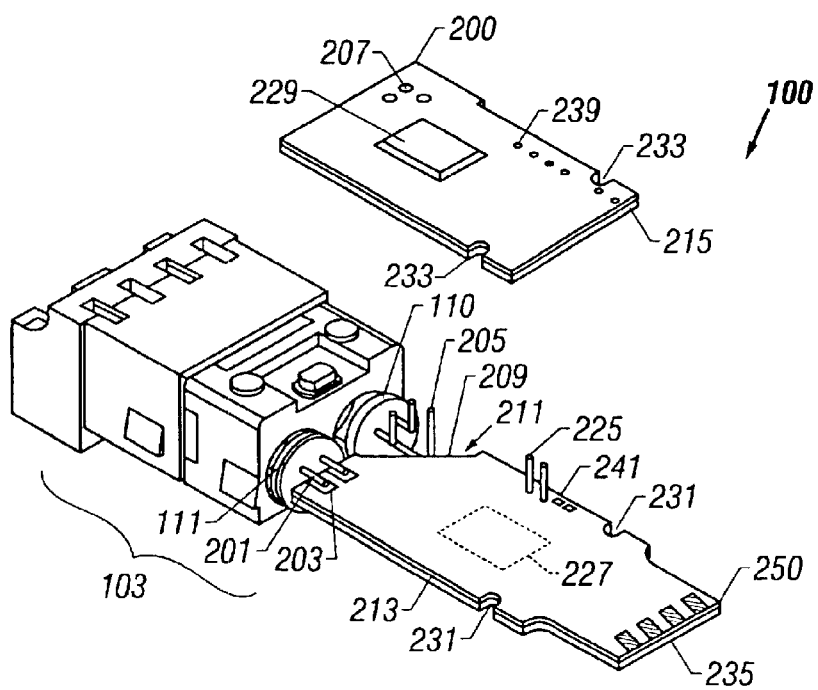
FIG. 2 is a partially assembled view of an optical element, receiver printed circuit board, and transmitter printed circuit board.

Referring now to FIG. 2, a partially assembled view of an optical element 103, a receiver printed circuit board 250, and a transmitter printed circuit board 200 for an embodiment of the invention is illustrated. Receiver printed circuit board 250 includes one or more receiver electrical components 227 (receiver integrated circuit (transimpedance amplifier and post amplifier), resistors, capacitors and other passive or active electrical components), a male electrical connector 235, and a receiver ground plane 213 (not shown). The transmitter printed circuit board 200 includes one or more transmitter electrical components 229 (transmitter integrated circuit (laser driver), resistors, capacitors and other passive or active electrical components) and a transmitter ground plane 215 (not shown). The receiver printed circuit board 250 and the transmitter printed circuit board 200 may be assembled by wave soldering.

At least one pin of the male electrical connector 235 couples to an external female electrical connector. The external female electrical connectors may be SFP (Small Form Pluggable) SMT (Surface Mount Technology) connectors. One or more pins of the male electrical connector 235 allow electrical signals, power, and ground to be coupled into or out of the fiber optic module 100.

Figure 3:
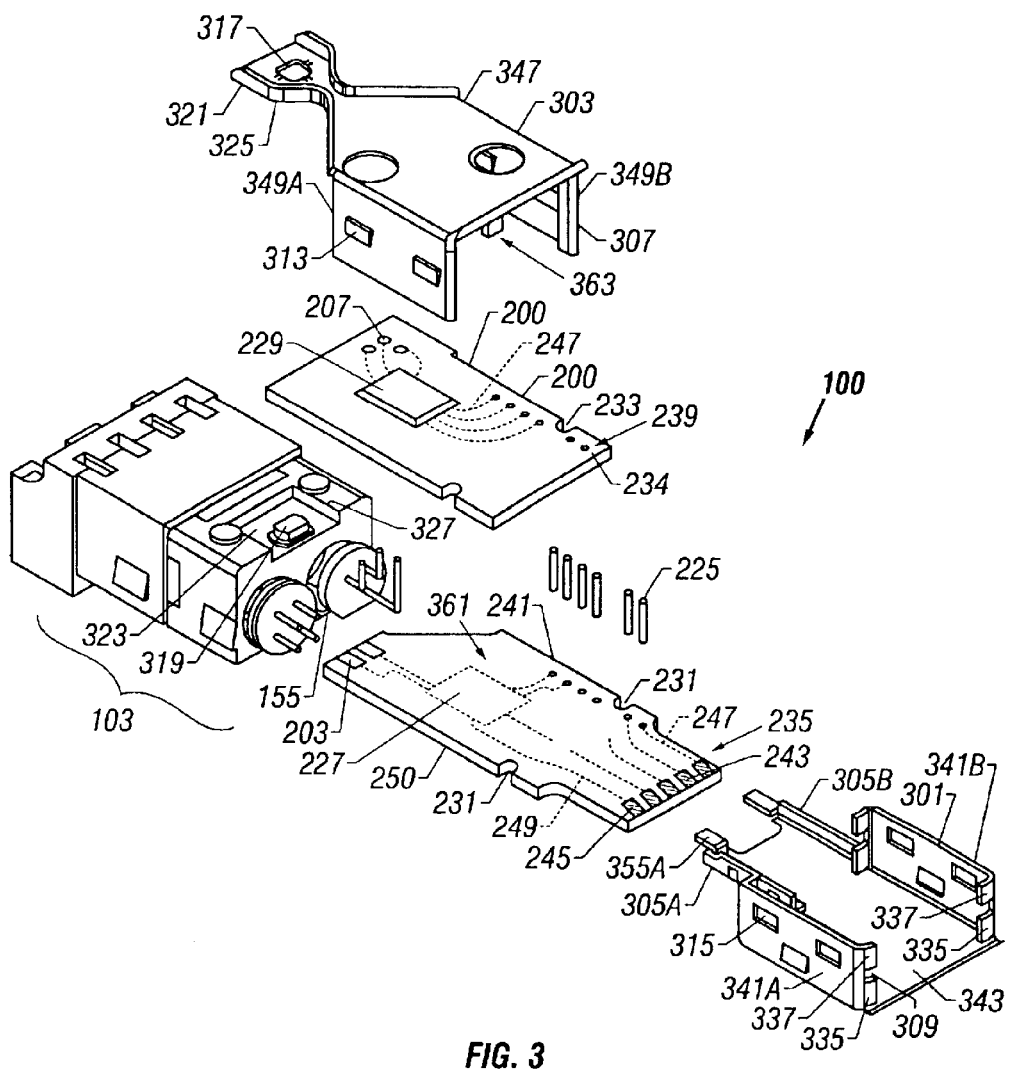
FIG. 3 is an exploded view of a printed circuit board cage subassembly and optical element.

Referring now to FIG. 3, an exploded view of the optical element 103, the receiver printed circuit board 250, the transmitter printed circuit board 200, a bottom frame 301, and a top frame 303 is illustrated. One or more transmitter pins 243 of the male electrical connector 235 which couple to the transmitter electrical components 229, the transmitter electrical components 229, the light transmitter 110, the interconnect leads 225 and a lens (not shown) of the optical block form one transmitting channel. The transmitter electrical components 229 control the light transmitter 110 and buffer the data signal received from a system for transmission over an optical fiber. One or more receiver pins 245 of the male electrical connector 235 which couple to the receiver electrical components 227, the receiver electrical components 227, the light receiver 111 and a lens (not shown) of the optical block form one receiving channel. The receiver electrical components 227 control the light receiver 111 and buffer the data signal received from an optical fiber. Other combinations of components can form other combinations of communications channels.

The optical element 103 includes the light receiver 111 with a plurality of straddle mount signal leads 201. The Straddle mount signal leads 201 are arranged in two horizontal rows to straddle a printed circuit board. The two rows of straddle mount signal leads 201 sandwich the receiver printed circuit board 250 so that the straddle mount signal leads 201 electrically couple the light receiver 111 to a plurality of receiver contacts 203 on both sides of the receiver printed circuit board 250. To improve the coupling between the straddle mount signal lead 201 and the receiver contacts 203, solder may be applied to the straddle mount signal leads 201 and the receiver contacts 203. The receiver contacts 203 are preferably a metal such as copper, silver, gold or other metal or alloy. The receiver contacts 203 may be on one or both the top and bottom surfaces of the receiver printed circuit board 250.

Optical element 103 has a light transmitter 110 with a plurality of formed (i.e. bent) signal leads 205. Each formed signal lead 205 is bent and turned up to couple to a header signal via 207, in the printed circuit board. The printed circuit board 250 has a cutout 209 that allows space for a horizontal portion of the formed signal lead 205. The cutout 209 may be at an angle cutting out a corner of receiver printed circuit board 250. In the alternative, the cutout 209 may be a square, semicircle, quarter circle or other shape. The vertical portion of each formed signal lead 205 is long enough to couple the light transmitter 110 to the transmitter printed circuit board 200.

The ends of formed signal leads 205 couple to a plurality of vias 207, through-holes, contacts or other coupling devices on the transmitter printed circuit board 200. To improve the coupling between a formed signal lead 205 and a via 207, solder may be applied to the formed signal lead 205 and the via 207. Since the printed circuit board assemblies and optical elements are mechanically coupled after the printed circuit boards have been wave soldered, the optical elements are not subject to the heat generated by wave soldering. While a 90 degree angle has been described, it is understood that other arrangements of the formed signal leads 205 may be employed to couple the light transmitter 110 to the transmitter printed circuit board 200.

When assembled into the fiber optic module, the receiver printed circuit board 250 and the transmitter printed circuit board 200 are vertically stacked and substantially parallel to each other. The top frame 303 and the bottom frame 301 hold the receiver printed circuit board 250 and the transmitter printed circuit board 200 in fixed vertical and horizontal alignment.

The fiber optic module further includes one or more interconnect leads 225 which electrically couple the transmitter electrical components 229 on the transmitter printed circuit board 200 to transmitter pins 243 of the electrical connector by means of signal traces in the receiver printed circuit board 250.

The receiver printed circuit board 250 includes a receiver ground plane 213 (shown in FIG. 2), and the transmitter printed circuit board 200 includes a transmitter ground plane 215 (shown in FIG. 2). Receiver ground plane 213 shunts electro-magnetic fields radiating into it to ground via a pin in the male electrical connector 235. The transmitter ground plane 215 shunts electro-magnetic fields radiating into ground through one or more of the interconnect leads 225, a transmitter trace 247 on the receiver printed circuit board 250, and a pin 243 in the male electrical connector 235.

The receiver printed circuit board 250 includes a pair of slots 231 (referred to as receiver slots 231) one in the left side edge and another in the right side edge of the printed circuit board as shown and illustrated in FIG. 2. The transmitter printed circuit board 200 includes a pair of slots 233 (referred to as transmitter slots 233) one in the left side edge and another in the right side edge of the printed circuit board as shown and illustrated in FIG. 2. The receiver slots 231 and the transmitter slots 233 facilitate alignment between the receiver printed circuit board 250 and the transmitter printed circuit board 200.

The bottom frame 301 includes a pair of sides 341A and 341B, a base 343, a pair of rails 305A and 305B, a plurality of lower support tabs 335 and a plurality of upper support tabs 337 extending from a pair of corners of each of the sides 341A and 341B as illustrated in FIG. 3. The base 343 of the bottom frame 301 is L shaped such that the rail 305B extends along the side and base of the bottom frame 301 while the rail 305B extends out of a center line (near the middle of the bottom frame) with a surface of the base there-between. The L shape leaves a cutout area from the base of the bottom frame which will be filled in by a bottom cover as described below. The rail 305A extending from the center line or middle of the bottom frame 301, includes a tip 355A that extends outward and is inserted into an opening 155 in the optical block 120.

The top frame 303 includes a top 347, a pair of top frame sides 349A and 349B, a pair of alignment rails 307, and a flange 321 as shown and illustrated in FIG. 3.

When assembled, the receiver printed circuit board 250 is inserted into a pair of slots 309 between the upper support tabs and the lower support tabs and rests on the lower support tabs 335 of the bottom frame 301. A pair of receiver slots 231 in edges of the receiver printed circuit board 250 are located near corners of the sides 341A and 341B of the receiver printed circuit board. The four lower support tabs 335 and the four upper support tabs 337 restrict vertical movement in the receiver printed circuit board 250 when its engaged thereto. One or more of the elements of the bottom frame 301 may be formed of a conductive material such as a metal or formed to include a conductive plating or surface. The conductive material of the bottom frame 301 shunts electro-magnetic fields to ground via an electrical coupling to chassis ground. In this manner the bottom frame 301 can provide electromagnetic interference shielding for the fiber optic module.

When assembled, the transmitter printed circuit board 200 rests on the four upper support tabs 337 of the bottom frame 301 such that the pair of transmitter slots 233 in the transmitter printed circuit board 200 are aligned directly above the pair of receiver slots 231 in the receiver printed circuit board 250 at a position adjacent to and above the upper support tabs 337. The alignment of the slots 233 with the slots 231 in each of the respective printed circuit boards assures that the transmitter interconnect vias 239 align with the receiver interconnect vias 241 such that the one or more interconnect leads 225 can be coupled there-between. The one or more interconnect leads 225 couple the respective transmitter traces 247 in the transmitter printed circuit board 200 and the receiver printed circuit board 250 together. The interconnect leads 225 are soldered to the receiver printed circuit board 250 at the receiver interconnect vias 241 on one end and to the transmitter printed circuit board 200 at the transmitter interconnect vias 239 at an opposite end. Though the interconnect leads 225 have been described as providing electrical coupling between the receiver printed circuit board 250 and the transmitter printed circuit board 200, it is understood that other interconnect devices may be employed including ribbon cable, wires, male and female electrical connectors and the like.

The pair of top frame sides 349A and 349B of the top frame 303 engage with the bottom frame sides 341A and 341B of the bottom frame 301 respectively when they are assembled together. When assembled, external faces of the top frame sides 349 abut inside faces of bottom frame sides 341. Each of the top frame sides have a pair of locking tabs 313 which engage with a pair of lock tab apertures 315 in each of the bottom frame sides 341 to hold them together. The locking tabs 313 and the locking tab apertures 315 prevent the bottom frame, 301 and the top frame 303 from moving vertically relative to each other. Each vertical edge of the top frame sides 349A and 349B mates with the upper tabs 337 and the lower tabs 335 to keep the top frame 303 from moving laterally relative to the bottom frame 301. The top frame 303 has the pair of alignment rails 307 on edges of the top frame sides 349A and 349B. The alignment rails 307 mate with the pair of transmitter slots 233 in the transmitter printed circuit board 200 and the pair of the receiver slots 231 in the receiver printed circuit board 250 to keep them in alignment so that the interconnect leads 225 are not sheared by movement in either and the electrical coupling is maintained. Top frame 303 has a tab 363, rib, post or other member on the underside of top 347. When top frame 303 is assembled to the bottom frame 301 and transmitter board 200, the tab 363 prevents upward movement of transmitter printed circuit board 200. Additionally, the pair of alignment rails 307 abut a pair of lower support tabs 335 and a pair of upper support tabs 337 to maintain alignment and avoid movement as stress is placed on the receiver printed circuit board 250 when the fiber optic module is pulled away from a connector. The top frame 303 includes the flange 321 which extends from the top 347 of the top frame 303 as shown and illustrated in FIG. 3. The flange 321 includes an opening 317 which slides over a top post 319 of the optical block 120 of the optical element 103. When the opening 317 of the flange 321 is mated with the top post 319, the top frame 303 is tightly coupled to the optical element 103 to avoid separation when the fiber optic module is inserted or removed from a connector. With the opening 317 engaged to the top post 319 so that the top frame is tightly coupled, the alignment rails 307 of the top frame 303 in conjunction with the receiver slots 231 and the transmitter slots 233, keep the receiver printed circuit board 250 and the transmitter printed circuit board 200 tightly coupled to the optical element 103 as well to avoid separation. The flange 321 includes a flange lip 325 that abuts a recess wall 327 of the optical block 120 to prevent lateral movement of the top frame 303 relative to the optical elements 103.

The top frame 303 includes a pair of top frame sides 349A and 349B and the top 347. These and other elements of the top frame may be formed of a conductive material such as a metal or formed to include a conductive plating or surface. The conductive material of the top frame 303 shunts electromagnetic fields to ground via an electrical coupling to chassis ground. In this manner, the top frame 303 provides electromagnetic interference shielding to the fiber optic module.

The assembled subassembly including the receiver printed circuit board 250, the transmitter printed circuit board 200, the interconnect leads 225, the bottom frame 301 and the top frame 303 can hereinafter be referred to as a printed circuit board assembly 411.

Referring now to FIG. 4A, an exploded view of an outer housing 400 and the printed circuit board assembly 411 is illustrated. The outer housing 400 includes a top cover 401, a bottom cover 402 and the L shaped bottom frame 301. The top cover 401, the bottom cover 402 and the bottom frame 301 couple together and around the optical block 120 to encase the receiver and transmitter printed circuit boards but for one end where the extension in the receiver printed circuit board forms the male connector 235. The top cover 401 includes a top portion and a pair of sides that fit over the printed circuit board assembly 411 and the optical element 103. The top cover 401 includes a plurality of locating tab openings 405 in each of its sides to engage with locating tabs 407 in sides of the optical block 120, in the nose of optical element 103, and in the bottom frame 301. When the locating tab openings 405 are engaged with the locating tabs 407, movement of the top cover 401 relative to the optical element 103 is prohibited. The top cover 401 includes a hood 409 which encloses an end of the transmitter printed circuit board 200 but leaves the connector 235 of the receiver printed circuit board 250 exposed to connect to a connector. The male electrical connector 235 extends from the top cover 401 to mechanically and electrically couple to an external female electrical connector.

The bottom cover 402 is of sufficient size to fill into the cutaway area in the L shaped bottom frame 301. The bottom cover 402 couples to the bottom frame 301 on one side and the top cover 401 on an opposite side.

Referring now to FIGS. 4B and 4C, pins of the male electrical connector 235 are illustrated in detail to provide hot pluggability. The male electrical connector 235 includes one or more ground or negative power pins 460, one or more positive power pins 461 and one or more signal pins 462 on top and/or bottom surfaces of the receiver printed circuit board 250. The pins 460, 461, and 462 are staggered from each other with reference to an edge 465 of the receiver printed circuit board 250 to facilitate the hot pluggability. The ground pins 460 of the male electrical connector 235 are closer to the edge 465 than any other pin in the male electrical connector 235 in order for ground to be established first when the fiber optic module is inserted and for ground to be removed last when its removed. The positive power pins 461 are next closest to the edge 465 for power to be established secondly when the fiber optic module is inserted and for power to be removed next to last when its removed. The signal pins 462 are farther from the edge that the power pins 461 and ground pins 462 so that they are established after power and ground has been when inserted and they are disconnect first when the fiber optic module is removed.

During the mating of the male electrical connector 235 with an external female electrical connector, the ground pins electrically couple first to ground receptacles of the external female electrical connector in order to ground the fiber optic module 100. During the demating of the male electrical connector 235 and external female electrical connector, the ground pin electrically decouples from the ground last to maintain the grounding of the fiber optic module 100 until after power is removed from the fiber optic module 100. The ground pins 460 being closer to the edge 465 than the power pins 461 and the signal pins 462, prevents damage and disruption to the fiber optic module and the system during the physical insertion and removal of the fiber optic module into and out of the system. The capability to physically remove and insert the fiber optic module during operation without damage or disruption is referred to as hot pluggability.

The outer housing 400, including the top cover 401 and the bottom cover 402 and the bottom frame 301, may be formed of a conductive material such as a metal or include a conductive plating or surface. With the outer housing 400 formed out of a conductive material, the outer housing 400 can shunt electro-magnetic fields radiating into the outer housing 400 to ground via an electrical coupling to chassis ground. In this manner the outer housing 400 also can provide electromagnetic interference shielding to the fiber optic module.

Figure 5:
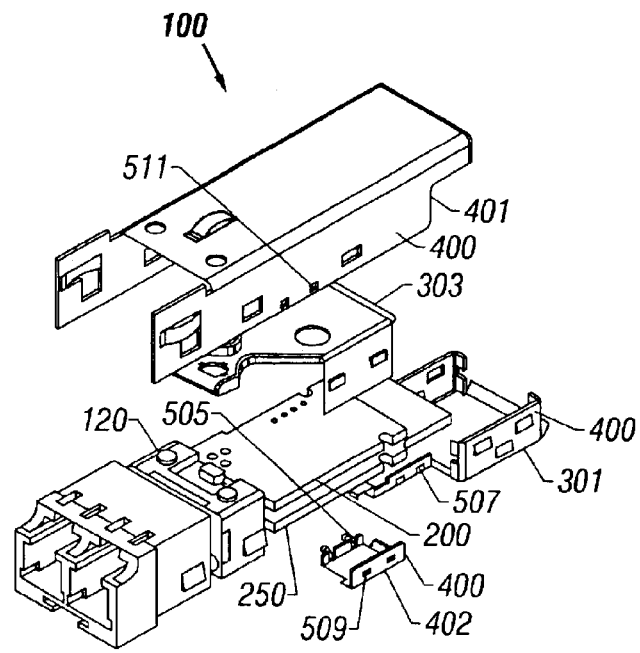
FIG. 5 is exploded view from the front of an embodiment of a fiber optic module.

Referring now to FIG. 5, an exploded view of the fiber optic module 100 from the front is illustrated. The bottom cover 402 of the outer housing 400 includes a pair of tabs 509 on one side and a pair of projections 505 on an opposite side. The projections 505 of the one side engage a pair of holes 507 in a side of the rail 305A of the bottom frame 301. The projections 505 in the opposite side of the bottom cover 402 engage the housing holes 511 in a side of the top cover 401. The inside surface of the side of the top cover 401 couples to the outer surface of the side of the bottom cover 402 when the tabs 509 are mated with the housing holes 511.

The bottom cover 402 can be readily disassembled and reassembled with the top cover 401 and the bottom frame 301 of the fiber optic module 100. By removing the bottom cover 402, a portion of the receiver printed circuit board is exposed to allow access to adjust adjustable electrical components (not shown) on the receiver printed circuit board 250. The adjustable electrical components electrically couple to the electrical components 227 on the receiver printed circuit board 250. The adjustable electrical components electrically couple to the electrical components 229 by way of a conductive path through one or more transmitter traces 361 on the receiver printed circuit board 250, the interconnect vias 225, and the transmitter traces 247 on the transmitter printed circuit board 200. The adjustable electrical components may include DIP switches, potentiometers, variable capacitors and other devices used to tune or adjust the performance of the fiber optic module 100.

The bottom cover 402 can also be formed of a conductive material such as a metal or include a conductive plating or surface which is coupled to chassis ground (via holes 507, housing holes 511 and tabs 505 and projections 509) in order to provide electromagnetic interference shielding for the fiber optic module 100.

Figure 6A:
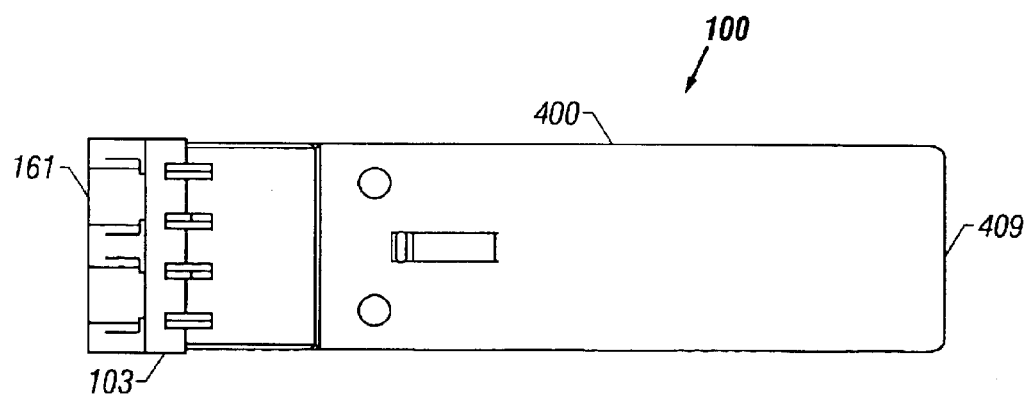
FIG. 6A is a top view of an embodiment of an assembled fiber optic module.
Figure 6B:
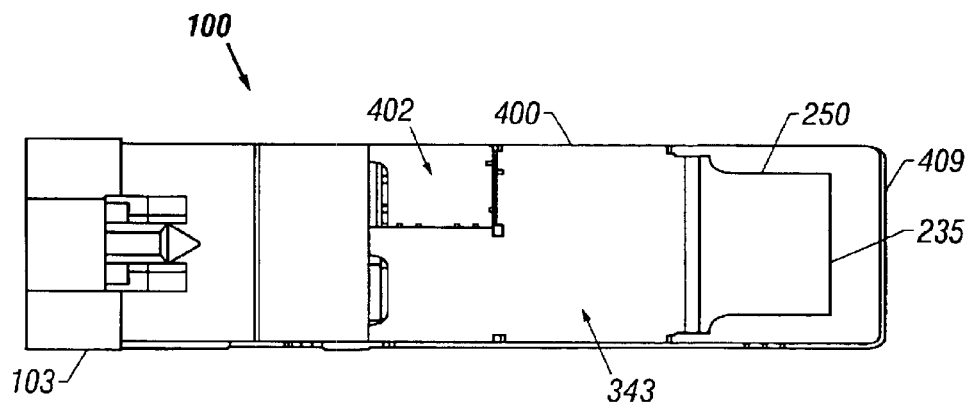
FIG. 6B is a bottom view of an embodiment of an assembled fiber optic module.
Figure 6C:
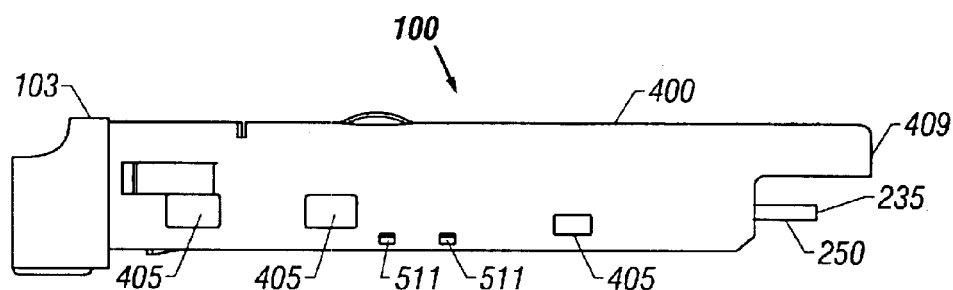
FIG. 6C is a right side view of an embodiment of an assembled fiber optic module.
Figure 6D:
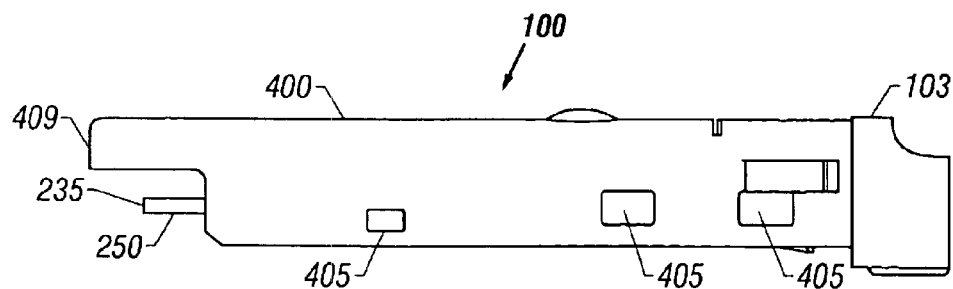
FIG. 6D is a left side view of an embodiment of an assembled fiber optic module.
Figure 6E:
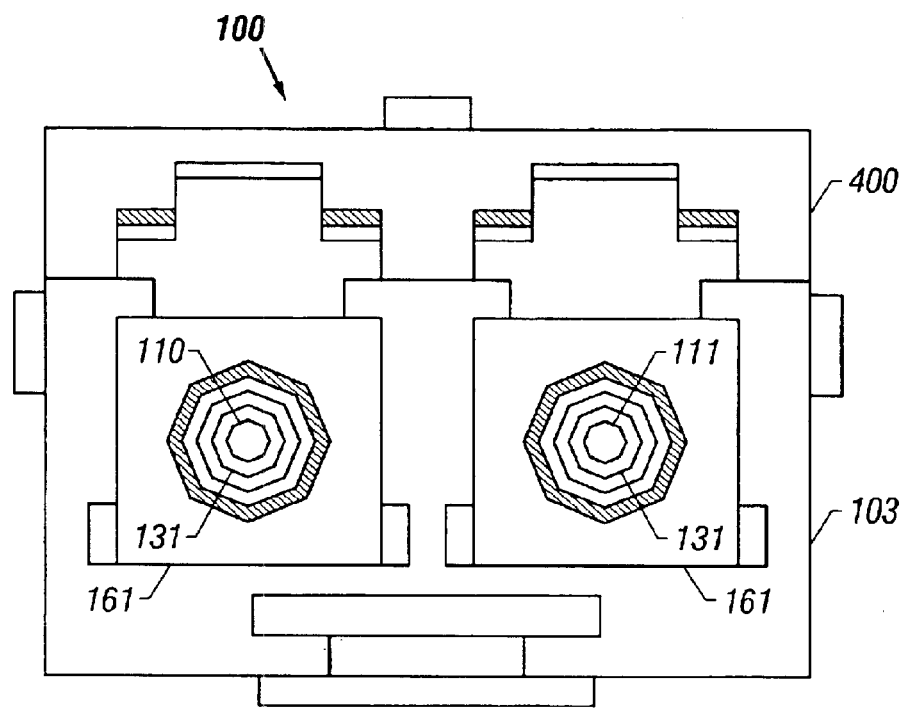
FIG. 6E is a front view of an embodiment of an assembled fiber optic module.
Figure 6F:
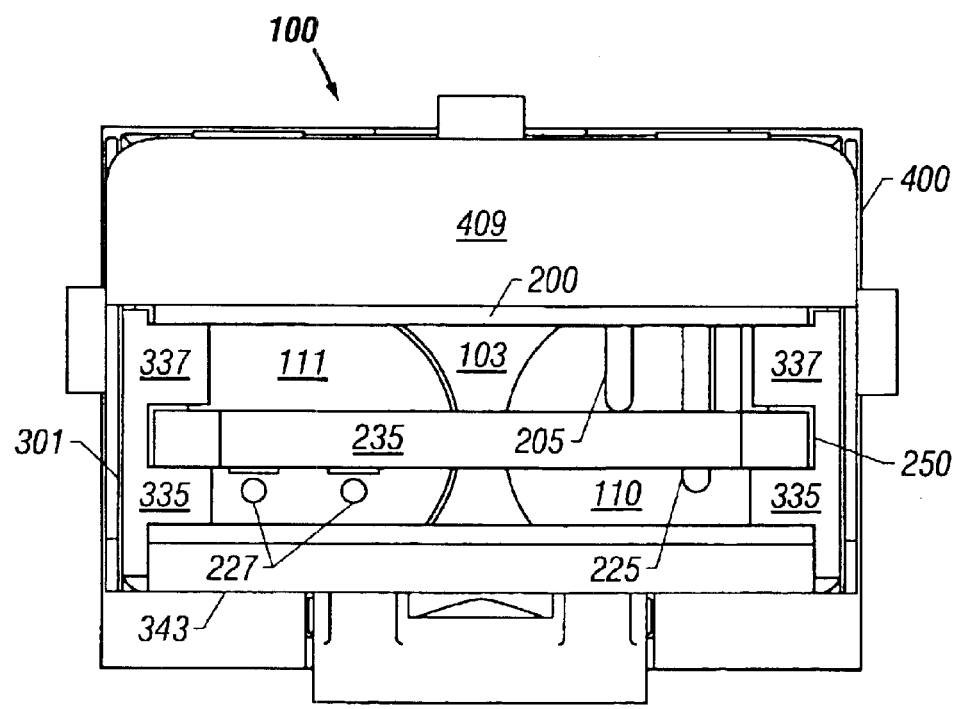
FIG. 6F is a rear view of an embodiment of an assembled fiber optic module.

FIG. 6A illustrates a top view of a fully assembled fiber optic module 100. FIG. 6B illustrates a bottom view of a fully assembled fiber optic module 100. FIG. 6C illustrates a right side view of a fully assembled fiber optic module 100. FIG. 6D illustrates a left side view of a fully assembled fiber optic module 100. FIG. 6C illustrates a front view of a fully assembled fiber optic module. FIG. 6D illustrates a rear view of a fully assembled fiber optic module 100. To assemble the fiber optic module 100 of the invention, the receiver printed circuit board 250 is first slid into the slots 309 of the bottom frame 301 between the upper support tabs 337 and the lower support tabs 335 until the receiver slots 231 are adjacent to, and just inside an end of the bottom frame 301. When receiver printed circuit board 250 is properly positioned in the bottom frame 301, receiver electrical components 227 are face down, the ground plane is face up and the male electrical connector 235 extends beyond the end of the bottom frame 301 so that its external thereto. Next, the one or more interconnect leads 225 are then press fit into the receiver interconnect vias 241. Solder is applied to the interconnect leads 225 at the receiver interconnect vias 241.

Then the transmitter interconnect vias 239 of the transmitter printed circuit board 200 are aligned with the one or more interconnect leads and press fit together so that the transmitter printed circuit board rests on top of the upper support tabs 337. With proper orientation, the ground plane is facing down toward the receiver printed circuit board while the transmitter electrical components 229 are on the face up side on the surface of the transmitter printed circuit board 200 and opposite the receiver printed circuit board 250. After press fitting them together, solder is applied to the interconnect leads 225 at the transmitter interconnect vias 239.

The top frame 303 is next in the assembly process. The alignment rails 307 of the top frame 303 are aligned with the transmitter slots 233 and the receiver slots 231. The alignment rails 107 are inserted into the transmitter slots 233 so that external surfaces of the sides 349A and 349B slide into the internal surfaces of the sides 341A and 341B respectively. The top frame 303 is coupled to the bottom frame such that the alignment rails 107 slide through the transmitter slots 233 and the receiver slots 231 until the locking tabs 313 engage with the lock tab apertures 315 to lock the top frame 303 in place relative to the bottom frame 301.

The optical elements 103 are prepared in parallel with forming the printed circuit board assembly 411. A die (not shown) is used to bend the signal leads of the light transmitter 110 through 90 degrees to form the formed signal leads 205 of the invention. The optical elements are then assembled and aligned together as a subassembly 103.

The printed circuit board subassembly 411 is then coupled together to the optical elements subassembly 103. The printed circuit board subassembly 411 is positioned with the optical elements so that the receiver contacts 203 of the receiver printed circuit board 250 align with the space between the horizontal rows of straddle mount signal leads 201. The flange 321 of the top frame 303 is flexed upward so that the opening 317 can mate with the post 319. The printed circuit board subassembly 411 and optical element 103 are brought together so that the receiver contacts 203 can electrically be couple to the straddle mount signal leads 201 and the tip 355A slides into the opening 155. The flange 321 is then released so that the opening 317 slides over the top post 319 to secure the printed circuit board subassembly 411 to the optical element subassembly 103.

Next the outer housing 400 is completed around the printed circuit board subassembly 411. The top cover 311 is aligned with the printed circuit board subassembly 411 so that the locating tab openings 405 can mate with the locating tabs 407. The top cover 401 is slid over the optical element subassembly 103 and the printed circuit board subassembly 411 so that the locating tabs 407 snap into the locating tab openings 405.

The bottom cover 402 is then couple to the bottom frame 301 and the top cover 401. The bottom cover is tilted so that the projections 505 engage the holes 507 in the side of the rail of the bottom frame 301. Then, the top cover 402 is pressed upward so that the tabs 509 engage with the housing holes 511 so that the bottom cover 402 is secured in place to complete the assembly of the fiber optic module 100.

For transmitting signals, the fiber optic module 100 electrically functions such that external electrical transmitter signals arriving at transmitter pins 243 in the male electrical connector 235 are coupled into the transmitter traces 247 routed on the receiver printed circuit board 250. The transmitter traces 247 couple the external electrical transmitter signal from the transmitter pins 243 to the receiver interconnect vias 241. The receiver interconnect vias 241 couple the transmitter signals to the one or more interconnect leads 225. The one or more interconnect leads 225 couple the electrical signals from the receiver interconnect vias 241 at one end into the transmitter interconnect vias 239 at an opposite end. The transmitter traces 247 on the transmitter printed circuit board 200 couple the electrical signals from the transmitter interconnect vias 239 into the transmitter electrical components 229 and/or the transmitter 110. The transmitter electrical components 229 process the electrical signals into electrical transmission pulses for coupling to the light transmitter 110. The light transmitter 110 transduces the electrical transmission pulses into light pulses for transmission over the fiber optic cables.

For receiving signals, the fiber optic module 100 electrically functions such that external light pulses arriving at the LC receptacles 161 are transduced into electrical pulses by the light receiver 111 for coupling into the receiver electrical components 227. The receiver electrical components 227 process the electrical pulses into electrical receiver signals which are coupled to the receiver traces 249 of the receiver printed circuit board 250. The receiver traces 249 couple the receiver signals to the receiver pins 245 in the male electrical connector 235 by which the electrical receiver signals are coupled to external devices. In one embodiment of the invention, one electrical component on one of the printed circuit boards controls both the light transmitter 110 and the light receiver 111.

In operation, the fiber optic module 100 may be housed in a rack or a cabinet designed to house an LC, GBIC package. When the fiber optic module 100 is inserted into the rack the male electrical connector 235 couples to a female electrical connector of the rack or cabinet. As the electrical connectors couple, one or more ground pins in the male electrical connector 235 electrically couples to one or more corresponding ground receptacles in the female electrical connector before any other pin electrically couples. One or more power pins in the male electrical connector 235 electrically couple to one or more corresponding power receptacles in the female electrical connector before any signal pins electrically couple. After the ground and power pins have coupled, one or more signal pins may then electrically couple to one or more corresponding signal receptacles. Either before or after the fiber optic module is inserted into the rack, fiber optical cables (not shown) are connected to the LC receptacles 161.

When it is desired to replace the fiber optic module 100 for some reason, the invention allows hot pluggable replacement. First the fiber connector is removed from the fiber optic module 100. Then the module is disconnected from any electrical connector into which it is coupled. As it is disconnected, the signal pins decouple first, the power pins second and the ground pins last. After which a new fiber optic module 100 can be inserted with the connecting sequence occurring as discussed above.

After the fiber optic module is disconnected, the optical element subassembly 103 or the printed circuit board subassembly 411 may be easily replaced. To replace the optical element 103, the flange 321 is flexed up to demate the opening 317 and the top post 319. The optical subassembly 103 is then pulled away from the printed circuit board assembly 411. As the optical subassembly is pulled away from the printed circuit board assembly 411, the straddle mount signal leads 201 decouple from the receiver contacts 203. The formed signal leads 205 also decouple from the header signal vias 207. A replacement optical subassembly is then coupled to the printed circuit board assembly 411 as discussed above. After which the fiber optic module 100 (the replacement optical element 103 coupled to the printed circuit board assembly 411) can be inserted with the connecting sequence occurring as discussed above.

To replace the printed circuit board assembly 411, the fiber optic module is removed as discussed above, except that the fiber optic cables need not be removed from the LC receptacles 161. The flange 321 is flexed up to demate the opening 317 and the top post 319. The optical element 103 is then pulled away from the printed circuit board assembly. As the printed circuit board assembly 411 is pulled away from the optical element 103, the straddle mount signal leads 201 decouple from the receiver contacts 203. The formed signal leads 205 also decouple from the header signal vias 207. A replacement printed circuit board assembly 411 is then coupled to the optical element 103 as discussed above. After which the fiber optic module 100 (the optical element 103 coupled to the replacement printed circuit board assembly 411) can be inserted with the connecting sequence occurring as discussed above.

The previous detailed description describes the fiber optic module 100 as including one receiver and one transmitter. However, one of ordinary skill can see that the fiber optic module 100 may include two or more combinations of vertically stacked receivers, or transmitters, or receivers and transmitters. One embodiment of the invention includes four vertically stacked transmitters. Another embodiment includes four vertically stacked receivers. Yet another embodiment includes a combination of four vertically stacked transmitters and receivers.

Furthermore, as one of ordinary skill can see, the positions of the receiver printed circuit board 250 and the transmitter printed circuit board 200 may be reversed. In this embodiment of the invention, the transmitter printed circuit board 200 has the cutout 209 creating a distance 211 for the formed signal leads 205 of the light receiver 111. The formed signal leads 205 of the light receiver 111 couple to the header signal vias 207 on receiver printed circuit board 250. The straddle mount signal leads 201 of the light transmitter 110 couple to contacts on the transmitter printed circuit board 200. In this embodiment, the electrical components 227 and 229 are on opposite surfaces of the printed circuit boards 250 and 200 so that the ground planes 213 and 215 provide electromagnetic shielding to the electrical components 227 and 229.

In another embodiment of the invention, the transmitter printed circuit board 200 includes the male electrical connector 235. Receiver traces 249 of the transmitter printed circuit board 200 couple receiver pins 245 of the male electrical connector 235 to the interconnect vias 225. The interconnect vias 225 couple the receiver traces 249 of the transmitter printed circuit board 200 to receiver traces 249 of receiver printed circuit board 250 for coupling to receiver electrical components 227. The transmitter printed circuit board 200 also includes a portion that protrudes from the outer housing 400 and that includes the male electrical connector 235, thereby allowing the male electrical connector 235 to couple to an external female electrical connector.

One aspect of the invention provides a push-button release mechanism and easy withdrawal mechanism for removable or pluggable fiber optic modules which are coupled into a module receptacle or cage assembly. Additionally, a piggy-back or belly-to-belly fiber optic module configuration is provided. The quick release is a mechanical device for de-latching or unplugging a fiber optic module from a module receptacle or cage assembly. The invention is particularly applicable to de-latching or unplugging an SFP fiber optic module from an SFP cage assembly or module receptacle. The invention provides a set of mechanical devices designed to enhance the de-latching and withdrawing process of removable or pluggable fiber optic modules from cages or receptacles. The mechanical devices include three main components consisting of (1) a kicker-actuator, (2) a withdrawal tab, and (3) a nose grip.

To de-couple a pluggable fiber optic module from a cage or module receptacle, the pluggable fiber optic module is de-latched or unlatched and unplugged from any sockets or connectors of the cage or module receptacle.

Figure 7A:
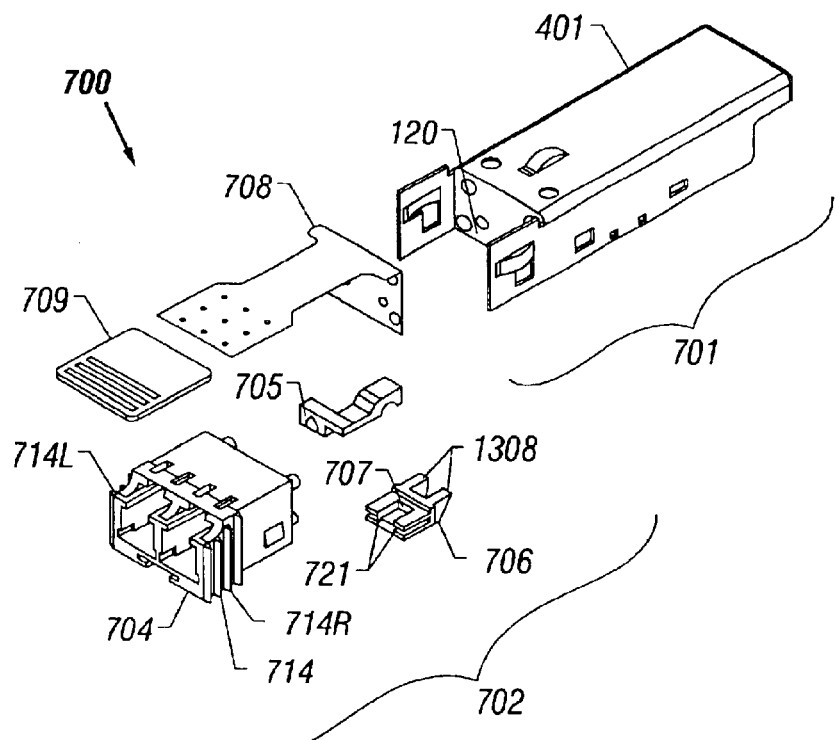
FIGS. 7A–7D are views of a disassembled fiber optic module of embodiments of the invention.

Referring now to FIG. 7A, a disassembled pluggable fiber optic module 700 is illustrated. Fiber optic module 700 is a pluggable or removable type of fiber optic module in that it can slide in and out into a cage or receptacle having a electrical connector and coupled there to or decoupled therefrom. The pluggable fiber optic module 700 is push button releasable and includes an electro-optical sub-assembly 701 and a mechanical sub-assembly 701 and a mechanical sub-assembly 702. The mechanical sub-assembly 702 couples to the optical block 120 of the electro optical sub-assembly 701.

In one embodiment, the fiber optic module 700 is an SFP module and the cage assembly or module receptacle into which it plugs is an SFP cage assembly or SFP module receptacle. Otherwise, the fiber optic module incorporating the invention can be any type of pluggable fiber optic module.

Portions of the electro-optical sub-assembly 701 of the fiber optic module 700 are previously described herein with reference to FIGS. 1–6F.

The mechanical sub-assembly 702 includes a nose receptacle 704, a kicker-actuator 705 (also referred to as push button), an actuator 706, a withdraw tab 708 with an optional pull grip 709. The kicker-actuator 705 serves as an extension arm to the actuator 706. In one embodiment, the actuator 706 is an SFP actuator.

The nose receptacle receives one or more fiber optic connectors from which an optical fiber may be attached. The nose receptacle 704 aligns ends of the fiber optic cables with optical openings therein. In one embodiment, the nose receptacle 704 is an SFP receptacle to receive a duplex SFP fiber optic connector.

Figure 7B:
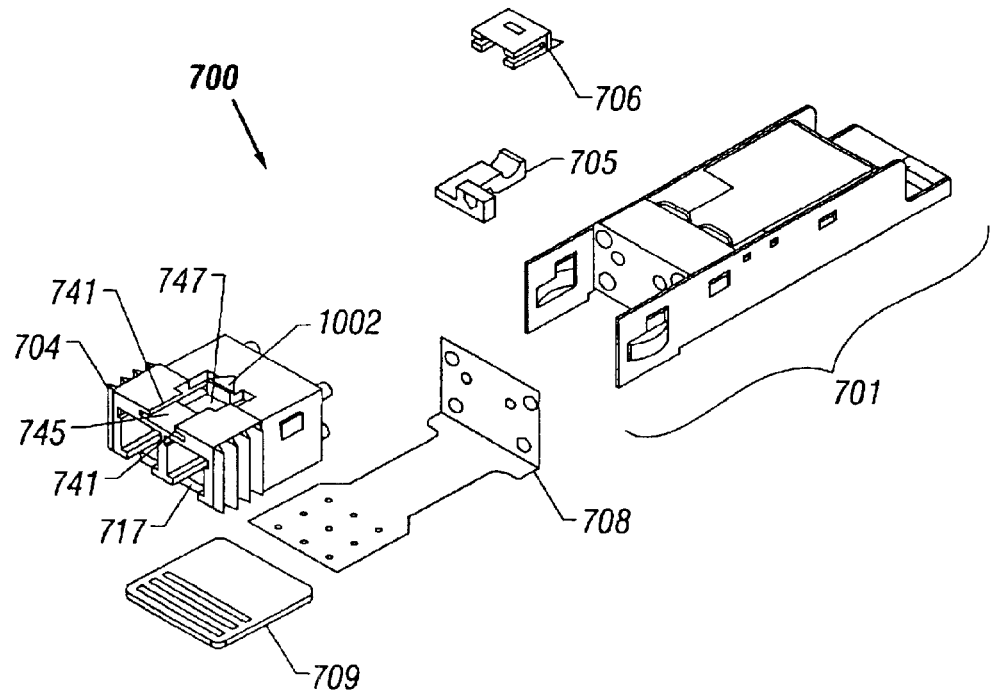

Referring now to FIG. 7B, a view from the bottom of the disassembled fiber optic module 700 is illustrated. The bottom side of the nose receptacle 704 includes a boss 1002, an opening 745 having a pair of tangs 741 on opposite sides thereof and a rib or septum 747. The catch or boss 1002 interfaces to a latch of the cage or receptacle. The opening 745 in the nose receptacle 704 is for slideably engaging with the actuator 706 for releasing the boss 1002 from a latch and freeing the fiber optic module from a cage or receptacle. The actuator when assembled slides over the rib or septum 747. The rib or septum 747 can provide slideable support to the actuator 706 to allow it to push out on the latch while the tangs can provide slideable guidance in movement of the kicker-actuator 705 and the actuator 706.

Figure 7C:
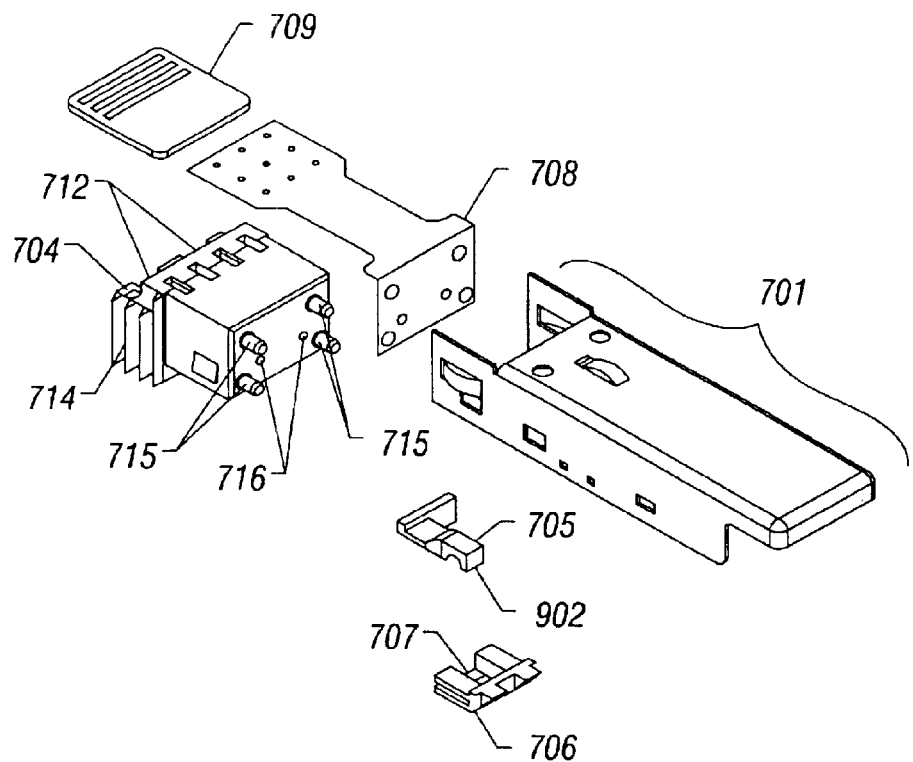
Figure 7D:
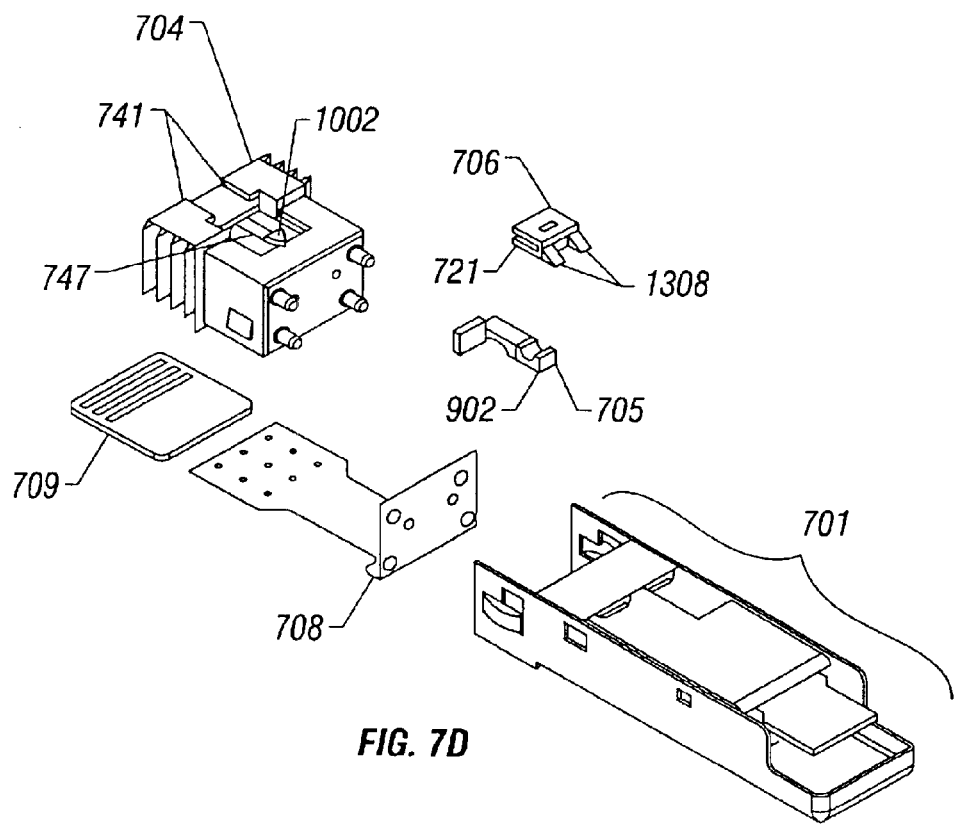

FIGS. 7C and 7D provide additional top and bottom views of the disassembled fiber optic module 700 illustrated from a different angle. Viewable in FIG. 7D, the actuator 706 includes one or more ramps or wedges (a pair of which are illustrated) 1308, slot or grooves 721 on each side having an opening at one end and a closure at an opposite end. The slot or grooves 721 slideably engage the tangs 741 in the nose receptacle 704.

Referring now to FIGS. 7C and 7D, the kicker-actuator 705 has a hook 902 to hook onto the actuator 706 by mechanical means. The actuator 706 includes an opening 707 into which the hook 902 of the kicker actuator 705 may couple in order to couple them together.

The nose receptacle 704 includes a nose grip 714 at its sides, alignment pins 715 and optical openings 716 at a front side and one or more fiber plug openings 717 at a back side. In one embodiment, the nose grip 714 has a left side 714L and a right side 714R including vertical ribs near the front around the openings of the fiber optic receptacles. The nose grip serves as the additional gripping area during the withdrawal process of the fiber optic module. The nose grip 714 includes one or more vertical ribs on the nose receptacle. The one or more vertical ribs increase pressure between gripping fingers and hence prevent slippage during handling. The nose grip 714 is an integrated part of the nose receptacle 704 and can be formed of similar materials.

Figure 7E:
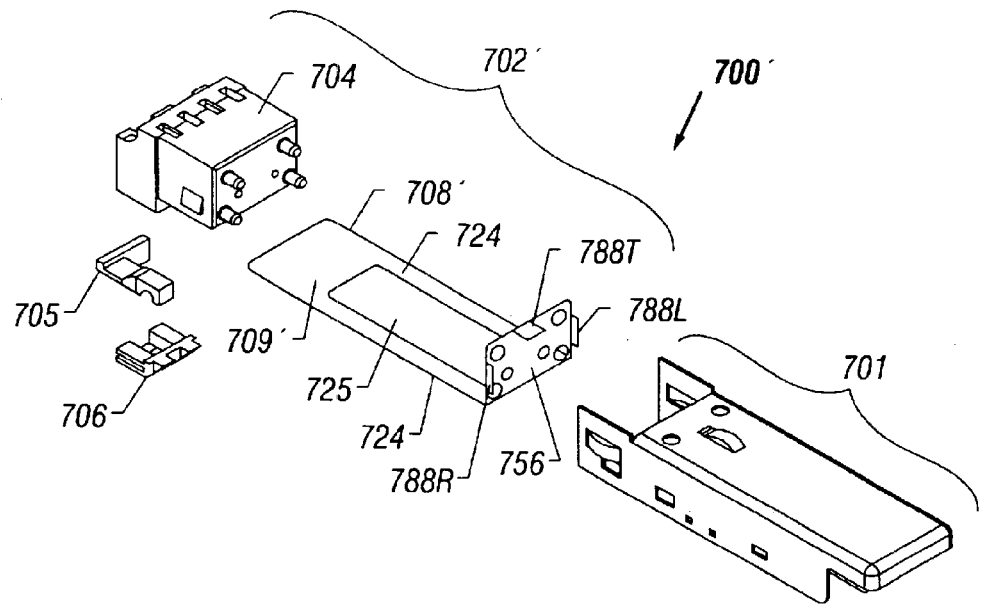
FIGS. 7E–7F are perspective views of a disassembled fiber optic module of another embodiment of the invention illustrating an alternate embodiment of a withdrawal tab.
Figure 7F:
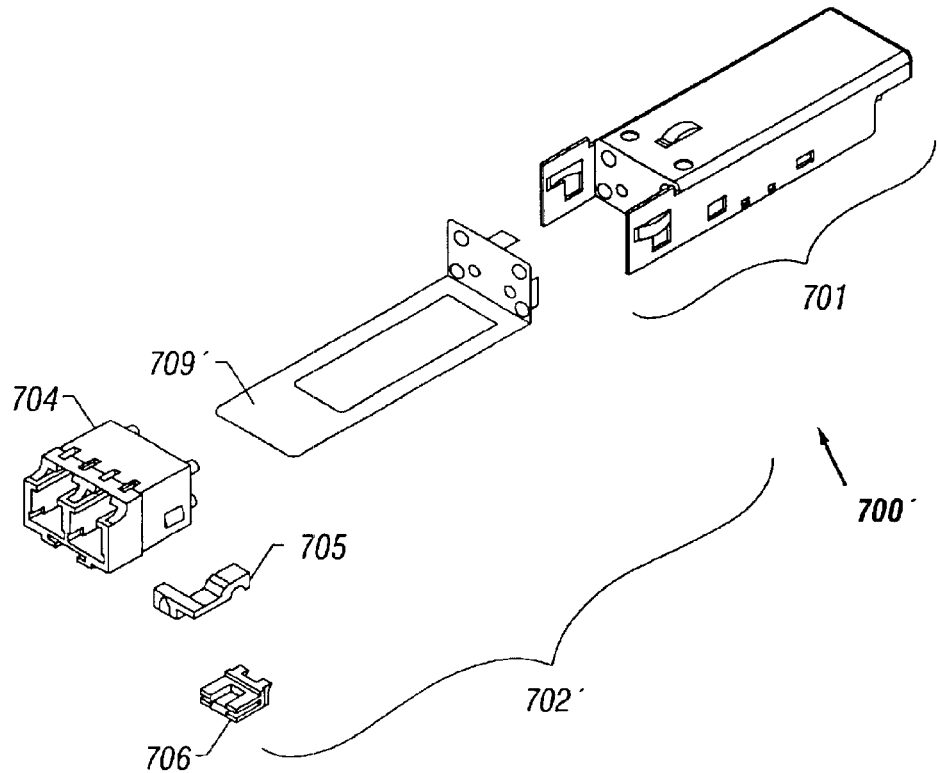

FIGS. 7E–7F illustrate an alternate fiber optic module 700' hating an alternate embodiment of a withdrawal tab 708'. The fiber optic module includes the alternate mechanical subassembly 702' with the alternate withdrawal tab 708'. The withdrawal tab 708 described with reference to FIGS. 7A–7D was coupled to the nose receptacle and extended across the top surface of the fiber optic module 700. A user would pull on the withdrawal tab 708, extending across the top surface or plane of the fiber optic module, to withdraw the fiber optic module. In the embodiment shown in FIGS. 7E–7F, the withdrawal tab 708' couples between the optical block and the nose receptacle and extends from the bottom surface of the fiber optic module 700'. A user pulls on the withdrawal tab 708', extending across the bottom surface or plane of the fiber optic module, to pull the fiber optic module out from a cage or receptacle. The withdrawal tab 708' includes a pull area 709' that may optionally include a pull grip, a pair of arms 724 joined around an opening 725 and an EMI shield or plate 756. The opening 725 provides for the kicker-actuator 705 and the actuator 706 to extend through it and slide back and forth in the nose receptacle 704 when assembled together. The EMI shield or plate 756 includes optical openings and alignment openings similar to the EMI shield 806 discussed further below and includes one or more grounding tabs 788. Alternatively, the withdrawal tab 708' may be non-conductive and not include the grounding tabs 788.

Figure 7G:
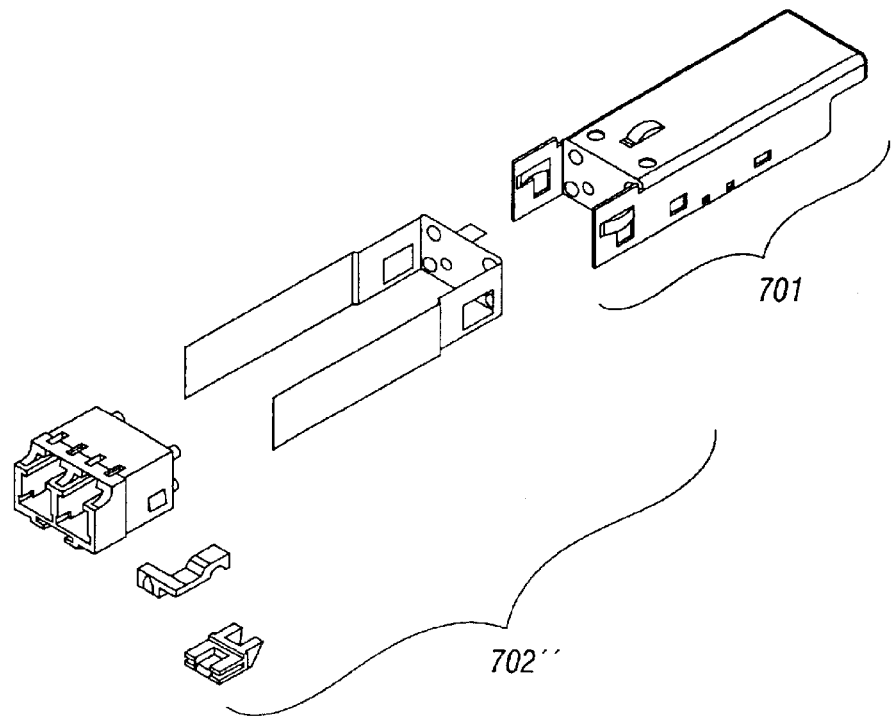
FIGS. 7G–7H are perspective views of a disassembled fiber optic module of another embodiment of the invention illustrating another alternate embodiment of a withdrawal tab.
Figure 7H:
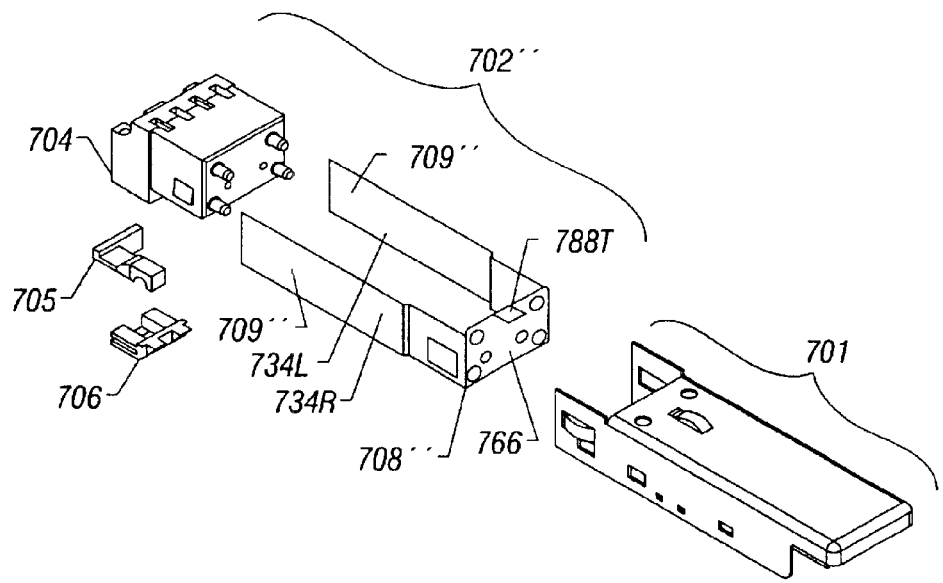
Figure 10A:
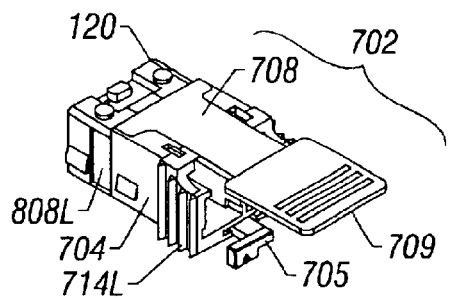
FIGS. 10A–10G are views of a subassembly of the fiber optic modules of FIGS. 7A–7D illustrating the pull-actuator of FIGS. 8A–8G and the kicker-actuator of FIGS. 9A–9I assembled to the nose receptacle.
Figure 10B:
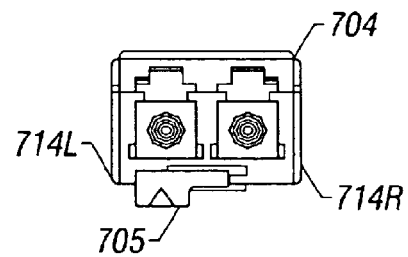
Figure 10C:
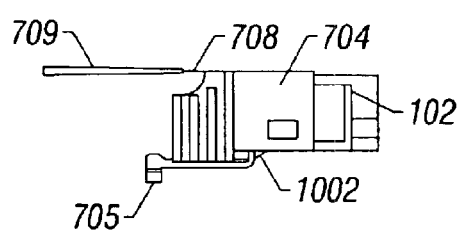
Figure 10D:
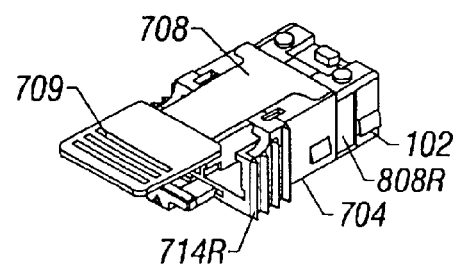
Figure 10E:
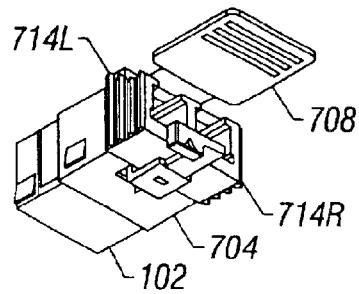
Figure 10F:
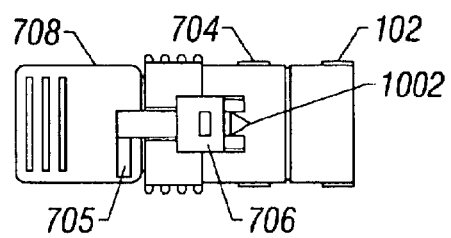
Figure 10G:
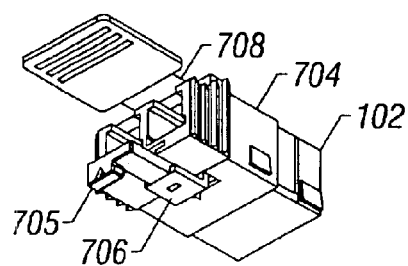

FIGS. 7G–7H illustrate an alternate fiber optic module 700" having an alternate embodiment of a withdrawal tab 708". The fiber optic module includes the alternate mechanical subassembly 702" with the alternate withdrawal tab 708". The withdrawal tab 708 described with reference to FIGS. 7A–7D coupled to the nose receptacle at the top of the fiber optic module 700 and a user pulled from the top. The withdrawal tab 708" couples between the optical block and the nose receptacle and extends from one or both sides of the fiber optic module 700". A user pulls on the withdrawal tab 708" from one or both sides of the fiber optic module to pull it out from a cage or receptacle. The withdrawal tab 708" includes one or two pull areas 709" that may optionally include a pull grip, a left pull arm 734L, a right pull arm 734R or both, and an EMI shield or plate 766. The EMI shield or plate 766 includes optical openings and alignment openings similar to the EMI shield 806 discussed further below and includes one or more grounding tabs 788. Alternatively, the withdrawal tab 708" may be non-conductive and not include the grounding tabs 788.

Referring now to FIGS. 8A–8G, views of a withdrawal tab 708 with the optional pull grip 709 are illustrated. The withdrawal tab 708 may include an arm 804, an EMI shield 806, and grounding tabs 808. Alternatively, the EMI shield 806 can be replaced by a similar shaped non-conductive plate without grounding tabs 808. The withdrawal tab 708 may also be referred to as a pull actuator. The withdrawal tab 708 has a paddle area 802 coupled to the arm 804 which couples to the optional pull grip 709.

In one embodiment, the withdrawal tab 708 is a flexible protruding handle that serves as the pull-out tab for users during the withdrawal of the fiber optic module. The withdraw tab 708 extends out from the fiber optic module to provide an easy reach and grip to a user. The withdrawal tab 708 may further include the optional pull grip 709 to prevent slippage during handling. The optional pull grip 709 may be formed of a rubber or plastic material.

The arm 804 can be flexed or folded up with minimal effort. Additionally, the arm 804 avoids the withdrawal tab from obstructing optical connectors during the insertion of the fiber optic module. The arm 804 can be formed out of sheet metal, rubber sheet or plastic sheet materials. The optional pull grip 709 can be injection molded by using a rubber or plastic resin.

The withdrawal tab 708 can itself provide an EMI shield 806, a vertical component, that rests between a nose receptacle 704 and an optical block or port 120 (as shown in FIGS. 10A–10E). As the name implies, the EMI shield 806 has a shielding ability to cut off EMI emitting from the front of the nose receptacle of the fiber optic module. The EMI shield 806 includes one to four grounding tabs 808 that provide additional guarding of EMI emission around the EMI shield. The grounding tabs 808 also provide grounding links or contacts between the EMI Shield 806 and the cage assembly or module receptacle. In typical cases, the cage assembly or module receptacle is grounded.

Referring now to FIG. 8C, the EMI shield 806 includes alignment pin openings 812 to allow alignment pins 715 of the nose receptacle 704 to poke through. The EMI shield 806 further includes a first optical opening 814 for a first opto-electronic device and a second optical opening 816 for a second opto-electronic device. One of the optical openings may be larger than the other to allow for an entrance angle of light or photons for a receiving opto-electronic device.

Referring now to FIGS. 9A–9I, the kicker-actuator 705 is illustrated in detail. The kicker-actuator 705 is also referred to as a push button. The kicker-actuator 705 includes a snap on hook 902, an arm or push rod 904, and an offset push tab or button 906. The offset push tab or button 906 can include an orientation indicator 908. In one embodiment, the offset push tab or button 906 is offset of the center of the push rod 904 to provide clearance for belly-to-belly mounting configurations described further below. The hook 902 is at one end of the arm while the off set push tab 906 is at the opposite end of the arm 904. The push rod 904 can include a depression so that it clears a corner of the nose receptacle during assembly. The subassembly of the actuator 706 and kicker-actuator 705 are inserted into the nose receptacle 704 on an angle and snapped into place to slideably engage the nose receptacle 704. The kicker-actuator 705 can be formed out of epoxy, thermoplastic, rubber or metal.

The off-set push tab 906 is characterized by its L-shape cross-section. The snap-on-hook 902 is a locking mechanism for securing the kicker-actuator 705 on the actuator 706. The orientation indicator 908 is arrow-shaped on the front face of the off-set-push tab 906 to indicate which fiber optic module it releases.

Referring now to FIGS. 10A–10G, an assembled mechanical sub-assembly 702 is assembled together with the optical block 120. The optical block 120 and the nose receptacle 704 coupled together sandwiching an EMI shield tab 806 or a plate of the withdrawal tab 708 there between. The ground tabs (808L and 808R) wrap around and onto the optical block 120. The non-conductive plate of the withdrawal tab needs no ground tabs. The kicker-actuator 705 is coupled to the actuator 706 which is in turn coupled to the nose receptacle 704. In order to couple the kicker actuator 705 and the actuator 706 together, the snap on hook 902 of the kicker-actuator 705 couples into the opening 707 of the actuator 706. This is then snapped into the bottom side of the nose receptacle 704.

The kicker-actuator 705 extends out from the front edge of the nose receptacle and thus is visible to end-users and as well as accessible so that it can be pushed inward. The kicker-actuator 705 and the actuator 706 provide a de-latching mechanism for the fiber optic module 700. A force exerted inward on the kicker-actuator 705 is utilized to de-latch the fiber optic module 700.

The withdraw tab 708 and the nose grip (714L and 714R) provide a withdrawal mechanism for the fiber optic module 700.

Figure 11D:
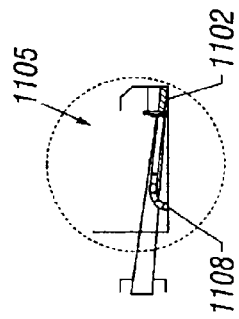
FIGS. 11A–11E are views of an exemplary cage assembly or module receptacle for fiber optic modules.
Figure 11E:
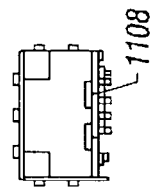
Figure 11A:
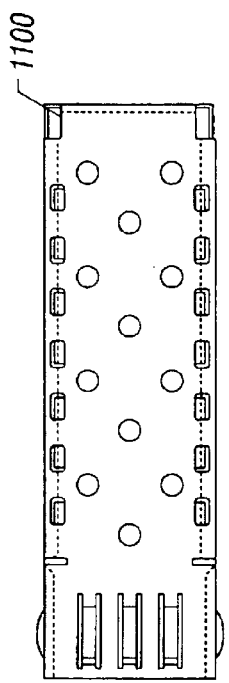
Figure 11B:
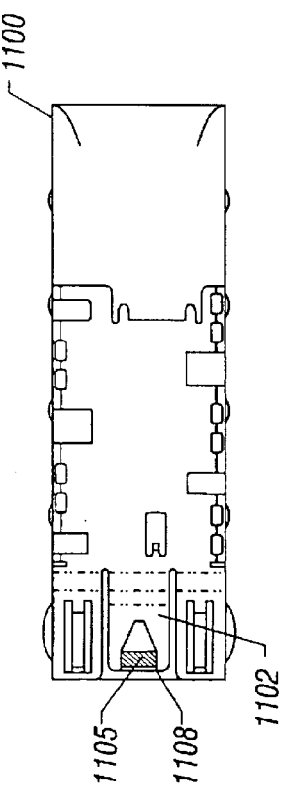
Figure 11C:
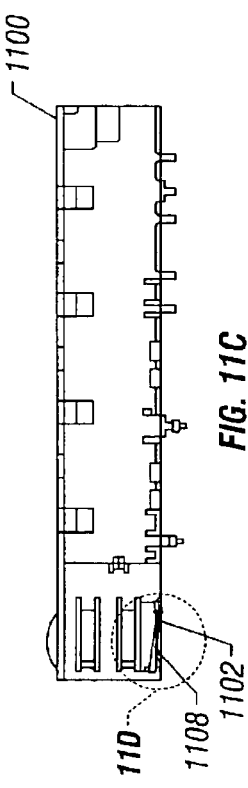

Referring now to FIGS. 1A–11E, views of an exemplary cage assembly or module receptacle 1100 for fiber optic modules is illustrated. In FIG. 11B, the latch 1102 is illustrated in a bottom view of the module receptacle 1100. The latch 1102 includes a catch 1105 that mates with the hook or boss 1002. As illustrated in the cross sectional view of FIG. 11C and the exploded cross-sectional view of FIG. 11D, the latch 1102 is flexed downward in order to release the fiber optic module. The actuator 706 flexes the latch 1102 downward when a force is exerted on the kicker-actuator or push button 705. A ramp of the kicker-actuator 705 meets a lip 1108 of the latch 1102 which is bent on an angle and then flexes the latch 1102 outward so that the catch 1105 is released from the hook or boss 1002. This release mechanism and method is described further below.

Figure 12:
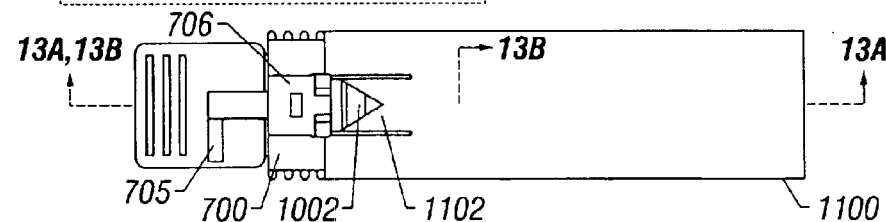
FIG. 12 is a bottom view of a system of the push button releasable fiber optic module engaged with the exemplary cage assembly or module receptacle for FIGS. 11A–11E.

Referring now to FIG. 12, fiber optic module 700 is inserted into the cage or receptacle 1100. FIG. 12 illustrates a bottom view showing the latch 1102 and the boss 1002 of the nose receptacle 704. The boss 1002 engages into the catch or opening 1105 of the latch 1102.

Figure 13A:
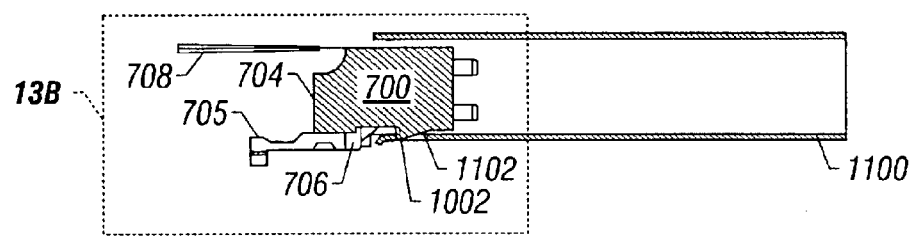
FIGS. 13A–13B are cross-section views of the system of FIG. 12 with the push button release in a latched or steady state.
Figure 13B:
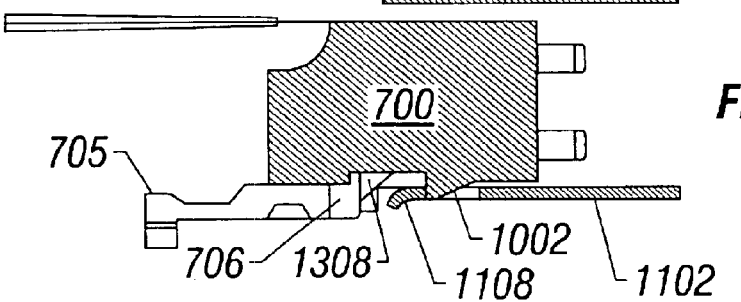

Referring now to FIGS. 13A and 13B, cross sections of the fiber optic module 700 inserted into the cage or receptacle 1100 are illustrated. The boss 1002 extends through the opening 1105 to be engaged with the latch 1102. In FIGS. 13A and 13B, the kicker-actuator 705 is in an un-pushed or steady state. The spring tension in the latch 1102 tends to move the kicker-actuator 705 into this state. The actuator 706 includes one or more ramps 1308 that engage the lip 1108 of the latch 1102 of the cage or receptacle 1100. The ramps 1308 slideably engage the lip 1108 and pushes out on the latch 1102 therefrom. In the case of the boss 1002, a pair of ramps 1308 are used so that they can slide over it and continue pressing out on the latch.

Figure 14A:
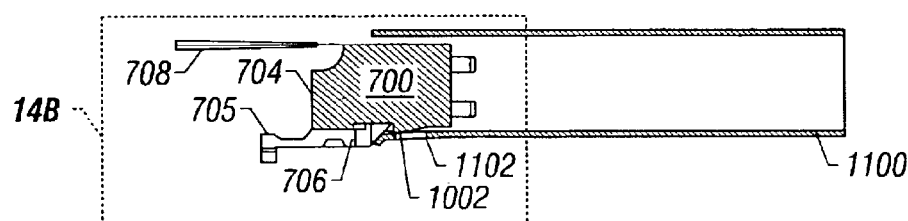
FIGS. 14A–14B are cross-section views of the system of FIG. 12 with the push button release depressed and de-latching the fiber optic module from the cage assembly or receptacle module.
Figure 14B:
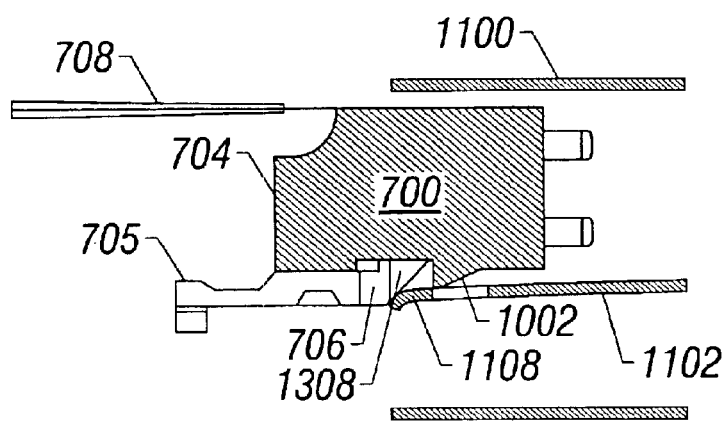

Referring now to FIGS. 14A and 14B, cross section similar to that of FIGS. 13A and 13B are illustrated but for the kicker-actuator 705 being depressed to disengage the latch 1102 from the boss 1002. In this case the opening 1105 of the latch 1102 is not engaged with the boss 1002 of the nose receptacle.

Referring now to FIG. 14B, the kicker-actuator 705 is pushed in or depressed. By pushing in on the off-set push tab 906, the kicker-actuator 705 directs the actuator 706 to the de-latching position, allowing the fiber optic module 700 to be disengaged from the cage or receptacle 1100. As illustrated in 14B, the kicker-actuator 705 pushes in on the actuator 706 causing the one or more ramps 1308 to push out on the lip 1108 and release the latch 1102 from around the boss 1002. With the catch or opening 1105 in the latch 1102 disengaged, the fiber optic module 700 can be pulled out from the cage or receptacle 1100. The fiber optic module 700 can be pulled out by using the withdrawal tab 708 and/or the nose grip (714L and 714R).

Figure 15:
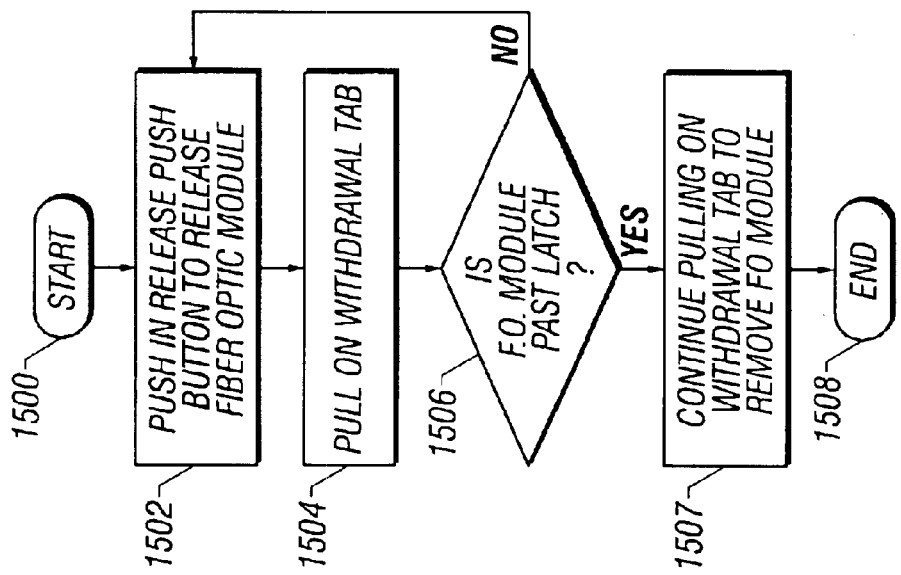
FIG. 15 is a flow chart diagram of a method of releasing a fiber-optic module.

Referring now to FIG. 15, a flow chart diagram is illustrated of a method of releasing a fiber-optic module that includes an embodiment of the invention. The method begins at step 1500 (i.e. start) using a fiber-optic module, such as fiber optic module 700 for example, that includes an embodiment of the invention which is inserted into a module cage or receptacle, such as the cage or receptacle 1100 for example. The method then jumps to step 1502. At step 1502, a user pushes in on the release push-button or kicker-actuator 705 disengaging the latch 1102 of the cage or receptacle 1100 from the boss 1002 of the fiber optic module 700 for example. At step 1504, the user then pulls out on the fiber-optic module using a pull mechanism such as the withdrawal tab 708 or the nose grip (714L and 714R) of the nose receptacle to begin pulling out the fiber optic module. At the next step, step 1506, a check is made whether the boss 1002 of the fiber optic module has cleared the key or latch 1102. If past, the method jumps to step 1507 where a user continues to pull out on the fiber optic module until completely removed and the method ends at step 1508. If not past the latch 1102, the method jumps back to step 1502 where a user continues to push in on the release push button or kicker-actuator 705 and continues to pull out on the fiber optic module at step 1504.

Figure 16:
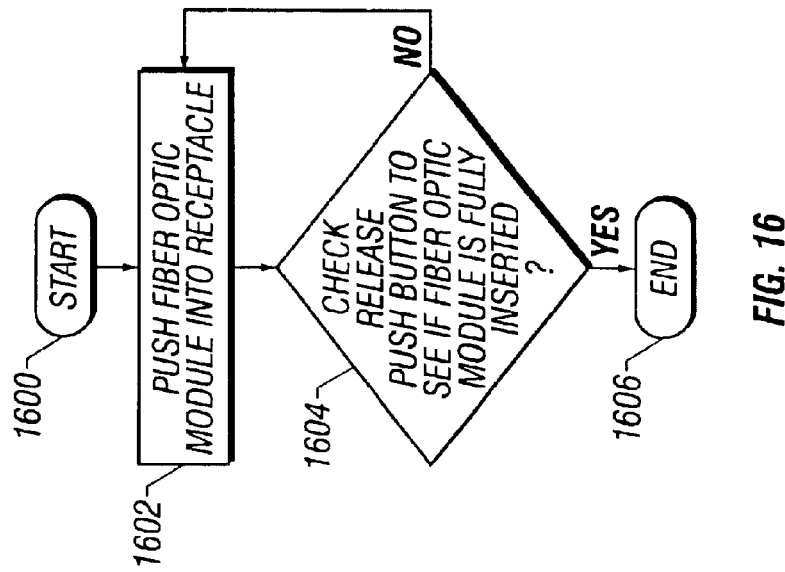
FIG. 16 is a flow chart diagram of a method of inserting a fiber-optic module.

Referring now to FIG. 16, a flow chart diagram is illustrated of a method of engaging a fiber-optic module that includes an embodiment of the invention into a cage or receptacle. The method begins at step 1600 (i.e. start) using a fiber-optic module that includes the invention. The method then jumps to step 1602. At step 1602, the fiber-optic module is inserted and pushed into an opening in a module cage or receptacle. At step 1604, a check is then made to determine whether the fiber optic module is fully inserted into the cage or receptacle. An indicator is the push button or kicker-actuator 705. If the push-button or kicker-actuator 705 is fully out, it is an indication that the fiber optic module is fully inserted. If the fiber optic module is not fully inserted, the fiber optic module needs to be pushed in further into the module cage or receptacle at step 1602 so that the latch 1102 engages the boss 1002. If the fiber optic module is fully inserted, the method jumps to step 1606 where the method ends.

It is desirable to include/increase the density of fiber optic modules in a system. Another way of doing so is to place fiber optic modules in a belly-to-belly mounting configuration on opposite sides of a host printed circuit board.

Figure 17A:
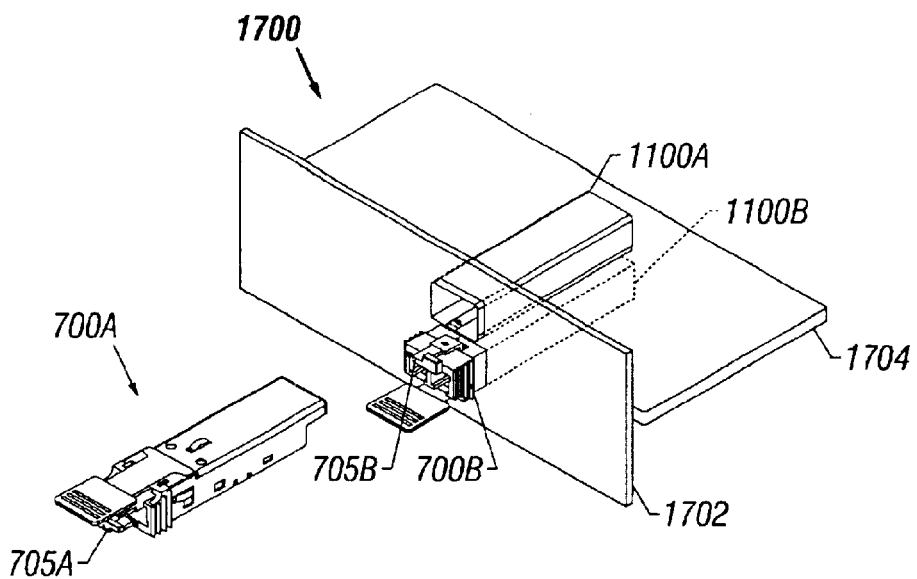
FIG. 17A is a perspective view of a fiber optic system with a belly-to-belly mounting configuration with the top fiber optic module removed.
Figure 17B:
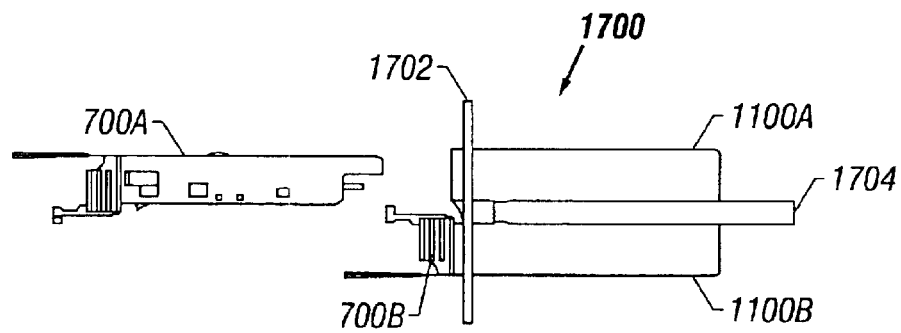
FIG. 17B is a side view of the fiber optic system with a belly-to-belly mounting configuration of FIG. 17A.
Figure 17C:
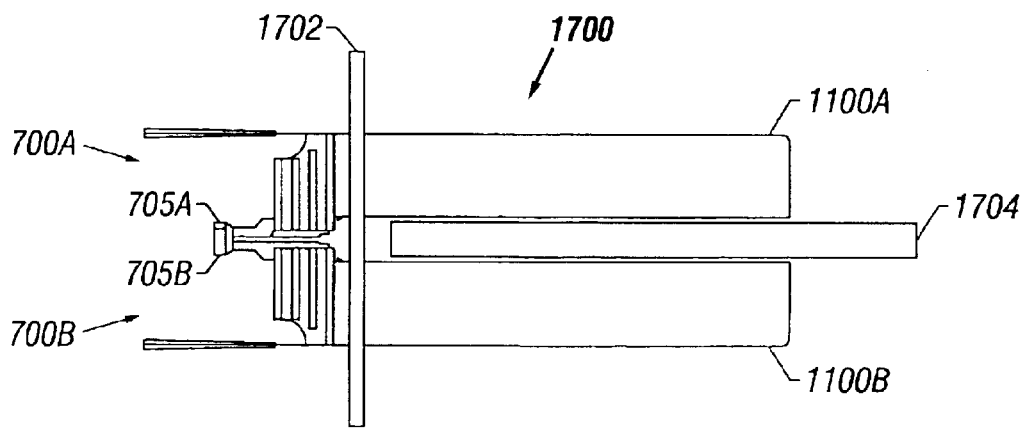
FIG. 17C is a side view of the fiber optic system with a belly-to-belly mounting configuration of FIG. 17A with the top fiber optic module inserted.
Figure 17D:
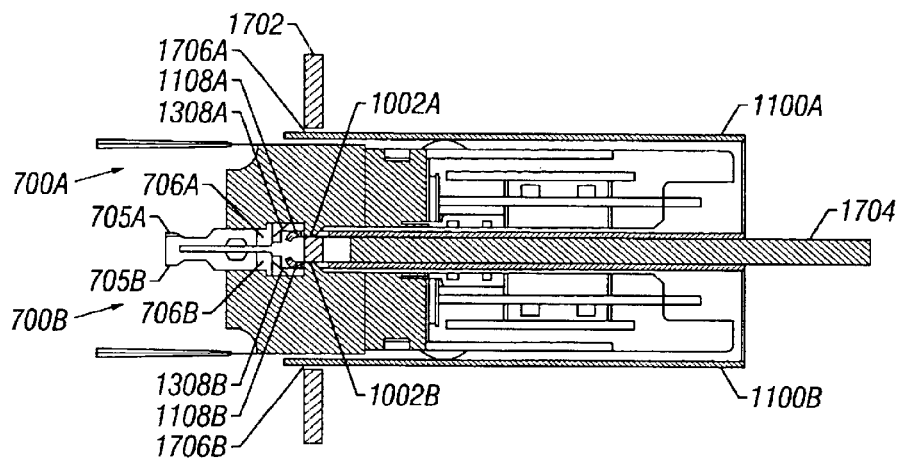
FIG. 17D is a cross-section view of the fiber optic system with a belly-to-belly mounting configuration of FIG. 17C with the top fiber optic module inserted.
Figure 18A:
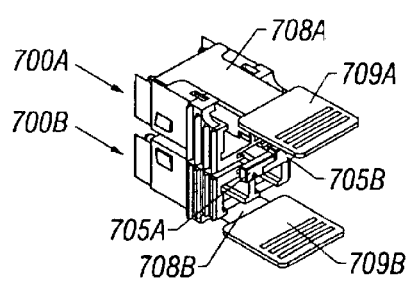
FIGS. 18A–18D illustrate various views of a subassembly of a pair of fiber optic modules in a belly to belly mounting configuration.
Figure 18B:
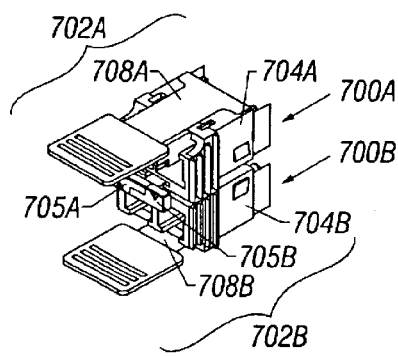
Figure 18C:
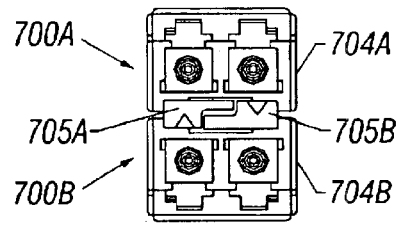
Figure 18D:
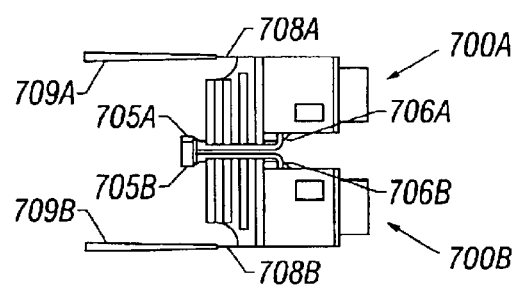
Figure 19A:
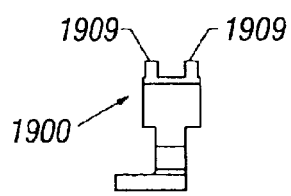
FIGS. 19A–19F illustrate various views of an integrated push button actuator for another embodiment of the invention.
Figure 19B:
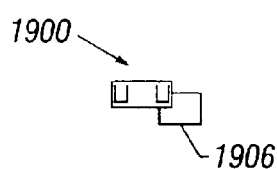
Figure 19C:
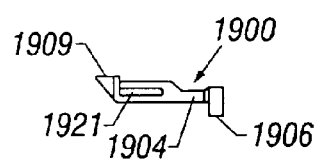
Figure 19D:
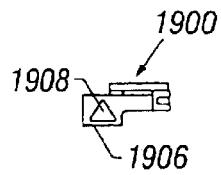
Figure 19E:
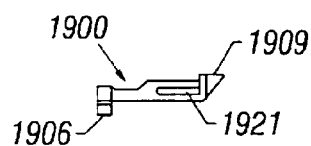
Figure 19F:
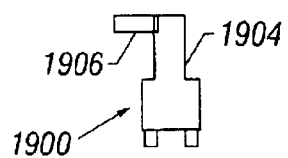
Figure 20A:
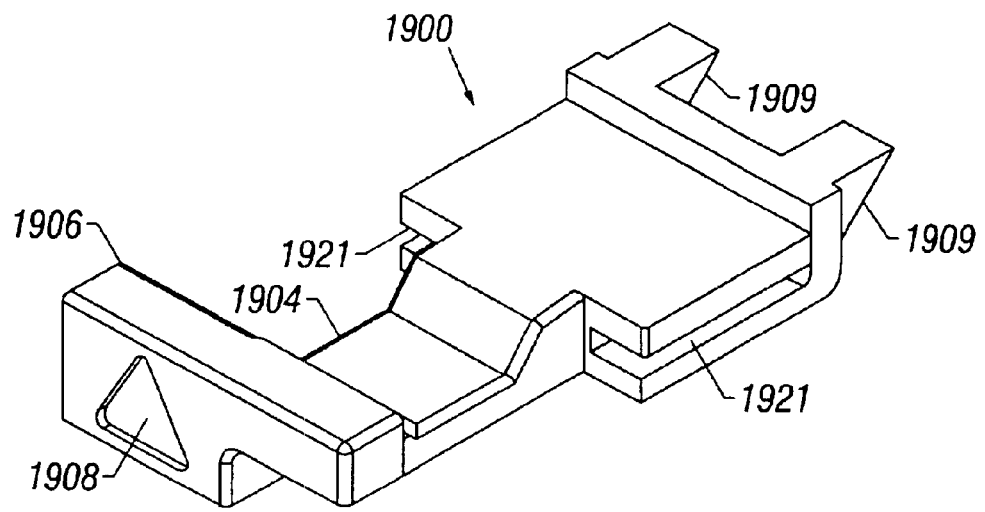
FIGS. 20A–20D illustrate various magnified views of the integrated push button actuator of FIGS. 19A–19F.
Figure 20B:
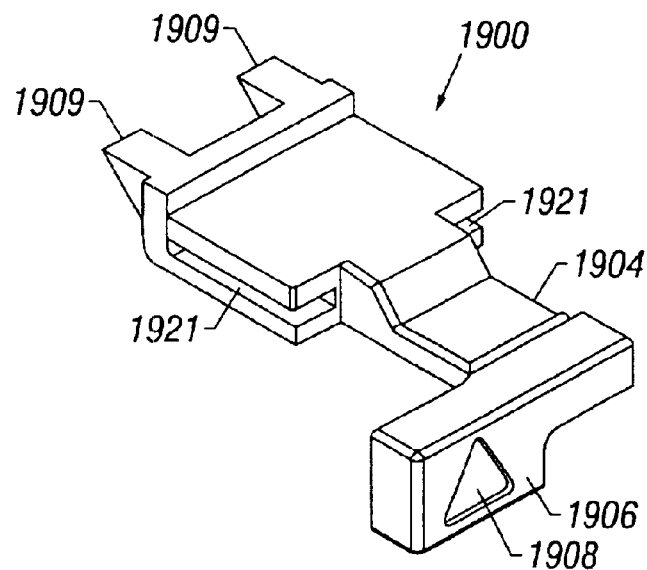
Figure 20C:
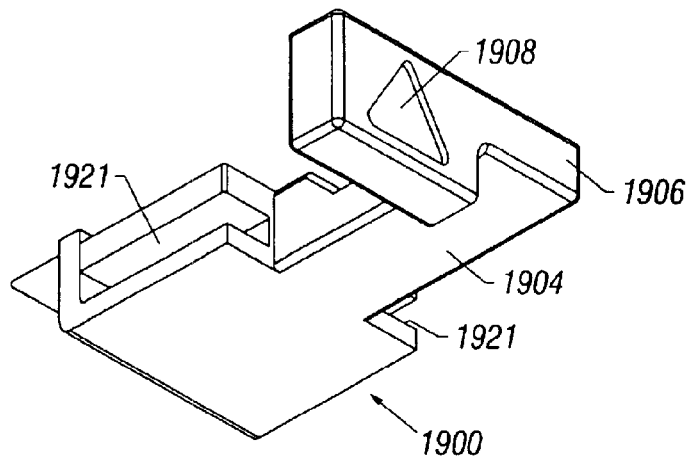
Figure 20D:
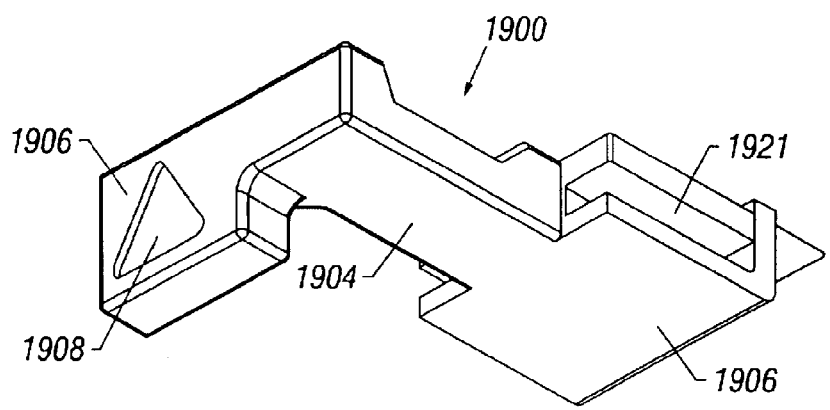

Referring now to FIGS. 17A–17C, such a high density fiber optic system 1700 is illustrated providing a belly-to-belly mounting configuration. System 1700 includes a face plate or bezel 1702, and a host printed circuit board 1704. For a belly to belly configuration of fiber optic modules, the bezel or face plate 1702 includes one or more openings 1706A–1706B therein in order to allow fiber optic cables to interface to the fiber optic modules, or in case of pluggable fiber optic modules such as fiber optic modules 700A and 700B, the openings 1706A–1706B in the bezel or face plate 1702 also allow the insertion and removal of the fiber optic modules themselves. The kicker-actuator 705 facilitates easy removal of the fiber optic module 700A and 700B when in a belly-to-belly configuration. The kicker-actuator 705A of the fiber optic module 700A and the kicker-actuator 705B of the fiber optic module 700B meet together when both fiber optic modules are inserted into the respective receptacles or cage assembles 1100A and 1100B. The cage receptacles 1100A and 1100B sandwich the host printed circuit boards 1704. While only two fiber optic modules are illustrated in FIG. 17A in a belly-to-belly configuration, it is understood that additional fiber optic modules can be arrayed out as belly-to-belly configured fiber optic modules side by side in the system 1700 so that a plurality of fiber optic modules 700 maybe inserted therein.

The respective kicker-actuator 705A and 705B mate together to form one button that can be utilized to de-latch out both fiber optic modules 700A ad 700B at one time.

Referring now to FIGS. 18A–18D, details of how the mechanical elements 702 of each of the fiber optic modules 700A and 700B come together in a belly-to-belly mounting configuration are illustrated.

The kicker-actuator 705A and the kicker-actuator 705B are interleaved with a small gap there-between to allow either one or both to be pushed individually or simultaneously to remove one or both fiber optic modules 700A and 700B. The orientation indicator (i.e. an arrow sign 908) on the front face of the off-set push tab 906 provides a clear indication as to which fiber optic module does each actuator-kicker 705 serve during a high density module mounting or a belly-to-belly mounting configuration. The kicker-actuator 705A has its orientation indicator 908A pointing upward towards fiber optic module 700A. The kicker actuator 705B has its orientation indicator 908B pointing downward towards fiber optic module 700B. In this manner the orientation indicator 908 indicates which of the two push buttons to release the respective fiber optic module 700A or 700B. Each of the respective kicker 705A and 705B couple to the respective actuator 706A and 706B of the fiber optic module 700A, 700B respectively.

The gap between actuators 706A and 706B is rather small (approximately 0.5 mm or less). Without the kicker-actuators 705A and 705B, it is difficult to access the respective actuators 706A and 706B. The design of the off-set push tab 906 enables the kicker-actuator 705 to be functional at such a close gap in mounting the fiber optic modules.

Referring now to FIGS. 19A–19F and FIGS. 20A–20D, views of an integrated push button actuator 1900 are illustrated. The integrated push button actuator 1900 includes features of the actuator 706 and the kicker-actuator 705 integrated into a single unit. The integrated push button actuator 1900 includes an actuating end 1906 having one or. more ramps 1909 at the end and slots or grooves 1921 at each side to slideably interface with the tangs 741 of the nose receptacle 704, an arm or push rod 1904, and a offset push tab 1906 that may have an orientation indicator 1908. The integrated push button actuator 1900 has no hook that needs to couple together the kicker actuator 705 into an opening in the actuator 706. Thus, the integrated push button actuator 1900 provides for lower assembly costs by reducing assembly steps. The integrated push button actuator 1900 need only be snapped into the tangs 741 of the nose receptacle of the fiber optic module for assembly thereto.

Figure 21A:
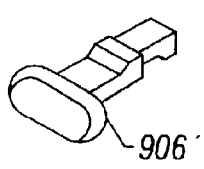
FIGS. 21A–21D illustrate various views of alternate push button embodiments for the actuators.
Figure 21B:
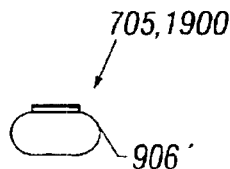
Figure 21C:
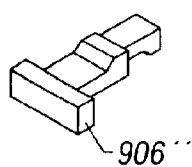
Figure 21D:
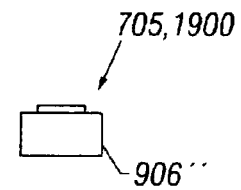

FIGS. 21A–21D illustrate alternate push button embodiments for the kicker actuator 705 and the integrated push button actuator 1900 without an offset for the belly-to-belly mounting configuration. FIGS. 21A–21B illustrates a round or oval push button 906' in line with the arm or push rod. FIGS. 21C–21D illustrate a rectangular or square shaped push button 906" in line with the arm or push rod.

Referring now to FIGS. 22A–22H, an alternative embodiment of a nose receptacle 2200, including a pull-actuator 2200 for fiber optic modules is illustrated. The pull-actuator or de-latch puller 2202 can be used to de-couple and remove the fiber optic module (only the nose receptacle 2200 portion is shown) by pulling the pull-actuator 2202 backwards or away from the nose receptacle 2200.

The nose receptacle 2200 may be incorporated as part of a fiber optic module or pluggable fiber optic module as previously illustrated in other embodiments described above (i.e., 100, 700, etc.).

Figure 22A:
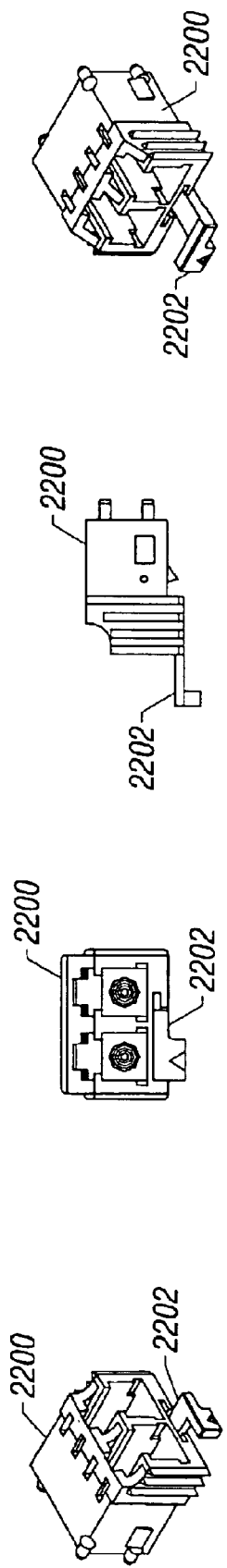
FIGS. 22A–22H illustrate various views of a subassembly of a nose receptacle and pull-actuator for another embodiment of the invention.
Figure 22B:
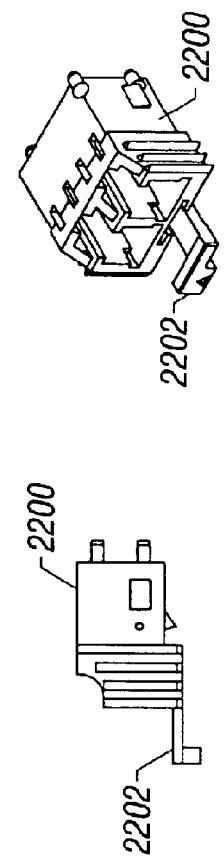
Figure 22C:
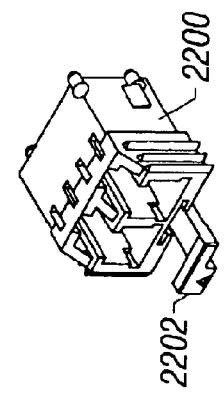
Figure 22D:
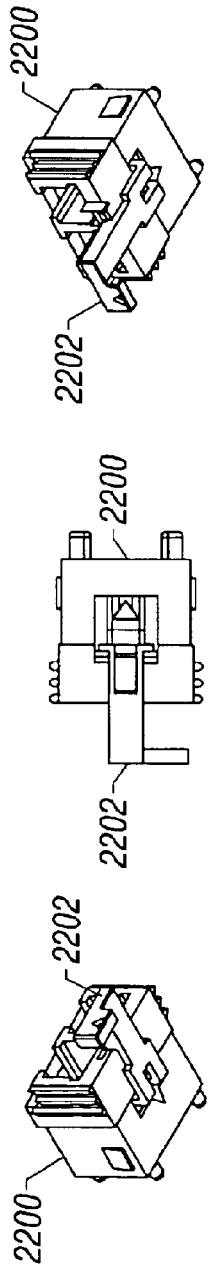
Figure 22E:
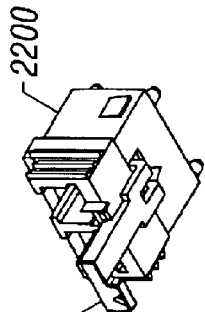
Figure 22F:
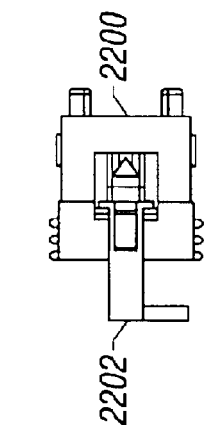
Figure 22G:
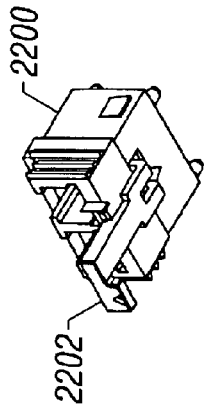
Figure 22H:
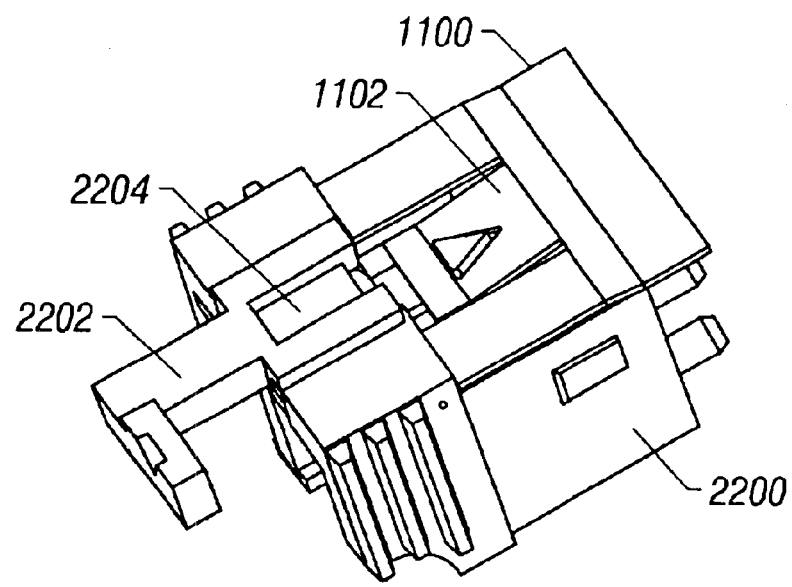

FIG. 22H illustrates how a fiber optic module (nose receptacle 2200 portion shown) may include the pull-actuator 2202 and a pivot-arm actuator 2204 to couple and decouple the fiber optic module to a cage assembly or module receptacle such as 1100 (only cage assembly latch portion 1102 is shown). When engaged, the pivot-arm actuator 2204 latches with the cage assembly latch 1102 to secure the fiber optic module to the cage assembly.

Figure 23:
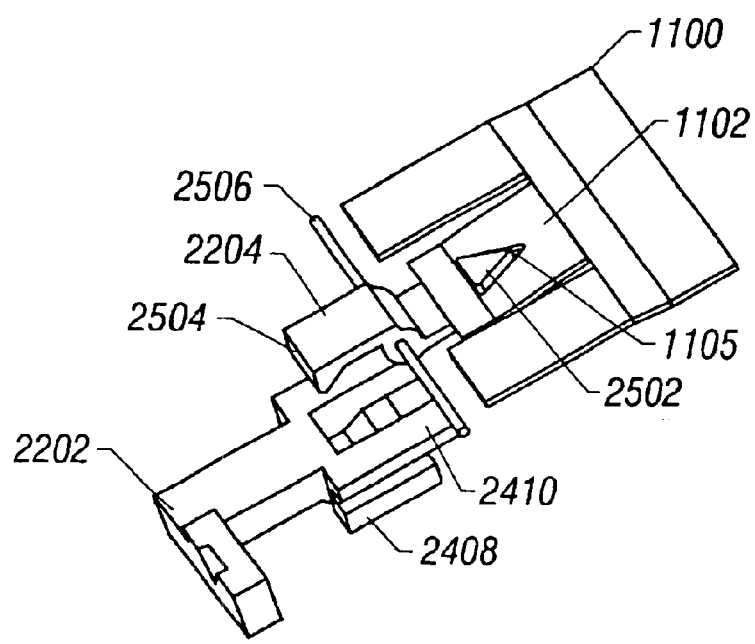
FIG. 23 illustrates a pull-actuator, pivot-arm actuator, and cage assembly latch for one embodiment of the invention.
Figure 25A:
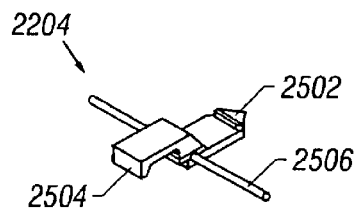
FIGS. 25A–25I illustrate various views of a pivot-arm actuator for one embodiment of the invention.
Figure 25B:
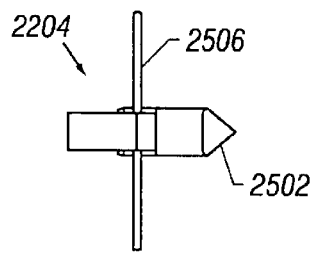
Figure 25C:
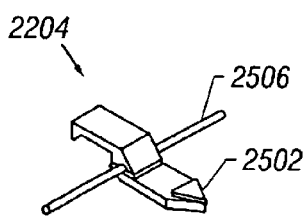
Figure 25D:
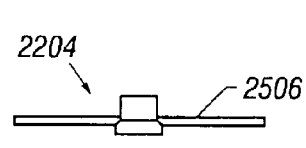
Figure 25E:
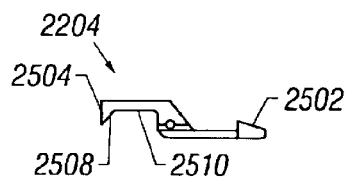
Figure 25F:
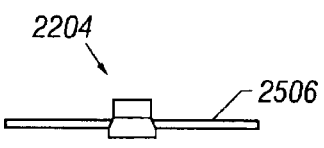
Figure 25G:
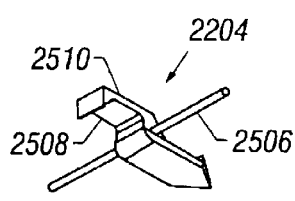
Figure 25H:
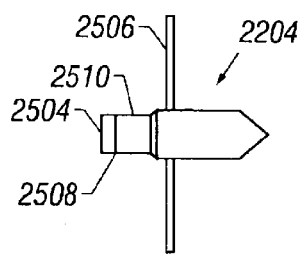
Figure 25I:
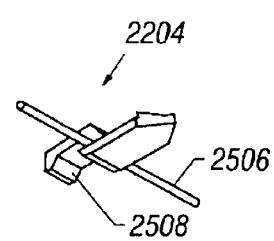

FIG. 23 further illustrates the pull-actuator 2202, pivot-arm actuator 2204 and cage assembly latch 1102. The pivot-arm actuator 2204 includes a latch key, keeper, pin, hook, or boss 2502 (these terms are herein used interchangeably) which engages with a catch or opening 1105 in the cage assembly latch 1102 to secure the fiber optic module to the cage assembly 1100. When the pull-actuator 2202 is pulled away from the cage assembly 1100, the pull-actuator causes the pivot-arm actuator 2204 to pivot about its pivoting pin 2506 to cause the keeper, hook or boss 2502 to disengage from the cage latch 1102 thereby releasing the nose receptacle 2200.

FIGS. 24A–24I illustrate one embodiment of the pull-actuator 2202. The pull-actuator 2202 may include a pull-tab 2402, an orientation indicator 2404, and a shaft or pull-arm 2406 coupled to the pull-tab 2402 at one end. In alternative embodiments, the pull-tab 2402 may also be a pull-button, a pull-hook, a pull-ring, a pull square, or any other equivalent mechanism with which to activate the pull-actuator 2202. A first surface 2408 and a second surface 2410 are coupled to the other end of the pull-arm 2406. The first surface 2408 includes an opening or catch 2416 to allow the pivot-arm actuator to engage the pull-actuator. The second surface 2410 may be two tabs (FIG. 24B, 2410A and 2410B) which define a channel 2418 through which the pivot-arm actuator 2204 moves to engage the pull-actuator 2202.

The pull-actuator 202 may also include an optional orientation indicator 2404 which serves to indicate the nose receptacle which the corresponding pull-actuator releases. One implementation in which the orientation indicator 2404 is useful is where the fiber optic modules are configured in a belly-to-belly configuration.

According to one embodiment, the first surface 2408 and the second surface 2410 may define grooves 2412 which serve to slideably couple the pull-actuator 2202 to the nose receptacle 2200. The nose receptacle 2200 may include corresponding rails on which the grooves 2412 of the pull-actuator slide. In another embodiment, the grooves may be part of the nose receptacle 2200 with the rails being part of the pull-actuator 2202.

As illustrated in FIG. 24H, the pull-actuator 2202 also comprises a catch or opening 2416 on which a keeper, hook, or boss 2504 of the pivot-arm actuator 2204 engages.

FIGS. 25A–25I illustrate one embodiment of a pivot-arm actuator 2204. The pivot-arm actuator 2204 comprises a pivoting pin 2506, a first latch key, keeper, pin, hook, boss, or engaging triangle 2502 (these terms are herein used interchangeably) at a first end, and a second latch key, keeper, pin, hook, or boss 2504 at a second end opposite the first end. The first keeper or hook 2502 serves to secure or couple the nose receptacle 2200 or fiber optic module to the cage assembly latch 1102. The second keeper or hook 2504 serves to couple the pivot-arm actuator 2204 to the pull-actuator 2202.

According to an alternative embodiment, the first keeper and/or second keeper on the pivot-arm actuator 2204 may be a catch or opening, with a corresponding keeper on the pull-actuator 2202 and/or cage assembly 1100 instead.

When the fiber optic module is fully engaged or secured to the cage assembly or module receptacle, the first keeper 2502 couples to an opening 1105 in the cage assembly latch 1102. The second keeper 2504 couples to the catch or opening 2416 in the pull-actuator 2202. The second keeper 2504 includes a ramped sliding surface 2508 which causes the pivot-arm actuator 2204 to rotate or pivot when the pull-actuator 2202 is pulled. The edge on the pull-actuator 2002 on which the ramped sliding surface 2508 pivots may be rounded in one embodiment.

The pivot-arm actuator 2204 is pivotally coupled to the body of the nose receptacle 2200 by means of a pivoting pin 2506. In one embodiment, the pivoting pin 2506 fits through a corresponding opening in the fiber optic module or nose receptacle body 2200.

Figure 26A:
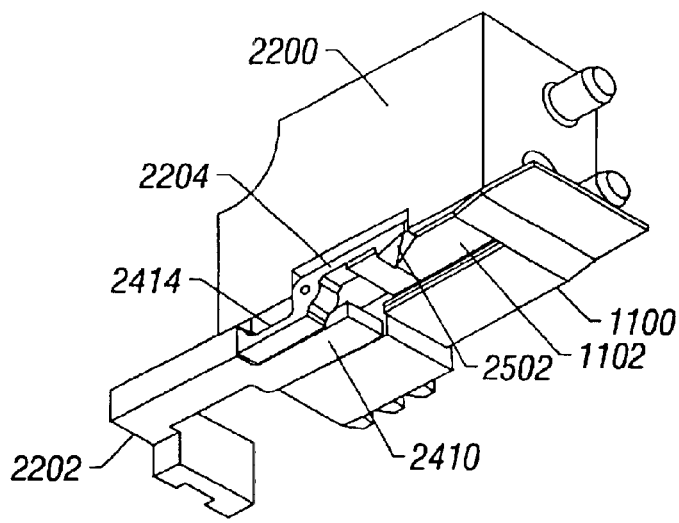
FIGS. 26A–26C illustrate various cross-sectional views of an integrated nose assembly and latching mechanism of FIGS. 24A–24I and 25A–25I in the engaged position for one embodiment of the invention.
Figure 26B:
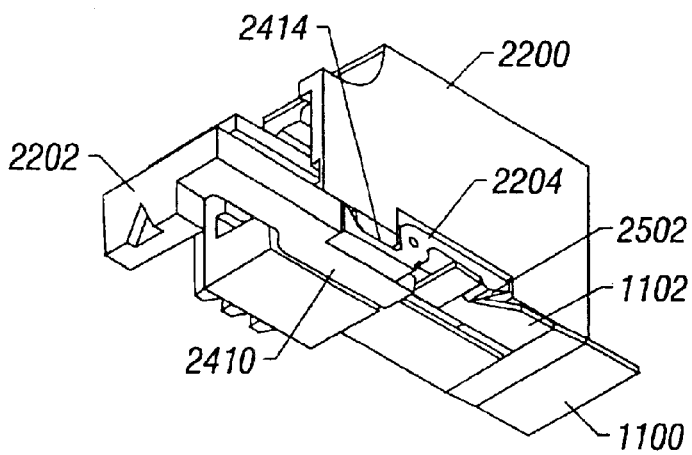
Figure 26C:
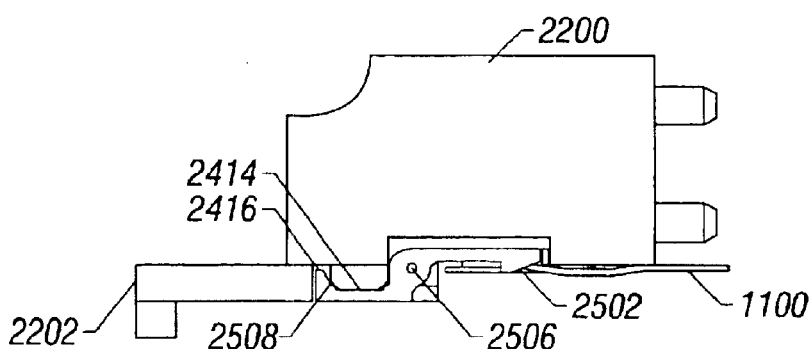

FIGS. 26A–26C illustrate various cross-sectional views of a fiber optic module (nose assembly 2200 and latching mechanism 2202 and 2204 are shown) engaged or coupled to a cage assembly 1100 (cage latch portion 1102 is shown). These figures show a latching mechanism employing the pull-actuator 2202 and pivot-arm actuator 2204 as illustrated in FIGS. 24A–24I and FIGS. 25A–25I respectively.

The engaging triangle 2502 fits through a corresponding opening or catch 1105 (shown in FIG. 23) to engage, couple, or secure the fiber optic module (only the nose receptacle 2200 portion is shown) to the cage assembly 1100 (only cage latch 1102 portion is shown). In the engaged position, the second keeper 2504 on the pivot-arm actuator 2204 fits through the opening or catch 2416 in the pull-actuator 2202. In this position, surface 2414 on the pull-actuator 2202 is adjacent to surface 2510 (FIG. 25E) on the pivot-arm actuator 2204.

Figure 27A:
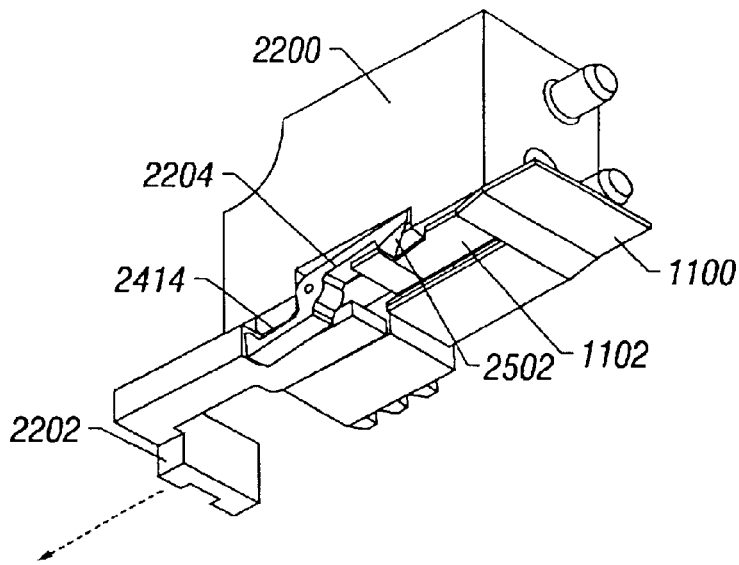
FIGS. 27A–27C illustrate various cross-sectional views of an integrated nose assembly and latching mechanism of FIGS. 24A–24I and 25A–25I in the disengaged position for one embodiment of the invention.
Figure 27B:
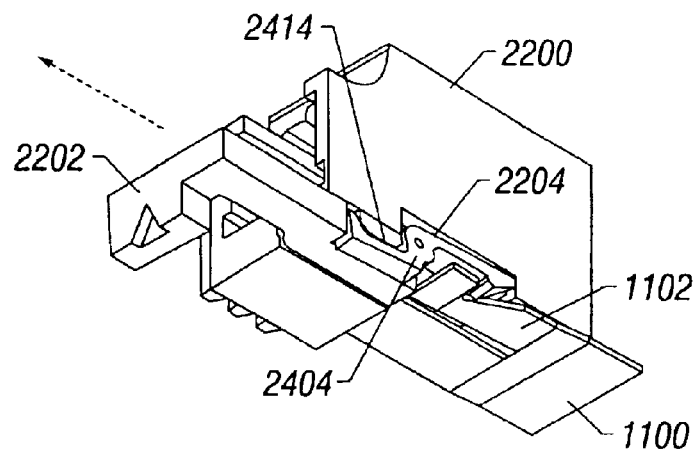
Figure 27C:
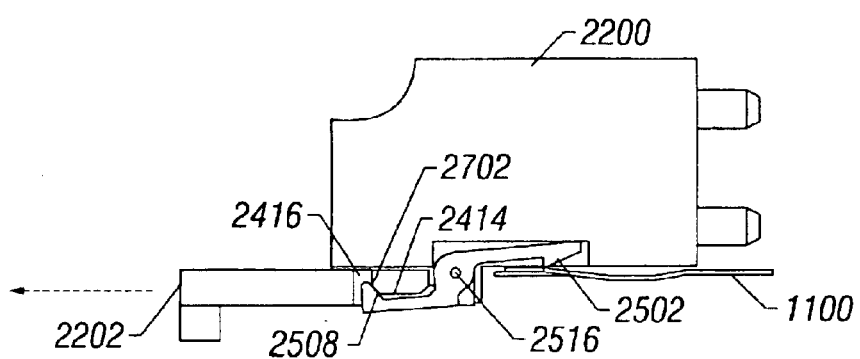
Figure 28A:
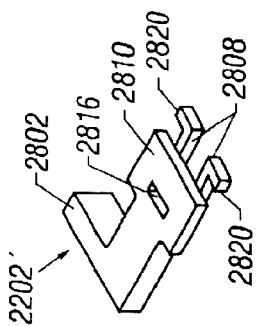
FIGS. 28A–28I illustrate various views of a pull-actuator for another embodiment of the invention.
Figure 28B:
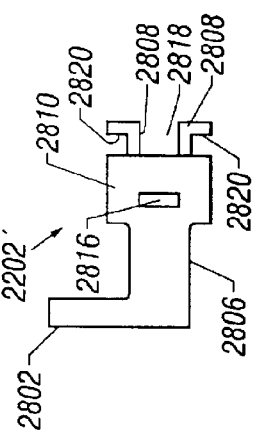
Figure 28C:
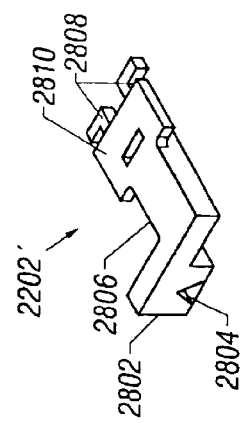
Figure 28D:
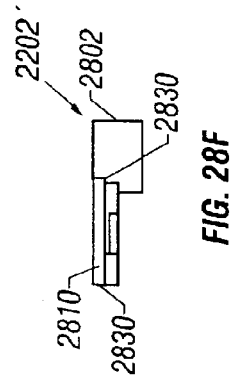
Figure 28E:
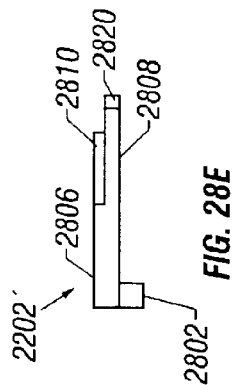
Figure 28F:
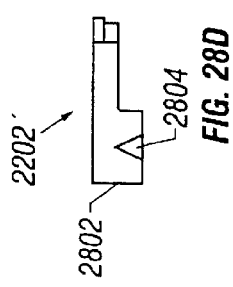
Figure 28G:
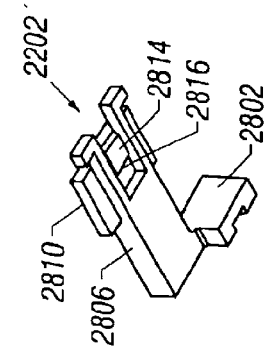
Figure 28H:
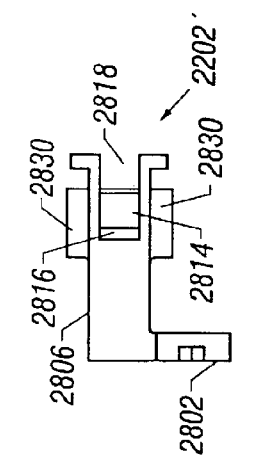
Figure 28I:
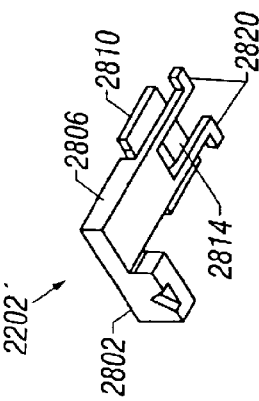
Figure 29A:
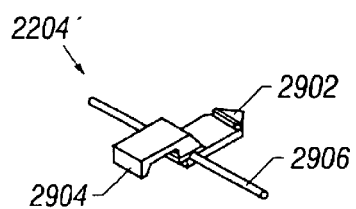
FIGS. 29A–29I illustrate various views of a pivot-arm actuator including a spring for another embodiment of the invention.
Figure 29B:
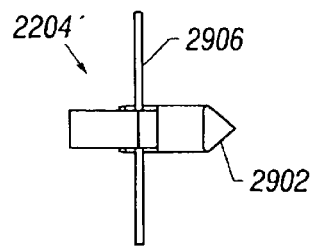
Figure 29C:
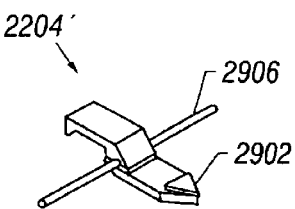
Figure 29D:
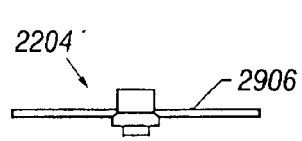
Figure 29E:
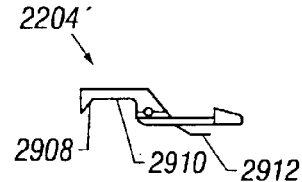
Figure 29F:
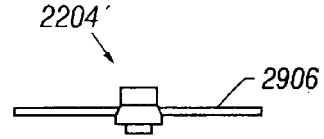
Figure 29G:
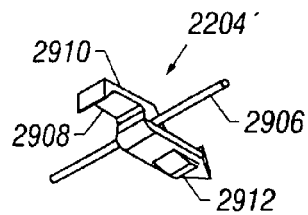
Figure 29H:
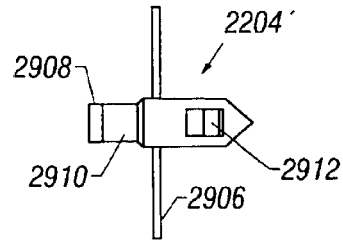
Figure 29I:
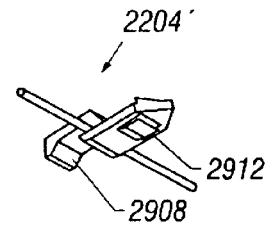

Referring now to FIGS. 27A–27C, the operation of the pull-actuator 2202 and pivot-arm actuator 2204 when disengaging and withdrawing the fiber optic module (nose receptacle 2200) from its cage assembly 1100 (cage latch 1102) is illustrated.

To disengage the nose receptacle 2200 from the cage latch 1102, the pull-tab 2402 on the pull-actuator 2202 is pulled away from the fiber optic module as illustrated. This causes a rounded edge 2702 on the latching surface 2414 of the pull-actuator 2202 to move against the ramped sliding surface 2508 of the pivot-arm actuator 2204. In turn, the force exerted on the ramped sliding surface 2508 by the pull-actuator 2202 causes the pivot-arm actuator 2204 to rotate or pivot about its pivoting pin 2506 thereby disengaging the engaging triangle or latch 2502 from the cage latch opening 1105.

The fiber optic module may then be withdrawn or removed from the cage assembly by continuing to pull on the pull-actuator 2202 or by pulling on the nose grips 714 or the nose receptacle 2202 of the fiber optic module.

Referring now to FIGS. 28A–28I, yet another embodiment of the pull-actuator 2202' is illustrated. In this embodiment, the pull-actuator 2202' includes legs 2808 with end-stops 2820. The end-stops 2820 prevent the pull-actuator 2202' from moving beyond a certain point as it is pulled to release the fiber optic module from the cage assembly 1100.

The pull-actuator 2202' may include a first surface 2810 with edges 2830 that slide through grooves in the nose receptacle 2200'.

FIGS. 29A–29I illustrate yet another alternative embodiment of the pivot-arm actuator 2204'. In this embodiment the pivot-arm actuator 2204' further includes a spring 2912. According to various embodiments the spring 2912 may be formed from the same material as the pivot-arm actuator 2204' or it may be a separate component coupled to the pivot-arm actuator 2204'. The spring 2912 may be any kind of spring including a coil spring, leaf spring, carriage spring, compression spring, conical spring, helical spring, volute spring, spiral spring, scragged spring, and other well known types of springs. The pivot-arm actuator 2204' is pivotally coupled to the body of the nose receptacle 2200' by means of a pivoting pin 2906.

Figure 30A:
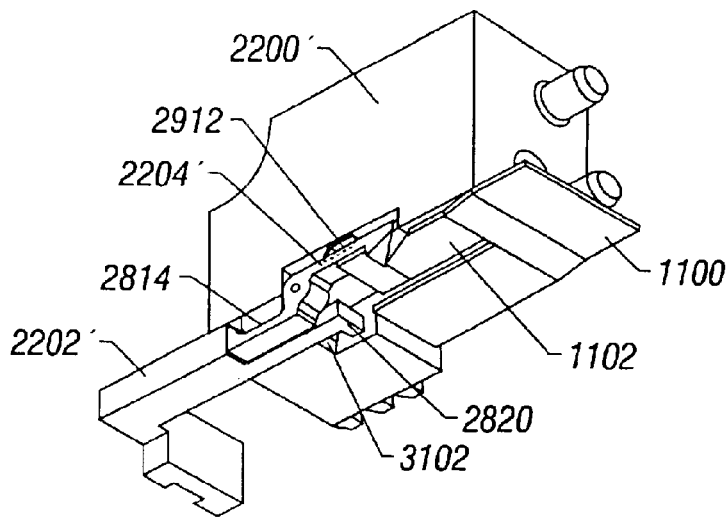
FIGS. 30A–30C illustrate various cross-sectional views of an integrated nose assembly and latching mechanism of FIGS. 28A–I and 29A–I in the engaged position for one embodiment of the invention.
Figure 30B:
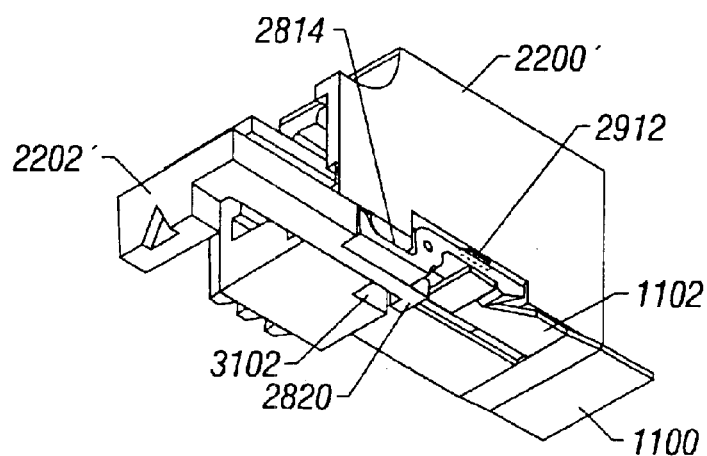
Figure 30C:
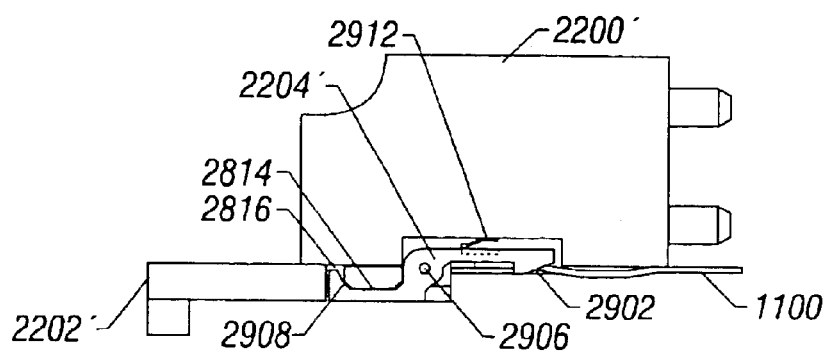

FIGS. 30A–30C illustrate various cross-sectional views of a fiber optic module (nose assembly 2200' and latching mechanism 2202' and 2204' shown) engaged or coupled to a cage assembly 1100 (cage latch portion 1102 is shown). These figures show a latching mechanism employing the pull-actuator 2202' illustrated in. FIGS. 28A–28I and pivot-arm actuator 2204' illustrated in FIGS. 29A–29I.

While the fiber optic module is engaged to the cage assembly, the spring 2912 may provide some force to maintain the pivot-arm actuator 2204' in an engaged position.

In the engaged position the end-stops 2820 of the pull-actuator 2202' are separated from a stopping edge 3102 of the nose receptacle 2200'.

Figure 31A:
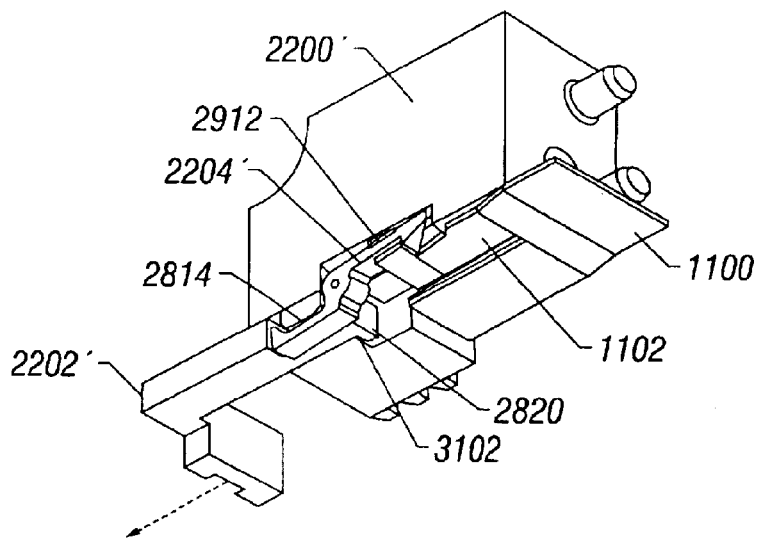
FIGS. 31A–31C illustrate various cross-sectional views of an integrated nose assembly and latching mechanism of FIGS. 28A–I and 29A–I in the disengaged position for one embodiment of the invention.
Figure 31B:
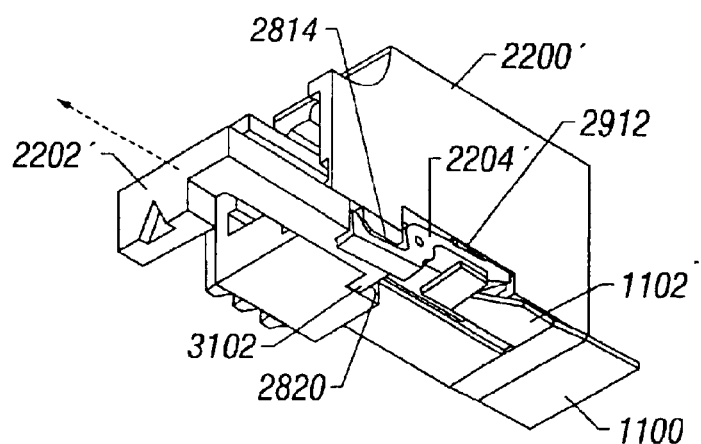
Figure 31C:
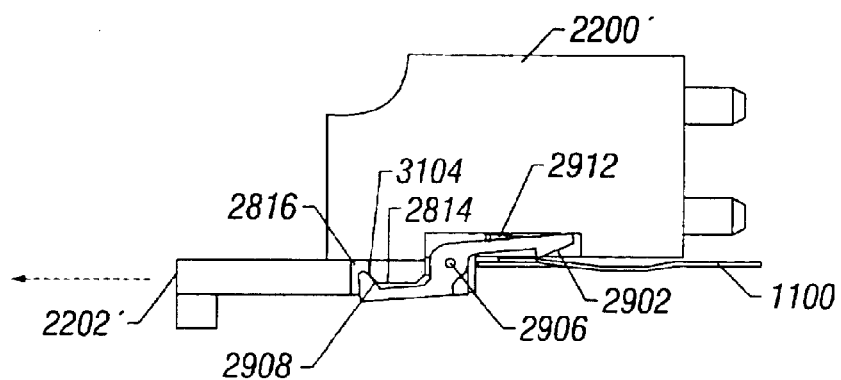

FIGS. 31A–31C illustrate how the pull-actuator 2202' and pivot-arm actuator 2204' operate when disengaging and withdrawing the fiber optic module (nose receptacle 2200') from its cage assembly 1100 (cage latch 1102 portion shown).

Pulling the pull-actuator 2202' causes the pivot-arm actuator 2204' to pivot or rotate as a result of the force exerted by the rounded edge 3104 of the pull-actuator 2202' on the ramped sliding surface 2908 of the pivot-arm actuator 2204'. As described above, this causes the engaging triangle 2902 to disengage from the cage assembly latch 1102 thereby disengaging the fiber optic module from the cage assembly.

When the pivot-arm actuator 2204' rotates to disengage, the spring 2912 becomes compressed, thereby exerting an opposite force on the pivot-arm actuator 2204'.

When the pulling force on the pull-actuator 2202' is removed or ceases, the spring 2912 decompresses causing the pivot-arm actuator 2204' to return to its initial position. The movement of the pivot-arm actuator 2204' to its initial position causes pull-actuator 2202' to be retracted into the fiber optic module to its initial position. This is because the ramped sliding surface 2908 exerts a retracting force on the rounded edge 3104 as it rotates or pivots back into its initial position within the catch or opening 2816.

The end-stops 2820 serve to stop the pull-actuator 2202' from being pulled too far out as the pull-actuator is pulled. The nose receptacle assembly 2200' includes a stopping edge 3102 to stop the end-stops 2820 from moving beyond a certain point. The end-stops 2820, or their equivalents, also permit the fiber optic module to be withdrawn from the cage assembly by continuing to pull on the pull-actuator 2202'.

Referring now to FIGS. 32A–32I, alternative embodiments of pull mechanisms for pull-actuators (i.e., 2202 or 2202') are illustrated. Only the pull-arm 3206 portion (equivalent to 1904 in FIG. 20, 2406 in FIG. 24, or 2806 in FIG. 28) of the pull-actuator (i.e. 2202 or 2202') is shown.

Figure 32A:
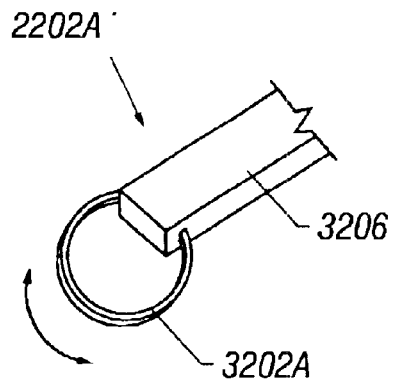

FIG. 32A shows a pull-actuator 2202A' with a pivoting pull-ring 3202A pivotally coupled to the pull-arm 3206. The direction in which the pull-ring 3202A pivots is indicated by the arrows. In this embodiment, the pull-ring 3202A is horizontal with the pull-actuator 2202A'. A user pulls on the pivot-ring 3202A to retract the pull-actuator 2002A'.

Figure 32B:
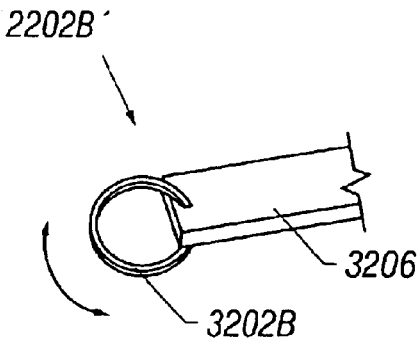

FIG. 32B shows a pull-actuator 2202B' with another pivoting pull-ring 3202B pivotally coupled to the pull-arm 3206. In this embodiment, the pull-ring 3202B is vertical with the pull-actuator 2202B'. The arrows indicate the direction in which the pull-ring 3202B pivots. A user pulls on the pivoting pull-ring 3202B to retract the pull-actuator 2002B'.

Figure 32C:
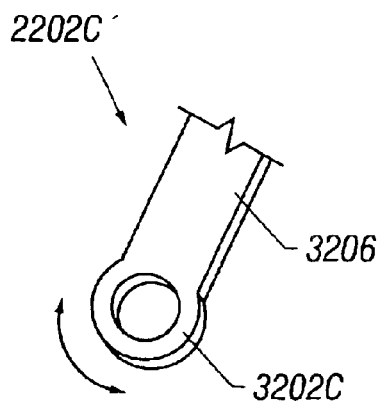

FIG. 32C shows a pull-actuator 2202C' with a fixed pull-ring 3202C coupled to the end of the pull-arm 3206. The pull-ring 3202C is horizontal with the pull-actuator 2202C'. A user pulls on the pull-ring 3202C to retract the pull-actuator 2002C'.

Figure 32D:
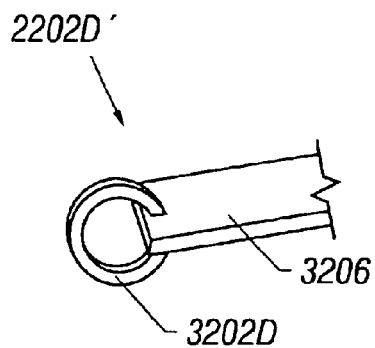

FIG. 32D shows a pull-actuator 2202D' with another fixed pull-ring 3202D coupled to the end of the pull-arm 3206. The pull-ring 3202D is vertical with the pull-actuator 2202D'. A user pulls on the pull-ring 3202D to retract the pull-actuator 2002D'.

Figure 32E:
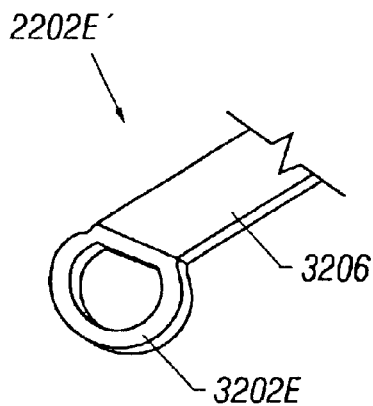
Figure 34D:
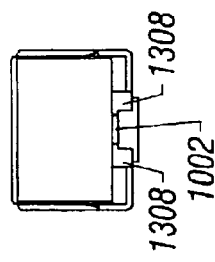
Figure 34C:
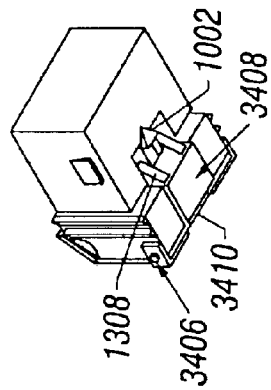
Figure 34B:
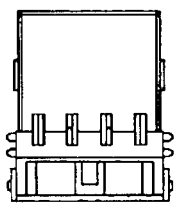
Figure 34A:
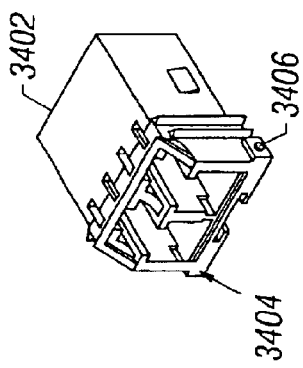
Figure 34H:
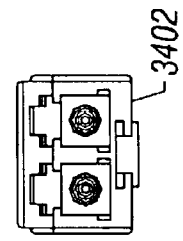
Figure 34G:
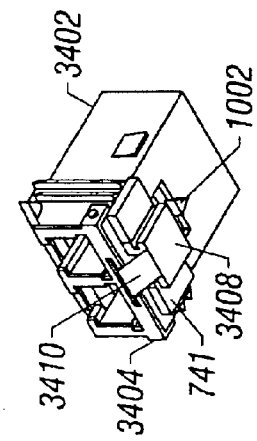
Figure 34F:
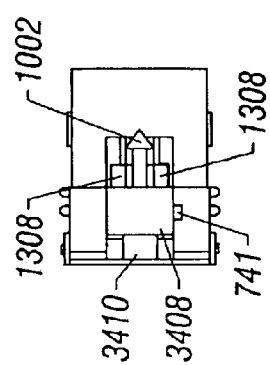
Figure 34E:
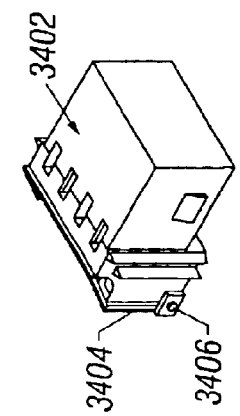
Figure 37E:
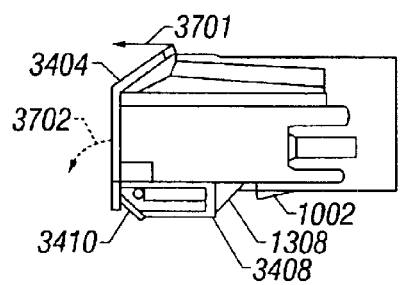

FIG. 32E shows a pull-actuator 2202E' with another fixed pull-ring 3202E coupled to the end of the pull-arm 3206. The pull-ring 3202E is at an angle to the pull-actuator 2202E'. A user pulls on the pull-ring 3202E to retract the pull-actuator 2002E'.

FIG. 32F shows a pull-actuator 2202F' with pull-square 3202F coupled to the end of the pull-arm 3206. The pull-square 3202F is horizontal with the pull-actuator 2202F'. A user pulls on the pull-square 3202F to retract the pull-actuator 2002F'.

FIG. 32G shows a pull-actuator 2202G' with a pull-hook 3202G at the end of the pull-arm 3206. A user pulls on the pull-hook 3202G to retract the pull-actuator 2002G'.

FIG. 32H shows a pull-actuator 2202H' with a pull-button 3202H coupled to the end of the pull-arm 3206. A user pulls on the pull-button 3202H to retract the pull-actuator 2002H'.

FIG. 32I shows a pull-actuator 2202I' with a pull-knob 3202I coupled to the end of the pull-arm 3206. A user pulls on the pull-knob 3202I to retract the pull-actuator 2002I'.

FIGS. 32A–32I provide some embodiments of pull-mechanisms for the pull-actuator (i.e. 2202 or 2202') and that other pull-mechanisms known to those skilled in the art may also be employed.

Referring now to FIGS. 33A–33D, various views of a belly-to-belly mounting configuration for another embodiment of the invention is illustrated. The fiber optic module illustrated in FIGS. 32A–32D employ pull-actuators 2202 and 2202', or their equivalents, illustrated in FIGS. 24 and 28. In FIGS. 32A–32D, the pull-actuators 2202A and 22022 are designed such that they do no interfere with each other when the fiber optic modules 2200A and 2200B are stacked as shown. This belly-to-belly configuration for fiber optic modules is described with reference to FIGS. 17A–17D above; that description applies to fiber optic modules employing the pull-actuators (i.e., 2202 and 2202') described herein.

Referring now to FIGS. 34A–34I, various views of a subassembly of a nose receptacle 3402 including a bail latch delatching mechanism for fiber optic modules is illustrated. The nose receptacle 3402 is portion of a mechanical subassembly of a fiber optic module but only the nose receptacle 3402 portion of the fiber optic module is shown in FIGS. 34A–34I. The nose receptacle 3402, also referred to as a nose, is an alternate embodiment to the nose receptacle or nose 151 in the fiber optic module 100 and the nose receptacle or nose 704 in the fiber optic modules 700, 700', and 700".

The nose receptacle 3402 includes a bail latch 3404, a pivoting pin 3406, and an actuator 3408. The bail latch 3404 includes a push tab, actuating tab, kick, or push mechanism 3410 for pushing on the actuator 3408 and disengaging the fiber optic module from a cage. With a fiber optic module engaged into a cage or module receptacle, the bail latch 3404 can be used to disengage and withdrawal the fiber optic module from the cage or receptacle, such as cage or receptacle 1100 illustrated in FIG. 11. That is, the bail latch 3404 serves as the mechanical device to contact the actuator 3408 and push it to it's forward position disengaging the locking tab or latch 1102 on the cage or receptacle 1100 from holding onto the locking triangle or boss 1002 of the nose or nose receptacle 3402.

To disengage the fiber optic module from the cage or receptacle, the bail latch 3404 is first moved from an engaged position to a disengaged position. In one embodiment, the engaged position is a vertical position while the disengaged position is in a horizontal position. As discussed further below, other embodiments of the bail latch and the actuator may provide differing engaged and disengaged positions with respect to the nose receptacle 3402 and the fiber optic module of which it is a part thereof. The fiber optic module is withdrawn by pulling out or backward on the bail latch 3404 of the nose receptacle 3402. The bail latch 3404 provides sufficient grip and accesses the actuator 3408 for the de-latching for the withdrawing process of the fiber optic module from a cage or receptacle. In one embodiment, the nose receptacle 3402 is a part of an SFP fiber optic module for engaging an SFP cage.

Referring now to FIGS. 35A–35I various views of a first embodiment of the bail latch 3404 including the pivoting pin 3406 for one embodiment of the invention are illustrated.

The bail latch 3404 includes a pair of pivot points or side tabs 3502; the push tab, kick, or push mechanism 3410; and a pulling arm or pull-handle 3504 coupled to a center member 3505 as shown and illustrated in FIGS. 35A–35I. In one embodiment, these components of bail latch 3404 can hug along the front face and side face of the nose receptacle 3402 and form a G-like shape when viewed from the side. The pivot points or side tabs 3502 can each include a hole or opening 3506 to accept the pivot pin 3406. The center axis of the two holes or openings 3506 in the side tabs 3502 is the axis of pivoting of the bail latch 3404 and hence the pivoting pin 3406 is located there at. During operation, the bail latch 3404 is rotatably coupled to the nose receptacle 3402 by the pivoting pin 3406.

The pulling arm or pull-handle 3504 includes an opening 3412 which allows a finger to be inserted to pull out the fiber optic module when in an disengaged position. The opening 3412 also allows fiber optic plugs and optical fibers to be inserted into the nose receptacle 3402 when its in an engaged position. The pulling arm or pull handle 3504 may include a grip 3414 to ease grabbing the bail latch 3404 from an engaged position into a disengaged position. The bail latch 3404 can be formed out of metal, plastic (including a thermoplastic), thermosett, epoxy, or other solid materials.

Figure 38A:
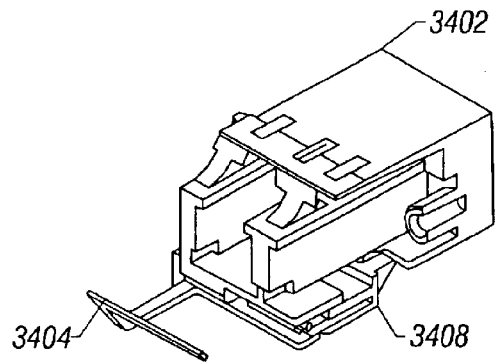
FIGS. 38A–38E illustrate various cross-sectional views of an integrated nose assembly and latching mechanism of FIGS. 34A–34I in the disengaged position for one embodiment of the invention.
Figure 38B:
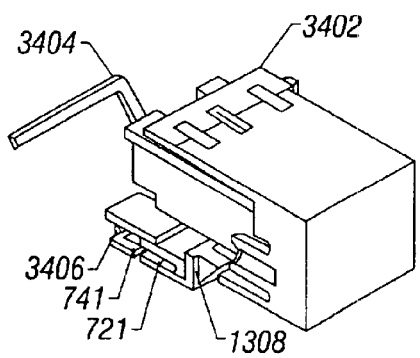
Figure 38C:
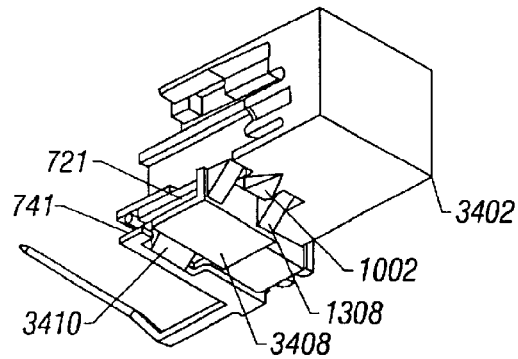
Figure 38D:
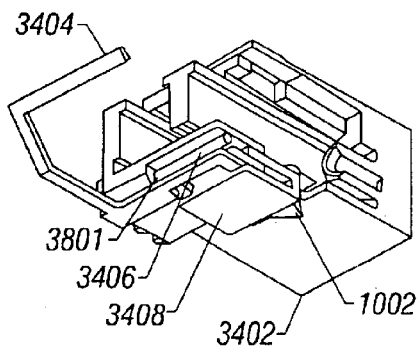
Figure 38E:
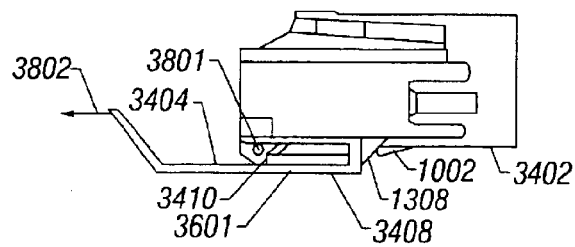
Figure 40A:
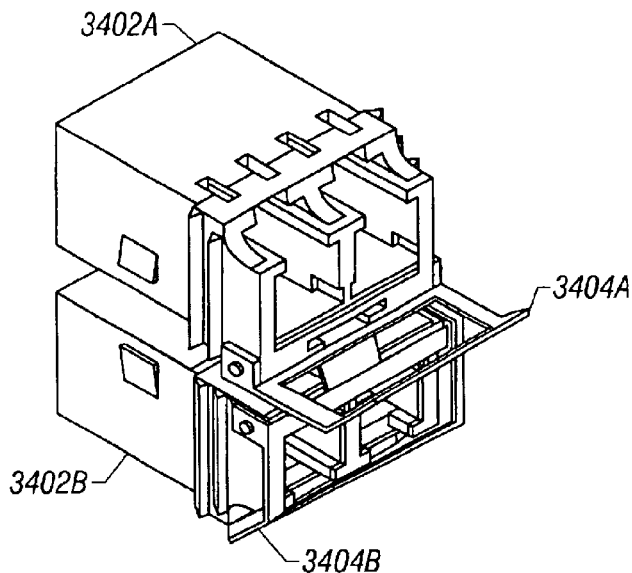
FIGS. 40A–40I illustrate various views of how the bail-latch delatching mechanism would function in a belly-to-belly mounting configuration for another embodiment of the invention.
Figure 40B:
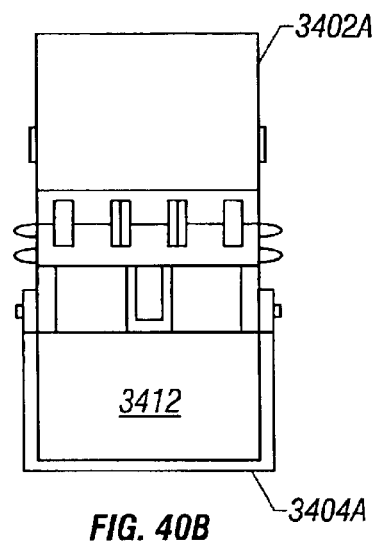
Figure 40C:
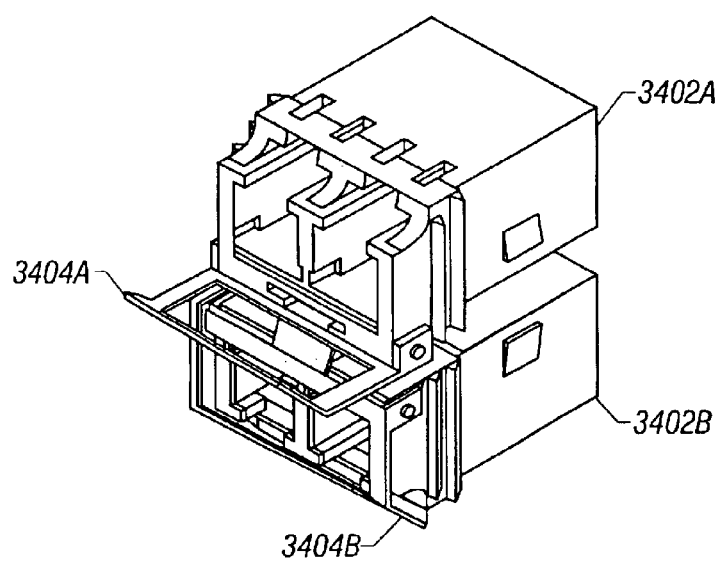
Figure 40D:
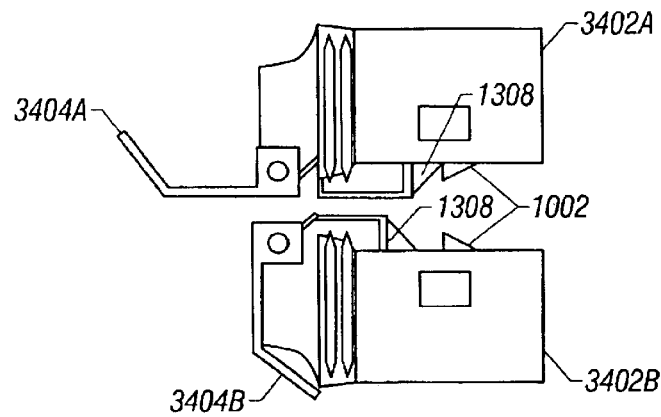
Figure 40E:
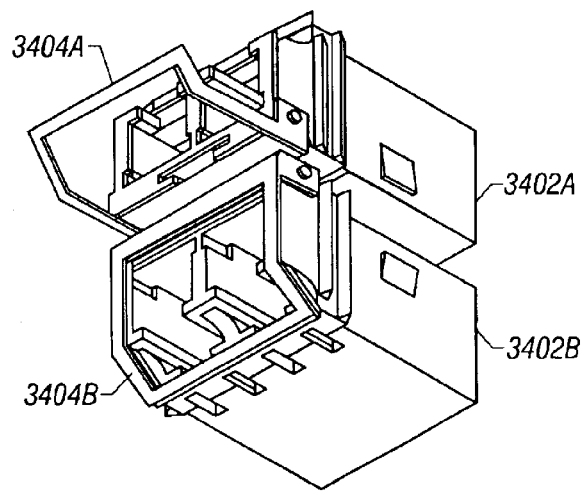
Figure 40F:
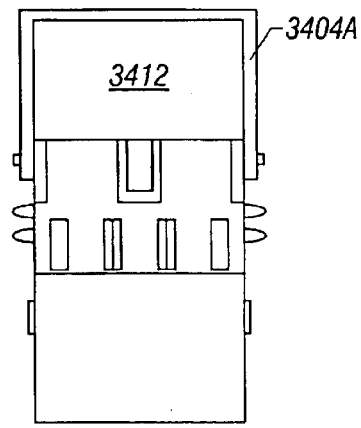
Figure 40I:
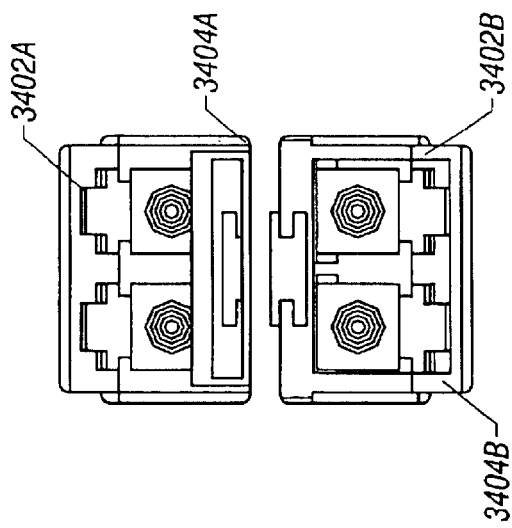
Figure 40H:
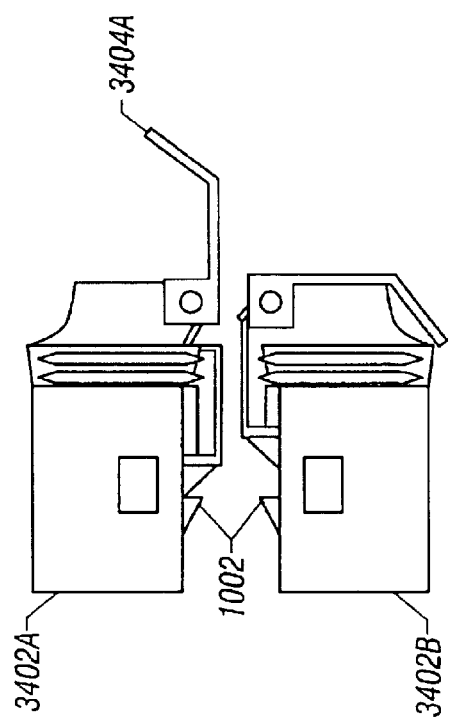
Figure 40G:
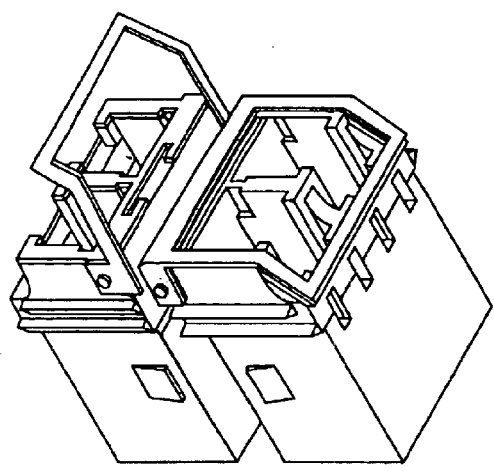

The pivoting pin 3406, which can also be referred to as a rod, is a long thin rod or cylinder of metal, thermoplastic, thermosett, epoxy or other solid material having an axis about which the bail latch can be rotated. The pivoting pin 3406 holds the bail latch rotatably coupled together to the nose receptacle 3402. The pivoting pin serves as a pivoting device for bail latch 3404. Secondarily, the pivoting pin 3406 holds the bail latch coupled to the nose receptacle 3402 as shown in FIG. 3. The nose receptacle 3402 includes a pair of openings or holes in each side or alternatively a long opening or hole through its body if solid at that point to accept the pivoting pin 3406. Referring momentarily to FIGS. 38D and 38E, an opening 3801 in the left side of the nose receptacle 3402 is illustrated with the pivoting pin 3406 inserted therein.

One embodiment of the bail latch 3404' (in FIG. 35C) may also include an optional spring 3419 to retract the bail latch 3404' against the face of the fiber optic module, in a closed position, when a user is not pulling or rotating the lever arm 3504I'. Note that various types of springs may serve this purpose including a torsion spring, a coil spring, a conical spring a wind-up spring 3919 (shown in FIG. 39I), a bias spring, a tension spring, a retention spring, and others. The optional spring may be mounted along the pivoting axis of the latch or in other well known configurations to retract the bail latch arm 3404' when not in use.

Referring now to FIGS. 36A–36I, various views of the actuator 3408 are illustrated. The actuator 3408 is somewhat similar to the structure and functionality of the actuator 706 previously described with reference to FIGS. 7A–14B and the fiber optic modules described therein. In one embodiment, the actuator 3408 is a conventional actuator in conformance with the MSA Standard for SFP fiber optic modules. In other embodiments, the actuator 3408 may be tailored to appropriately couple with the bail latch 3404. The actuator 3408 functions to disengage the fiber optic module from the cage 1100 when pushed by the push tab 2410 of the bail latch 3404.

The actuator 3408 includes a butting surface 3601; a pair of sliding guide slots or grooves 721 on each side; and one or more ramps, wedges or lifters (a pair of which are illustrated) 1308. The butting surface 3601 is part of the back side of the actuator 3408 while the ramps, wedges, or lifters 1308 are part of the front side of the actuator 3408. The slot or grooves 721 on each side of the actuator 3408 have an opening at one end and a closure at an opposite end. The slot or grooves 721 slideably engage tangs 741 in the nose receptacle 3402. While illustrated in FIGS. 34G and 34F, the tangs 741 of the nose receptacle 3402 are better illustrated in the exploded view of the nose receptacle 704 of FIG. 7B. The butting surface 3601 of the actuator 3408 makes contact with the push tab 3410 of the bail latch 3404 when the fiber optic module is being disengaged. The one or more ramps, wedges, or lifters 1308 make contact with the latch 1102 of the cage 1100 to disengage the fiber optic module as is described below and in FIGS. 12, 13A–13B, and 14A–14B. The actuator 3408 may be formed out of metal, thermoplastic, thermosett, epoxy or other solid material.

Referring now to FIGS. 37A–37E and FIGS. 38A–38E, various cross-sectional views of an integrated nose assembly and latching mechanism of FIGS. 34A–34I in the engaged position and the disengaged position respectively for one embodiment of the invention are illustrated.

In FIGS. 37A–37E, the bail latch 3404 in an upright, closed, or engaged position. That is, the fiber optic module can be securely engaged with the cage with the bail latch 3404 in this position. The fiber optic module can be pushed into the cage 1100 with the bail latch 3404 in its upright, closed, or engaged position. With the bail latch 3404 in its upright, closed, or engaged position, the actuator 3408 and its ramps, wedges, or lifters 1308 can be in a backward, locking or engaging position well away from the boss or locking triangle 1002 in the nose receptacle 3402. This allows the boss or locking triangle 1002 in the nose receptacle 3402 to mate or engage into the opening or catch 1105 in the latch 1102. The bail latch 3404 can be pulled on as shown by the force arrow 3701 to cause it to first rotate around the axis of the pivoting pin 3406 as illustrated by the arrow 3702. As the bail latch 3404 rotates from its an upright, closed, or engaged position, a user can insert the same finger into the opening 3412 of the pull handle 3414 in order to continue pulling outward on the fiber optic module.

In FIGS. 38A–38E, the bail latch 3404 is in a horizontal, open, or disengaged position. The bent portion of handle 3414 allows a user to keep the finger in the opening 3412 and continue pulling outward on the fiber optic module even when its in the horizontal, open, or disengaged position. By pulling on the bail latch 3404, the bail latch can first rotate around the axis along the bottom portion of the nose receptacle 3402. As the bail latch 3404 rotates, the push tab 3410 of the bail latch 3404 extends gradually forward. The extension of push tab 3410 comes in contact with the butting surface 3601 of the actuator 3408 to slide it forward towards the latch 1102 of the cage 1100. The forward thrust of the actuator 3408 causes the ramps 1308 to push out on the latch 1102 freeing the boss or triangle 1002 from the opening 1102 in the cage 1000 to disengage the fiber optic module from the cage 1100. In an alternate embodiment, the cage may include a boss or locking triangle which is pushed out of a hole or opening in the nose receptacle to disengage the fiber optic module from the cage. A continuous pulling action, as illustrated by the pull force 3802 on the bail latch 3404, can withdraw the fiber optic module fully out of the cage. In this manner a single continuous pulling action on the bail latch 3404 can disengage and withdraw the fiber optic module out of the cage. With the bail latch 3404 in its horizontal, open, or disengaged position, it can be easily be returned to its upright, closed, or engaged position within or without the cage 1100 by using an opposite force. Alternatively, the bail latch 3404 could be spring loaded by including a spring to return it to its upright, closed, or engaged position on its own.

The action of the actuator 3408 is similar to that of the actuator 706 and the one or more ramps, wedges, or lifters 1308 as described with respect to FIGS. 12, 13A–13B, and 14A–14B.

FIGS. 39A–39I illustrate various views of alternate embodiments of the bail latch 3404 as well as other delatching mechanisms that can function similar to the bail latch 3404 with a push tab 3410.

FIG. 39A illustrates a bail latch 3404A' in which the pivot pin 3406 is replace with two smaller pins 3406A' that do not extend across the width of the bail latch 3404A'.

FIG. 39B illustrates a latch 3404B' with a partial pull arm 3504B' coupled to a lever instead of a complete bail latch pull arm.

FIG. 39C illustrates a latch 3404C' with a partial pull arm (as in FIG. 39B) with a long pivot pin 3406C' coupled to the latch 3404C' at only one side.

FIG. 39D illustrates a bail latch 3404D' with an enclosed pull arm 3504D' with no angles. The latch 3404D' further includes another embodiment of the actuating tab 3410D' where the tab has an oval or circular tip to slide on the butting surface 3601 and release the fiber optic module. The actuating tab 3410D' is narrower than the first actuating tab 3410.

FIG. 39E illustrates a bail latch 3404E' with a semicircular a pull arm 3504E'.

FIG. 39F illustrates a latch 3404F' with just a lever arm 3504F' to release the fiber optic module from the cage assembly.

FIG. 39G illustrates a latch 3404G' with pivoting conical retainers 3406G' instead of pivot pins to couple the latch 3404G' to the fiber optic module.

FIG. 39H illustrates a bail latch 3404H' with holes rather than pins. The fiber optic module or nose receptacle provides pins or protrusions which fit through the holes 3902 to pivotally couple the latch 3404H' to the fiber optic module.

FIG. 39I illustrates a bail latch 3404I' similar to that shown in FIG. 39F but with an optional spring to retract the latch arm 3504I' against the face of the fiber optic module when a user is not pulling or rotating the lever arm 3504I'. As noted above, various types of springs may serve this purpose. The spring may be mounted along the pivoting axis of the latch or in other well known configurations to retract the latch arm 3504I' when not in use.

According to one implementation, one end of the spring is coupled to the latch. As the bail latch arm 3504I' is rotated it causes spring 3919 to compress (or decompress). When the bail latch is released the spring decompresses (or compresses) to bring the bail latch against the fiber optic module face.

In another embodiment, one end of the spring is coupled to the fiber optic module or nose receptacle so that when the bail latch is pulled or rotated from its closed position it causes the spring to compress (or decompress). When the bail latch is released the spring decompresses (or compresses) to push the bail latch against the fiber optic module face (its closed position).

Referring now to FIGS. 40A–40I various views of how the bail-latch delatching mechanism would function in a belly-to-belly mounting configuration for another embodiment of the invention. A first fiber optic module and a second fiber optic module can be engaged into cages in a belly to belly configuration in which case a first nose receptacle 3402A would be adjacent and parallel to a second nose receptacle 3402B as illustrated in FIGS. 40A–40I. The bail latch de-latching mechanism can be designed to functional at extreme close gap condition when using a belly to belly mounting configuration as illustrated if FIGS. 40A–40I. That is, the distance between top and bottom cages or receptacles can be less than 1.0 millimeter and allow the bail latches 3404A and 3404B of the first and second nose receptacles 3402A and 3402B respectively to properly function into an open or closed position.

While FIGS. 40A–40I illustrate only the first bail latch 3404A being in an open or engaged position, either the first or second bail latches 3404A or 3404B can be opened or in a disengaged position. Alternatively, both the top or bottom bail latches 3404A and 3404B can be opened or disengaged for some reason if desired. This belly-to-belly configuration for fiber optic modules is described further with reference to FIGS. 17A–17D above; that description applies to fiber optic modules employing the bail latch delatching mechanism of the nose receptacle 3402 described herein.

The invention has a number of advantages over the prior art that will be recognized by those of ordinary skill in the art after thoroughly reading this disclosure.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. While the invention has been described in particular embodiments, the invention should not be construed as limited by such embodiments.

What is claimed is:

1. A configuration of fiber optic modules having one or more electro-optic transducers, the configuration comprising:

a printed circuit board having a first side and a second side;

a first cage coupled to the first side of the printed circuit board to receive a first fiber optic module having a first bail latch delatching mechanism;

a second cage coupled to the second side of the printed circuit board to receive a second fiber optic module having a second bail latch delatching mechanism, the second cage aligned in parallel to the first cage such that a first belly of the first fiber optic module is adjacent a second belly of the second fiber optic module; and when received in the first cage and the second cage, the first fiber optic module and the second fiber optic module having adequate spacing to allow the first bail latch delatching mechanism and the second bail latch delatching mechanism to rotate to a disengaged position.

2. The configuration of claim 1 wherein, the first belly of the first fiber optic module being adjacent to the second belly of the second fiber optic module to provide increased density.

3. The configuration of claim 1 wherein,
the first bail latch delatching mechanism includes
a first bail-latch to disengage and withdraw the first fiber optic module from the first cage, and
a first pivoting pin to rotationally couple the first bail-latch to the first fiber optic module; and
the second bail latch delatching mechanism includes
a second bail-latch to disengage and withdraw the second fiber optic module from the second cage, and
a second pivoting pin to rotationally couple the second bail-latch to the second fiber optic module.

4. The configuration of claim 3 wherein the first fiber optic module includes a first boss to engage a first latch of the first cage, and
when the first bail-latch is in a horizontal position, the first boss is disengaged from the first latch of the first cage; and,
the second fiber optic module includes a second boss to engage a second latch of the second cage, and
when the second bail-latch is in a horizontal position, the second boss is disengaged from the second latch of the second cage.

\* \* \* \* \*